United States Patent
Amano et al.

(10) Patent No.: US 9,541,743 B2
(45) Date of Patent: *Jan. 10, 2017

(54) PROJECTION ZOOM LENS AND PROJECTION TYPE DISPLAY DEVICE

(71) Applicant: FUJIFILM Corporation, Tokyo (JP)

(72) Inventors: Masaru Amano, Saitama-ken (JP); Yukiko Nagatoshi, Saitama-ken (JP); Masanao Kawana, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 14/711,984

(22) Filed: May 14, 2015

(65) Prior Publication Data

US 2015/0241670 A1    Aug. 27, 2015

Related U.S. Application Data

(63) Continuation of application No. PCT/JP2013/006613, filed on Nov. 11, 2013.

(30) Foreign Application Priority Data

Nov. 19, 2012 (JP) .................. 2012-253315

(51) Int. Cl.
*G02B 15/14* (2006.01)
*G02B 13/16* (2006.01)
(Continued)

(52) U.S. Cl.
CPC ............... *G02B 13/16* (2013.01); *G02B 13/04* (2013.01); *G02B 13/18* (2013.01); *G02B 15/177* (2013.01);
(Continued)

(58) Field of Classification Search
CPC ....... G02B 13/0045; G02B 9/60; G02B 5/005; G02B 13/04; G02B 13/002; G02B 13/009; G02B 15/177; G02B 15/20
(Continued)

(56) References Cited

U.S. PATENT DOCUMENTS 7,079,324 B2 * 7/2006 Yamasaki ............ G02B 15/177 359/680
7,190,528 B2 * 3/2007 Inoko ................... G02B 15/177 359/649
(Continued)

FOREIGN PATENT DOCUMENTS

JP    2005-106948    4/2005
JP    2006-184723    7/2006
(Continued)

*Primary Examiner* — Evelyn A Lester
(74) *Attorney, Agent, or Firm* — Young & Thompson

(57) ABSTRACT

A projection zoom lens is constituted by: a negative first lens group; a positive moving second lens group; a positive moving third lens group; a positive final lens group; at least one lens group positioned between the final lens group and the third lens group; and an aperture stop provided between adjacent moving lens groups. The aperture stop is a variable stop, of which the aperture diameter changes such that the numerical aperture of the zoom lens becomes constant. The zoom lens satisfies Conditional Formulae below:

$$2.8 < Bf/Im\phi \tag{1'}$$

$$L/Im\phi < 12 \tag{2}$$

wherein Bf is the back focus of the entire system at the reduction side at the wide angle end, $Im\phi$ is the maximum effective image circle diameter at the reduction side, and L is the distance from the lens surface (Continued)

most toward the magnification side to the lens surface most toward the reduction side when the projection distance is infinity.

15 Claims, 38 Drawing Sheets

(51) Int. Cl.
  *G02B 15/177* (2006.01)
  *G02B 13/04* (2006.01)
  *G02B 13/18* (2006.01)
  *G02B 15/20* (2006.01)
  *G03B 21/00* (2006.01)
  *G03B 21/20* (2006.01)
  *G02B 13/00* (2006.01)
  *G02B 5/00* (2006.01)
  *G02B 9/60* (2006.01)
  *G02B 27/64* (2006.01)

(52) U.S. Cl.
  CPC ............ *G02B 15/20* (2013.01); *G03B 21/003* (2013.01); *G03B 21/206* (2013.01); *G03B 21/2073* (2013.01); *G02B 5/005* (2013.01); *G02B 9/60* (2013.01); *G02B 13/002* (2013.01); *G02B 13/009* (2013.01); *G02B 13/0045* (2013.01); *G02B 27/646* (2013.01); *G03B 21/006* (2013.01)

(58) Field of Classification Search
  USPC ....... 359/649, 680, 683–685, 676, 714, 740, 359/765, 770
  See application file for complete search history.

(56) References Cited

U.S. PATENT DOCUMENTS

| | | | | |
|---|---|---|---|---|
| 7,295,378 B2 * | 11/2007 | Hakko | ................. | G02B 15/163 359/649 |
| 7,605,985 B2 * | 10/2009 | Nagahara | ............. | G02B 15/177 359/680 |
| 8,072,690 B2 * | 12/2011 | Nagatoshi | ............ | G02B 15/177 359/682 |
| 8,081,391 B1 * | 12/2011 | Kawana | ............... | G02B 15/177 359/680 |
| 8,976,455 B2 * | 3/2015 | Nagahara | ............. | G02B 15/177 359/649 |
| 2005/0036207 A1 | 2/2005 | Yamasaki et al. | | |
| 2008/0231962 A1 | 9/2008 | Yamada | | |
| 2009/0135497 A1 | 5/2009 | Nagahara et al. | | |
| 2010/0271601 A1 | 10/2010 | Amano | | |
| 2010/0309562 A1 | 12/2010 | Amano | | |
| 2011/0304921 A1 | 12/2011 | Nagahara | | |
| 2013/0314800 A1 | 11/2013 | Amano | | |

FOREIGN PATENT DOCUMENTS

| | | |
|---|---|---|
| JP | 2008-046259 | 2/2008 |
| JP | 2009-128684 | 6/2009 |
| JP | 2010-261976 | 11/2010 |
| JP | 2010-282147 | 12/2010 |
| JP | 2010-282159 | 12/2010 |
| JP | 2012-022310 | 2/2012 |
| WO | 2012114756 | 8/2012 |

* cited by examiner

FIG.1
EXAMPLE 1
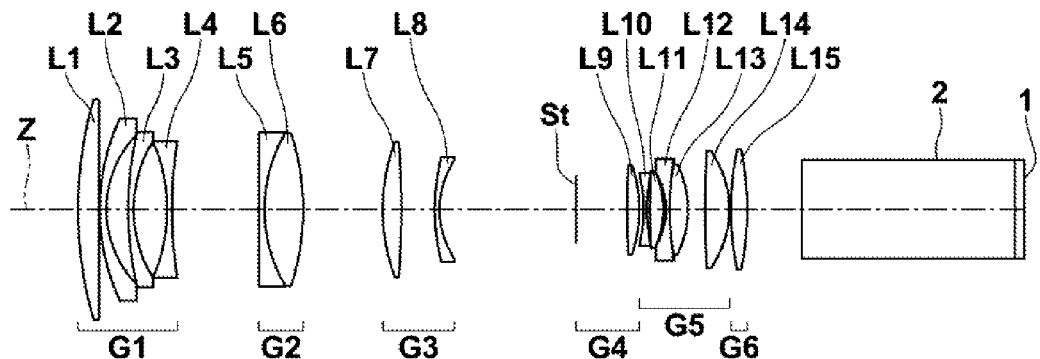
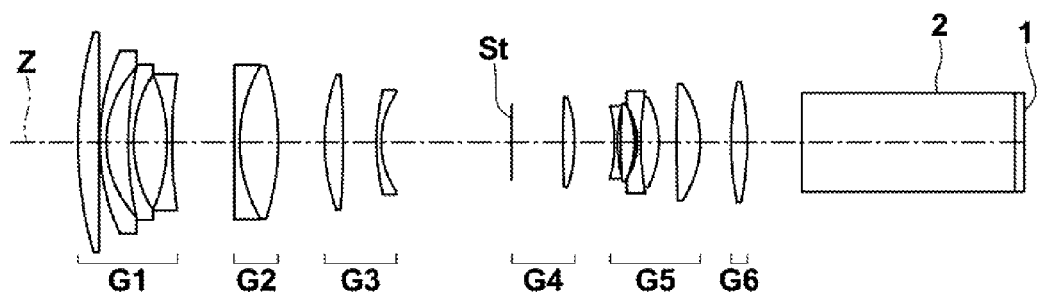
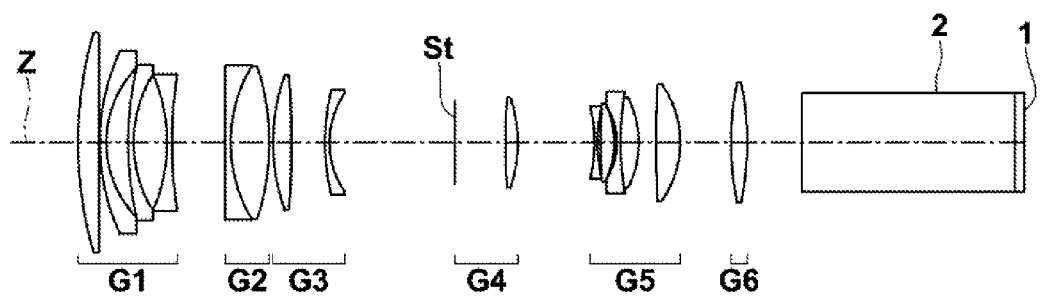

FIG.5
EXAMPLE 5
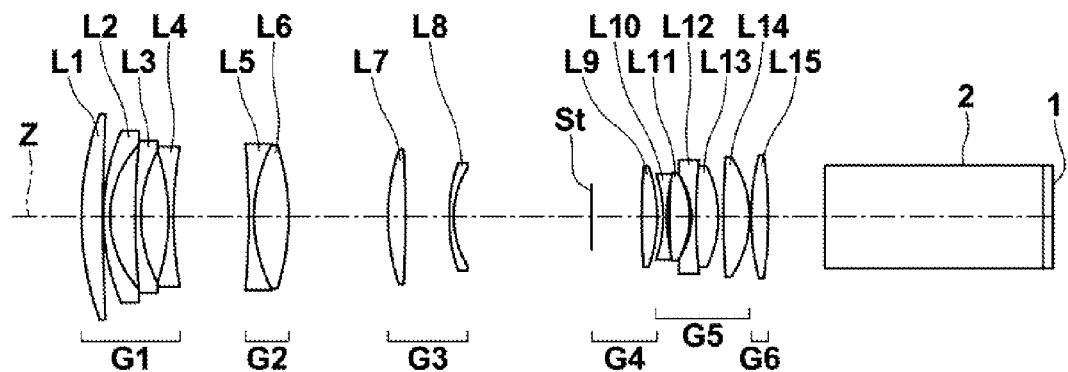
WIDE ANGLE END
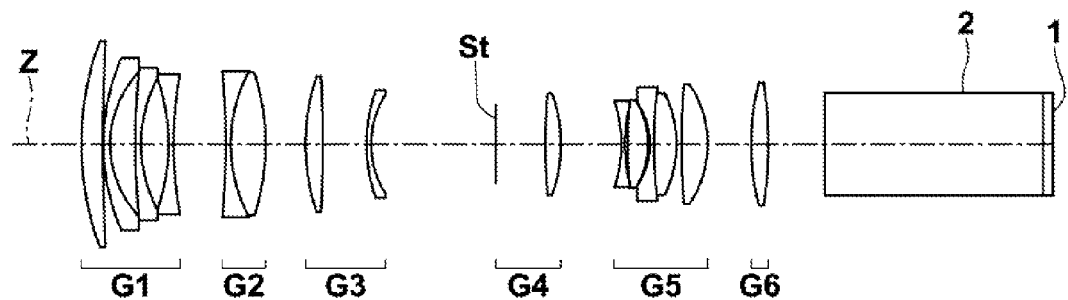
INTERMEDIATE POSITION
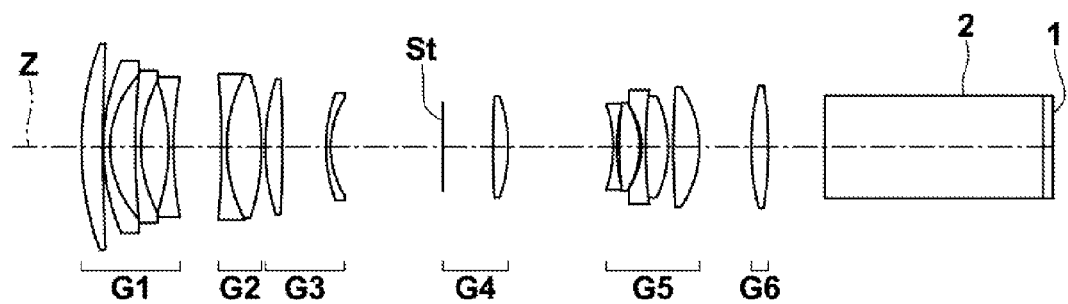
TELEPHOTO END

FIG.6
EXAMPLE 6
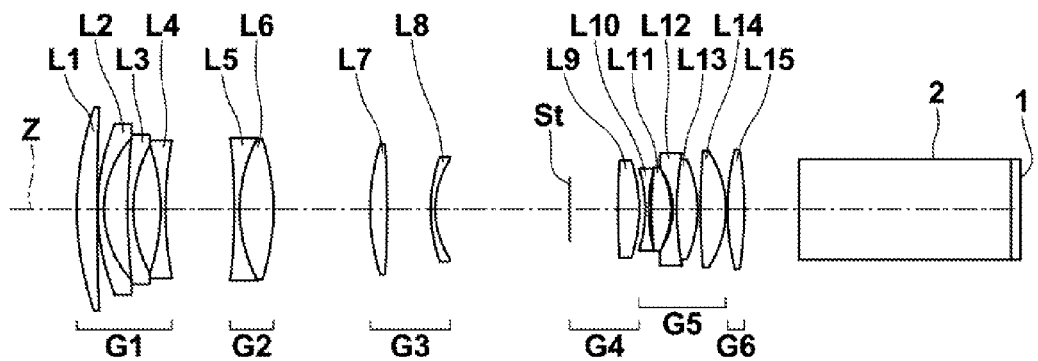
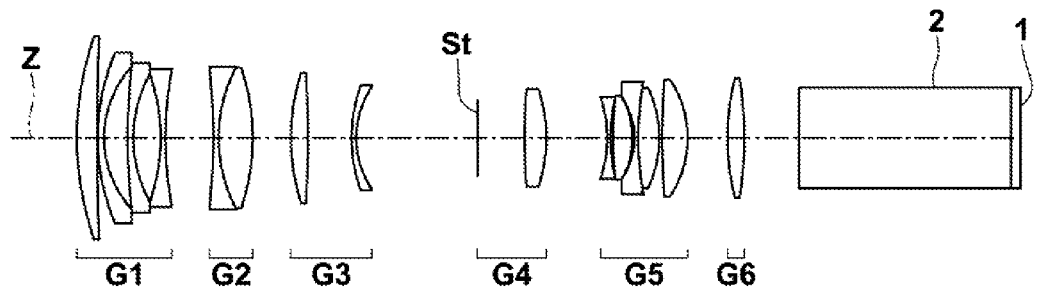
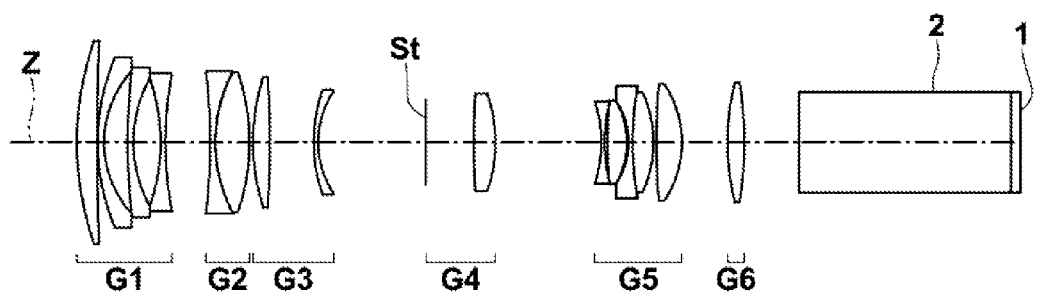

FIG.9
← MAGNIFICATION SIDE     EXAMPLE 9     REDUCTION SIDE →
WIDE ANGLE END
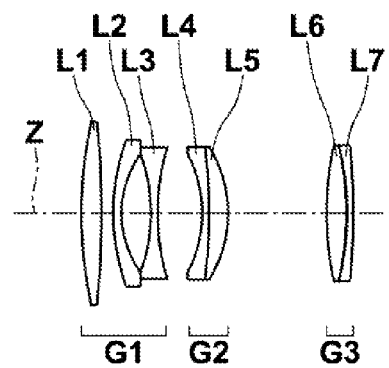
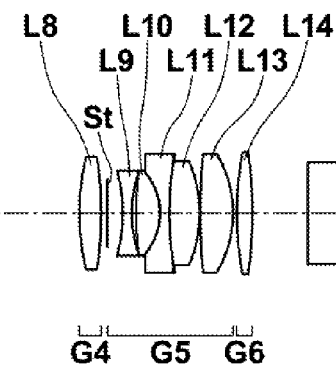
INTERMEDIATE POSITION
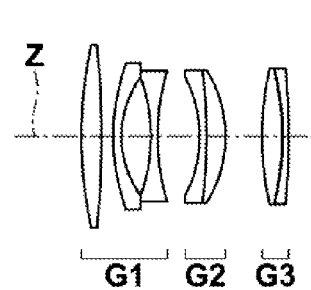
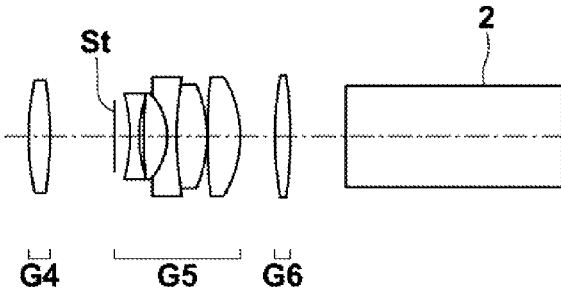
TELEPHOTO END
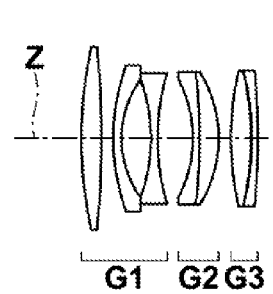
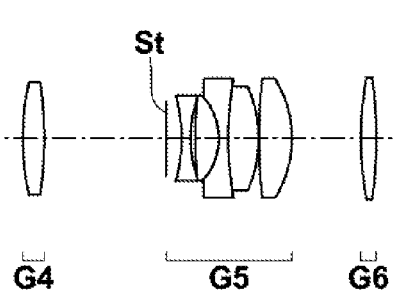

FIG.10
EXAMPLE 10
← MAGNIFICATION SIDE       REDUCTION SIDE →
WIDE ANGLE END
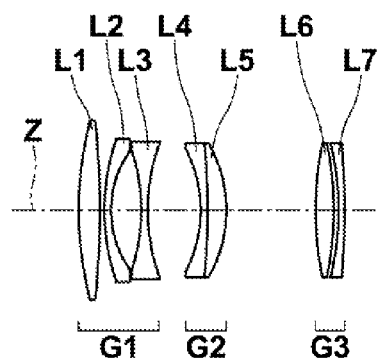
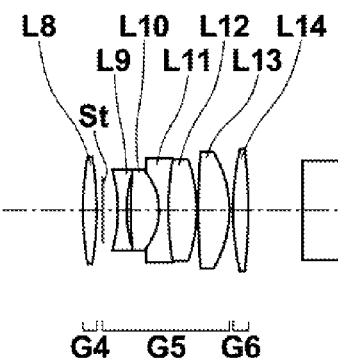
INTERMEDIATE POSITION
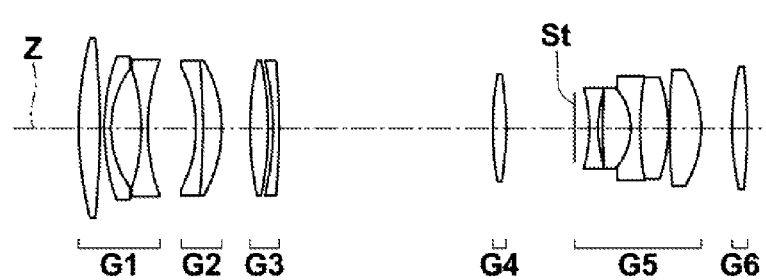
TELEPHOTO END
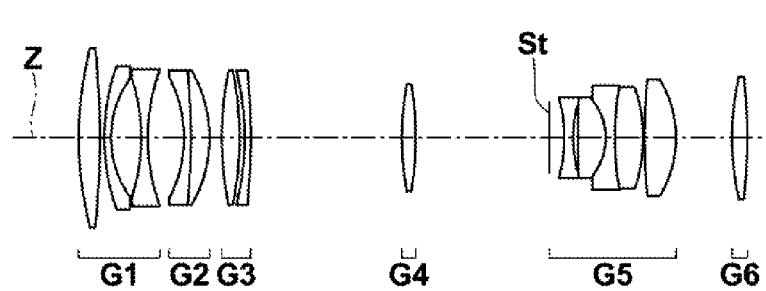

FIG.14
EXAMPLE 14
← MAGNIFICATION SIDE  REDUCTION SIDE →
WIDE ANGLE END
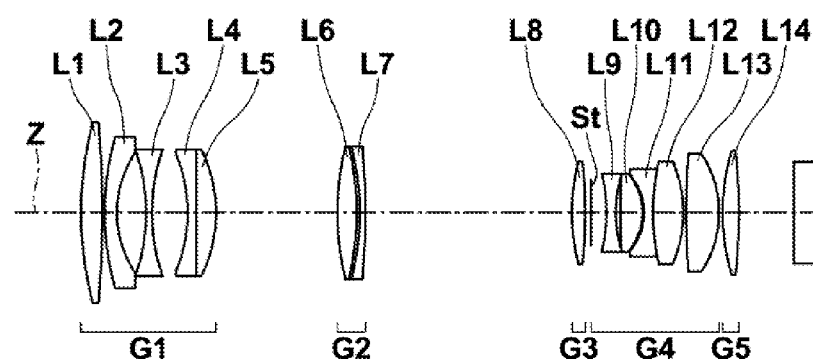
INTERMEDIATE POSITION
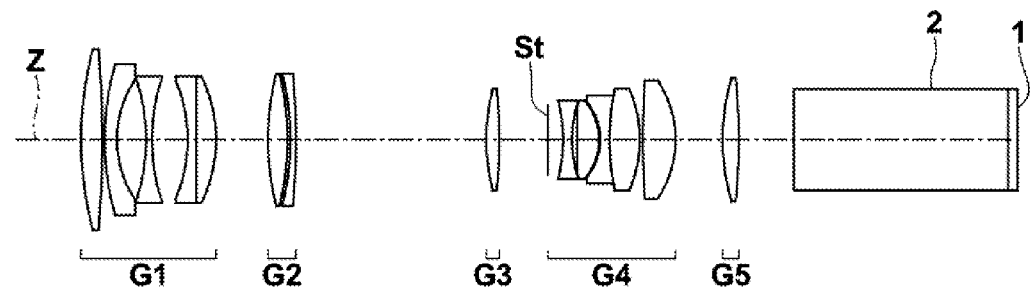
TELEPHOTO END
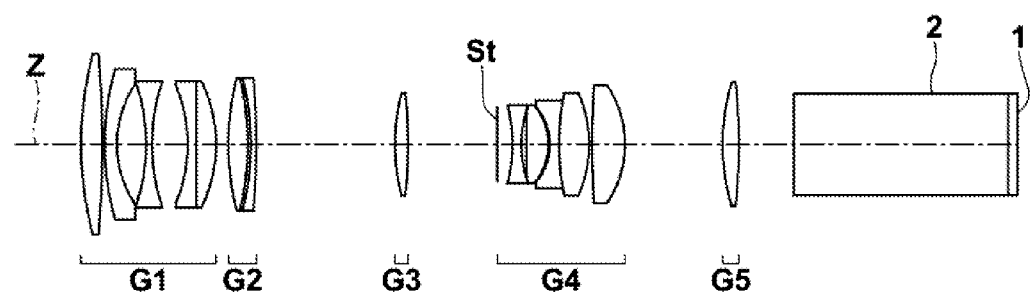

FIG.16
EXAMPLE 16
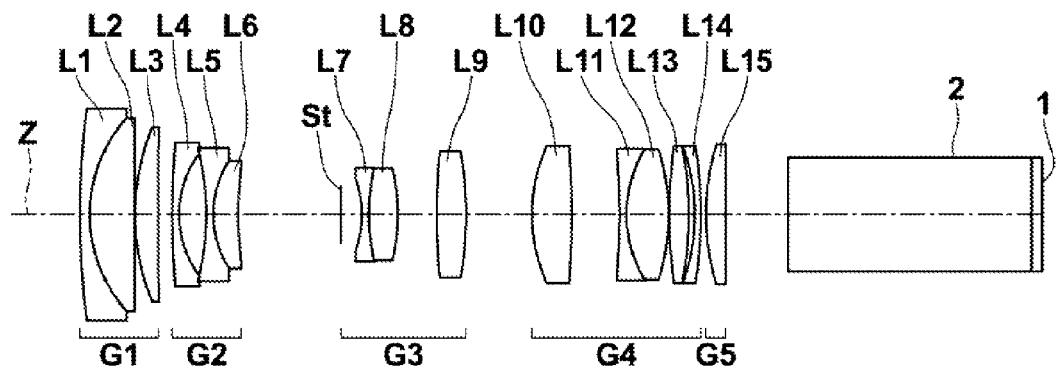
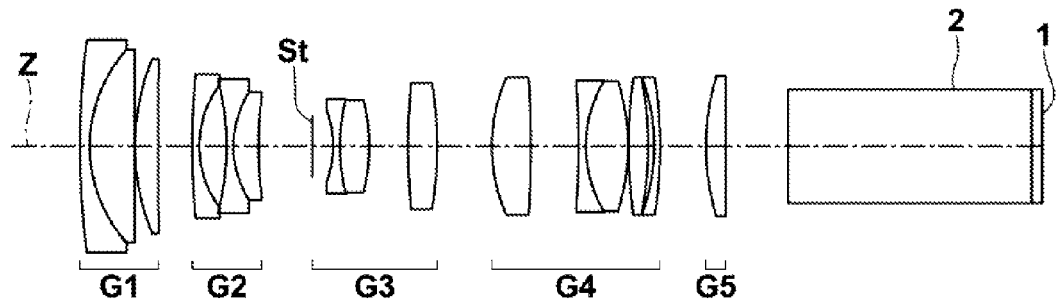
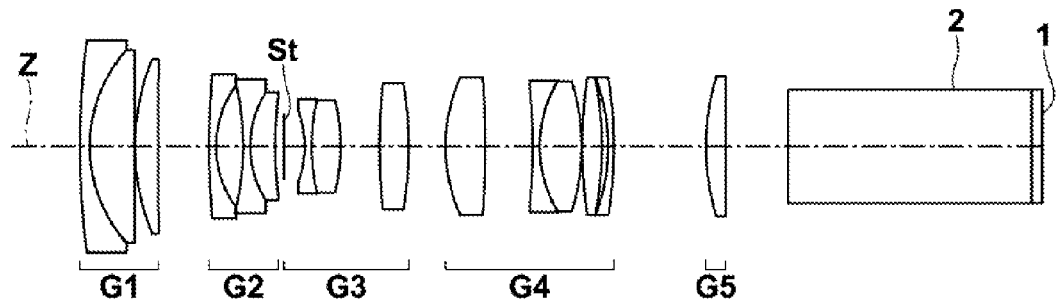

FIG.18
EXAMPLE 18
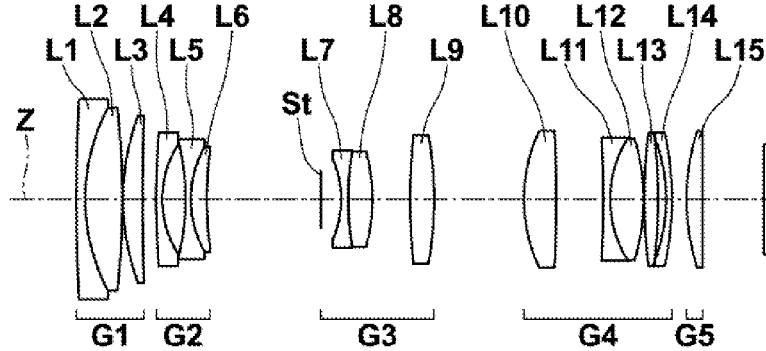
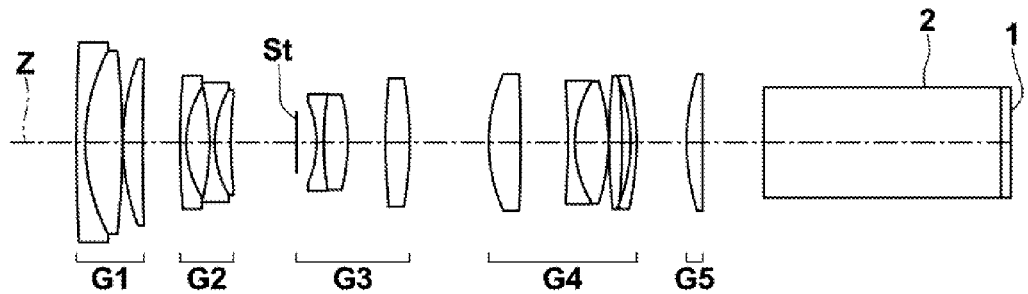
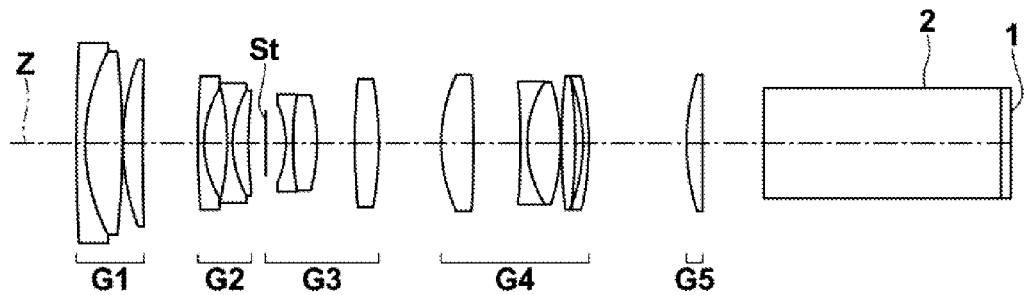

FIG.19
EXAMPLE 1
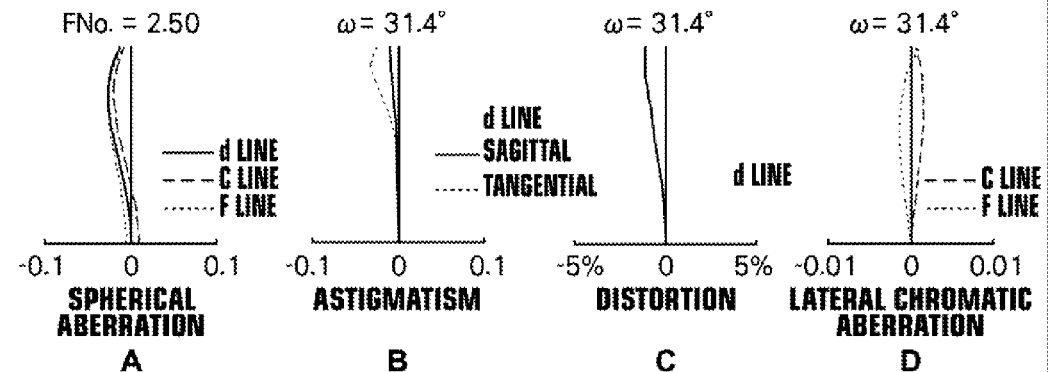
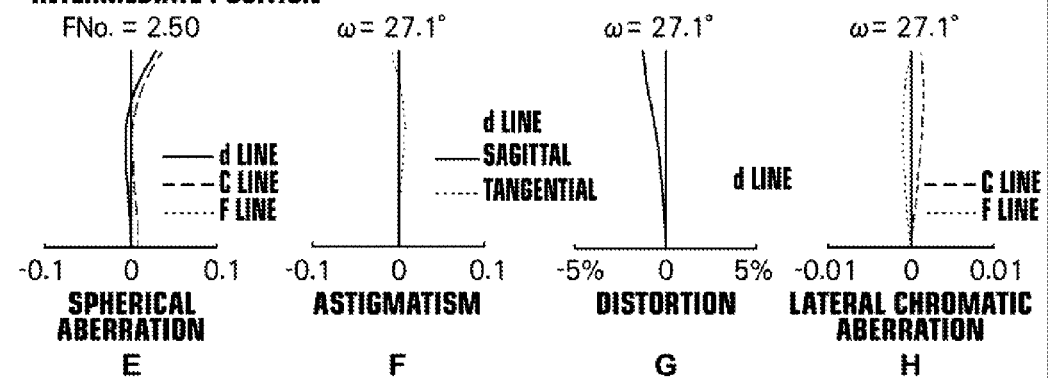
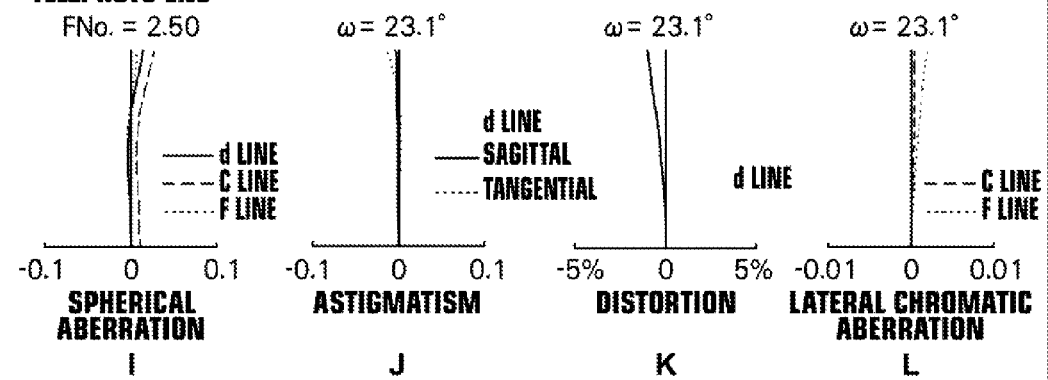

FIG.21
EXAMPLE 3
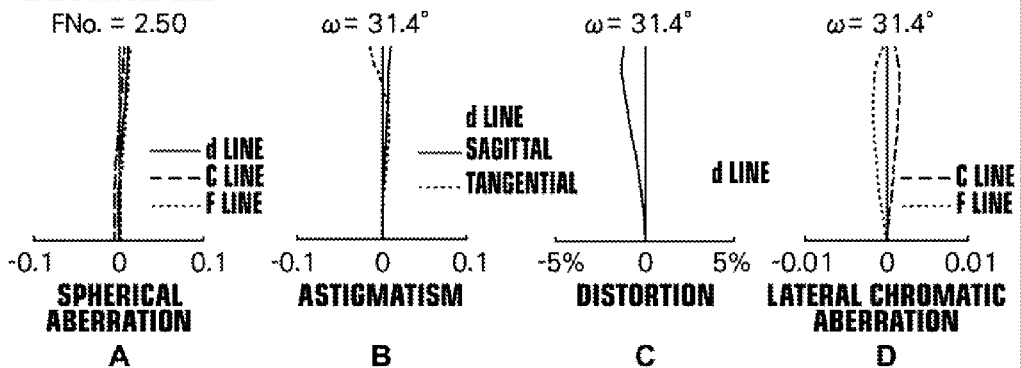
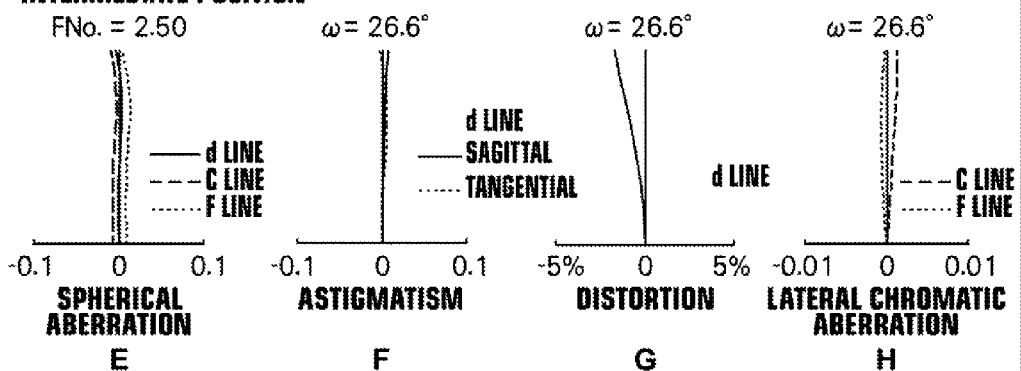
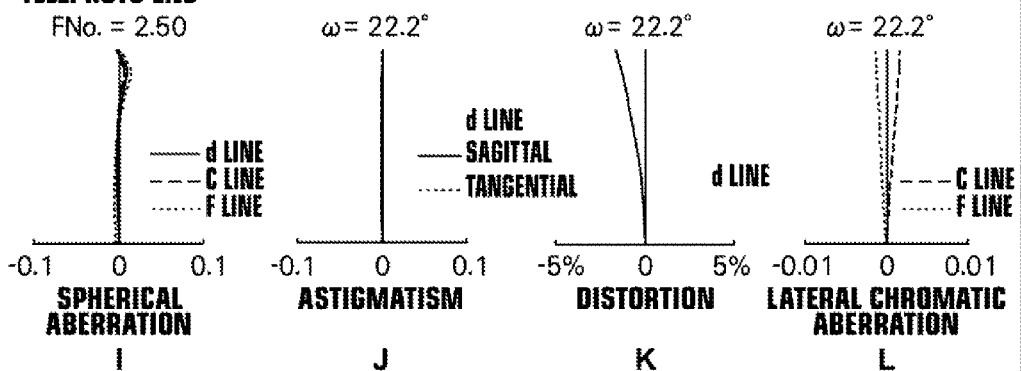

FIG.22
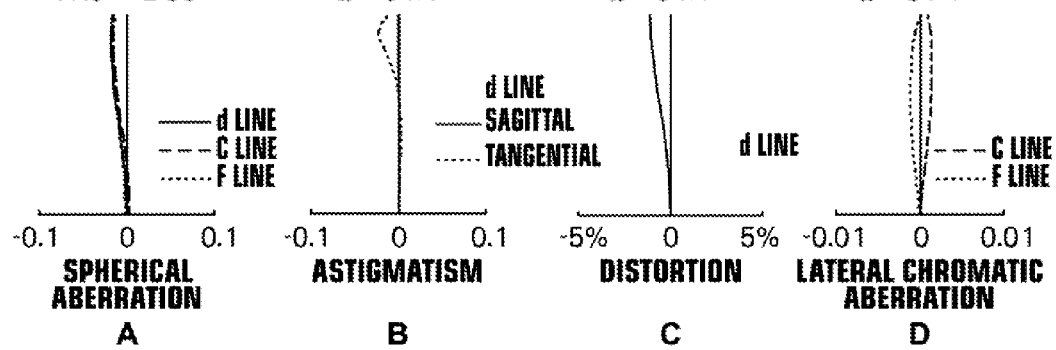
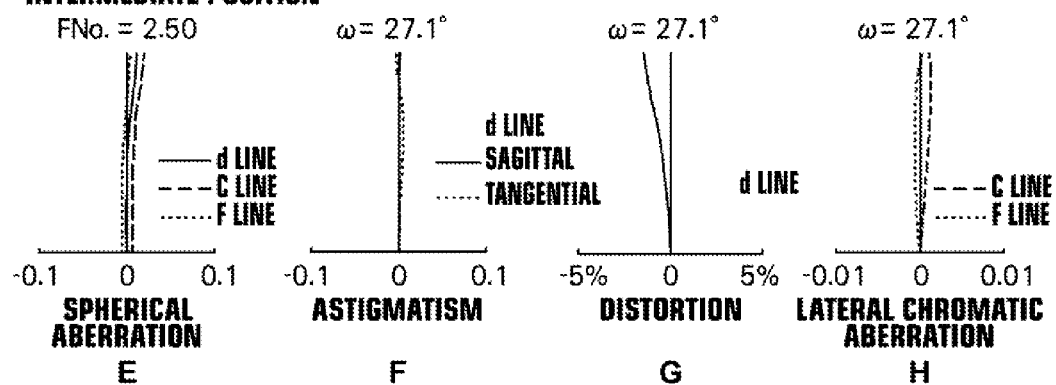
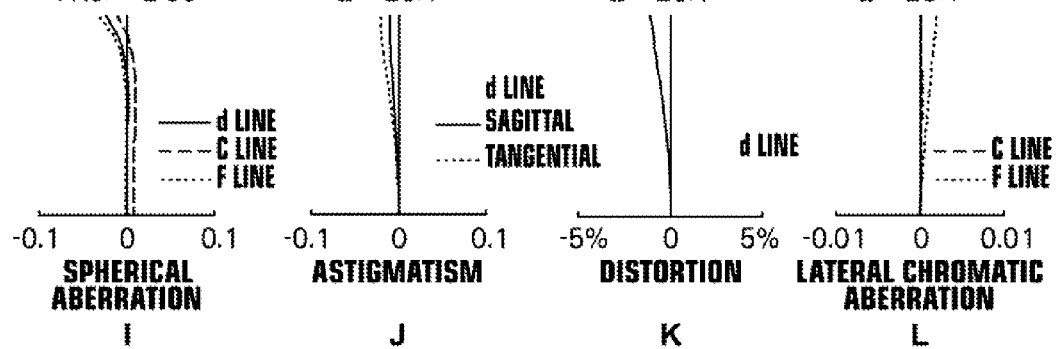

FIG.23
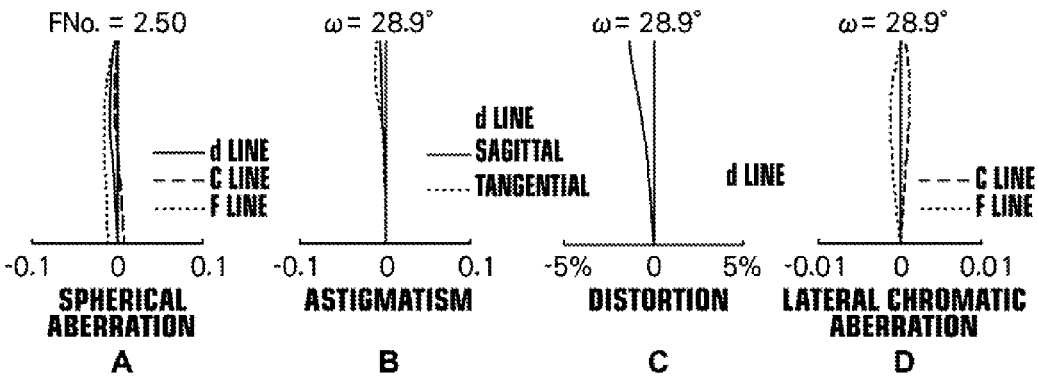
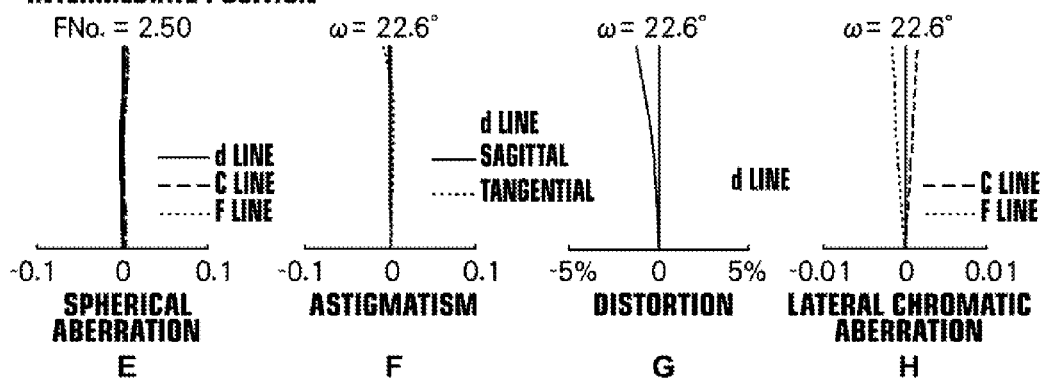
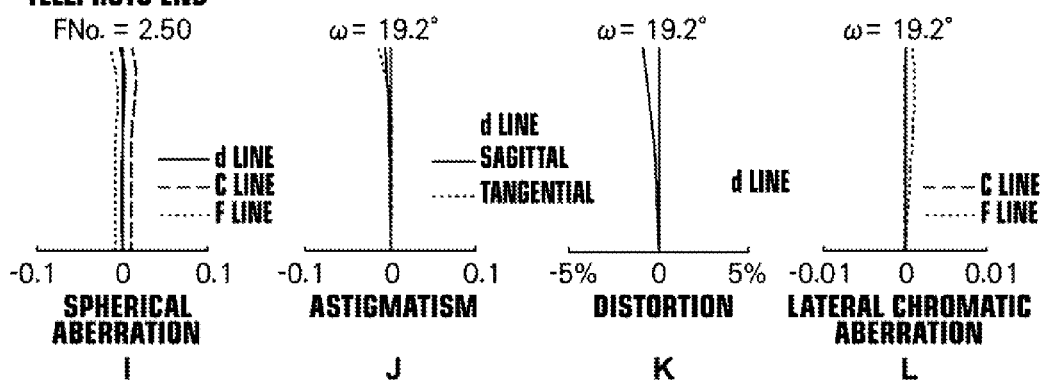

FIG.24
EXAMPLE 6
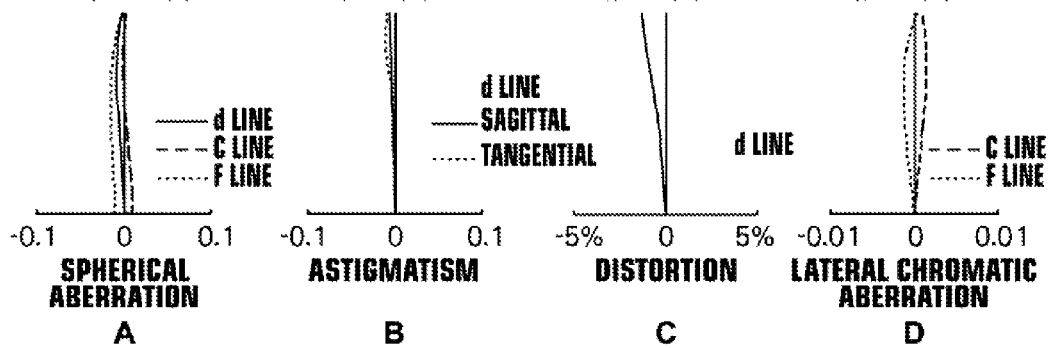
WIDE ANGLE END
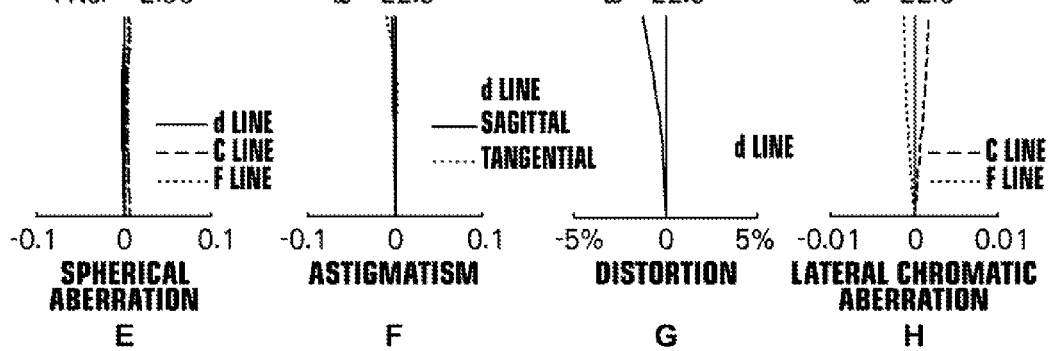
INTERMEDIATE POSITION
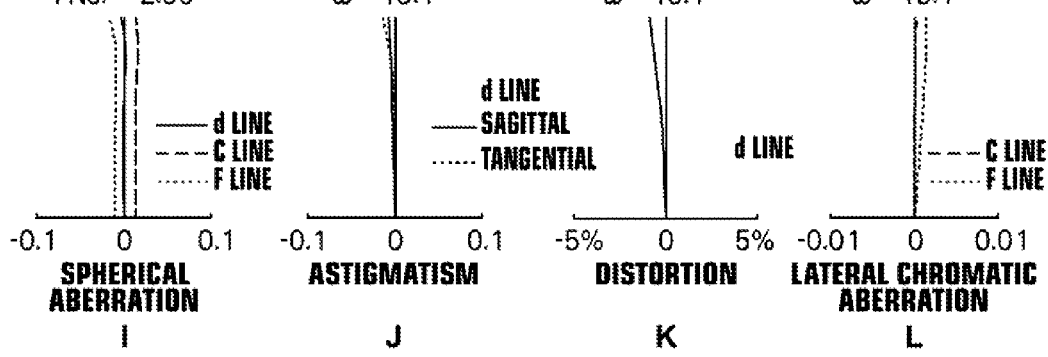
TELEPHOTO END

FIG.25
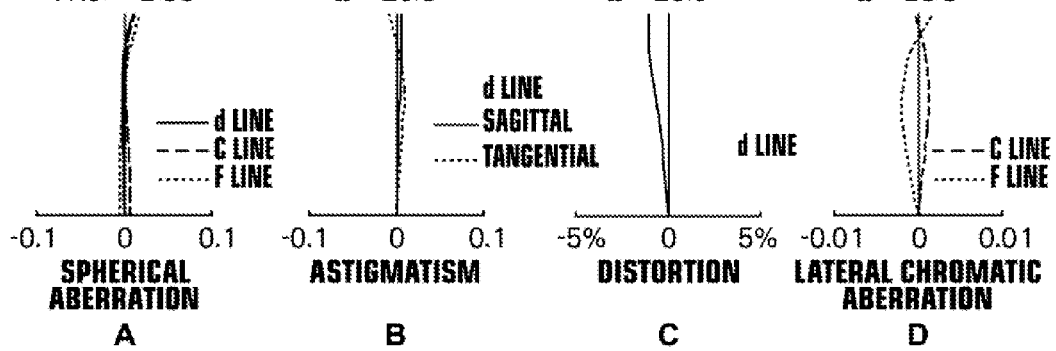
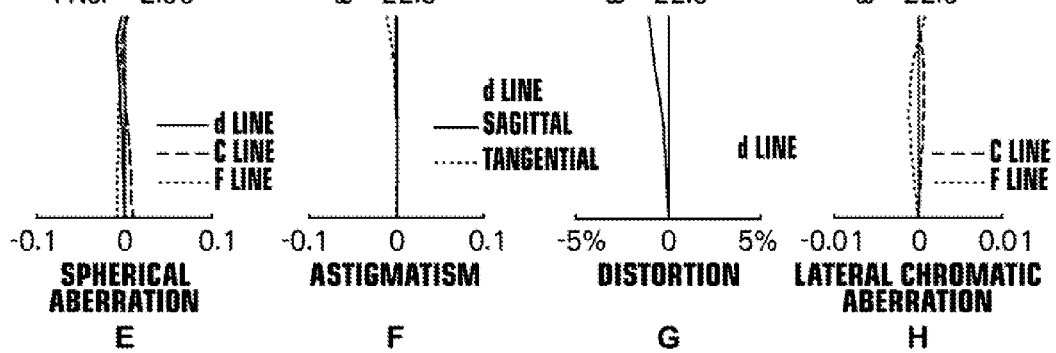
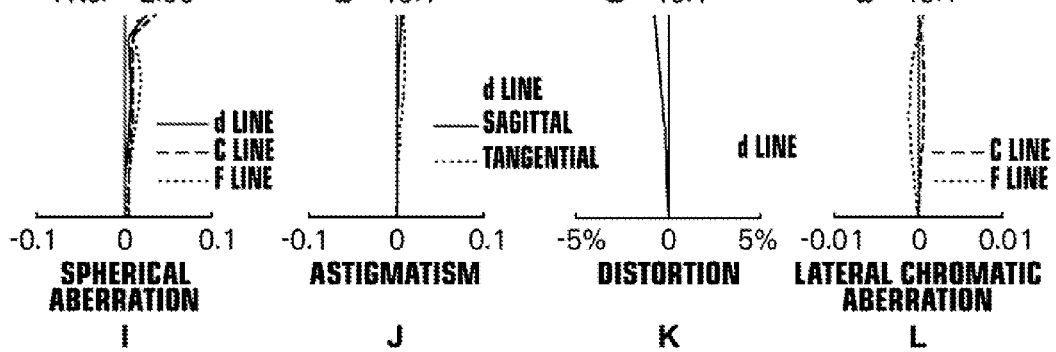

FIG.26
EXAMPLE 8
WIDE ANGLE END
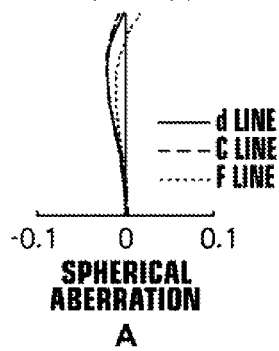
A
SPHERICAL ABERRATION
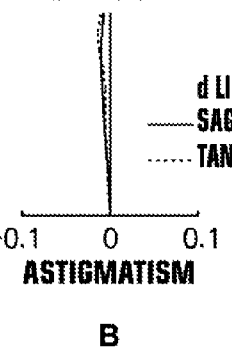
B
ASTIGMATISM
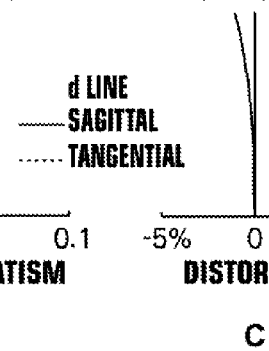
C
DISTORTION
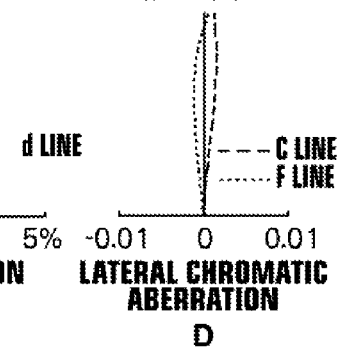
D
LATERAL CHROMATIC ABERRATION
INTERMEDIATE POSITION
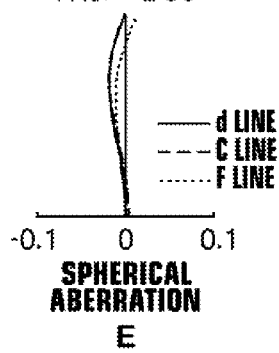
E
SPHERICAL ABERRATION
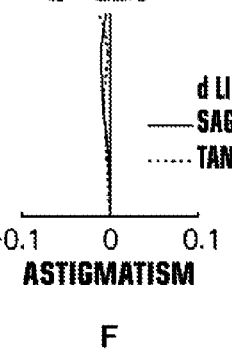
F
ASTIGMATISM
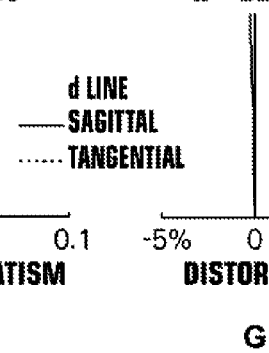
G
DISTORTION
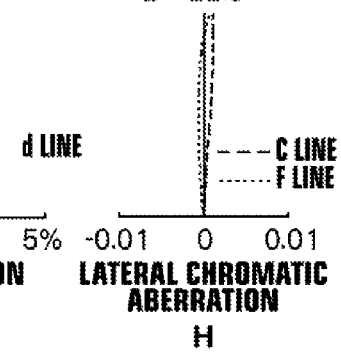
H
LATERAL CHROMATIC ABERRATION
TELEPHOTO END
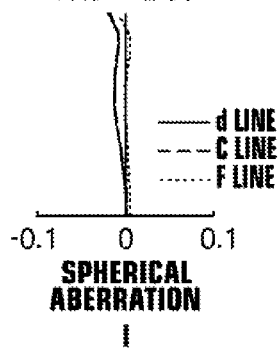
I
SPHERICAL ABERRATION
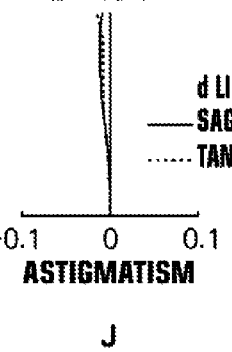
J
ASTIGMATISM
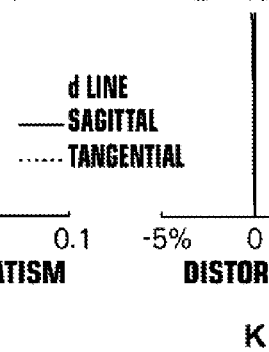
K
DISTORTION
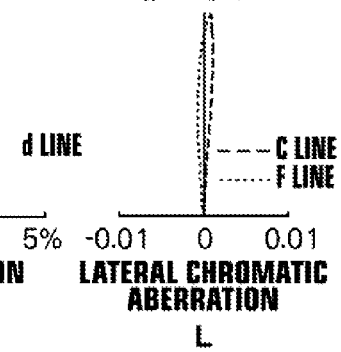
L
LATERAL CHROMATIC ABERRATION

FIG.27

EXAMPLE 9

WIDE ANGLE END

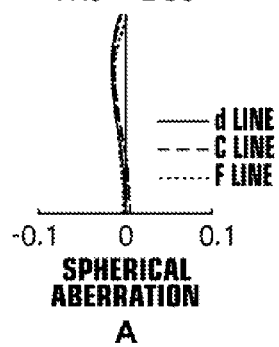
A
SPHERICAL ABERRATION
FNo. = 2.50

B
ASTIGMATISM
ω = 24.3°

C
DISTORTION
ω = 24.3°

D
LATERAL CHROMATIC ABERRATION
ω = 24.3°

INTERMEDIATE POSITION

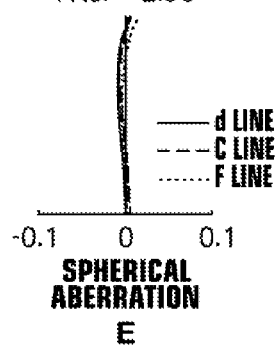
E
SPHERICAL ABERRATION
FNo. = 2.50

F
ASTIGMATISM
ω = 19.1°

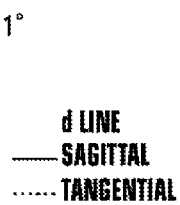
G
DISTORTION
ω = 19.1°

H
LATERAL CHROMATIC ABERRATION
ω = 19.1°

TELEPHOTO END

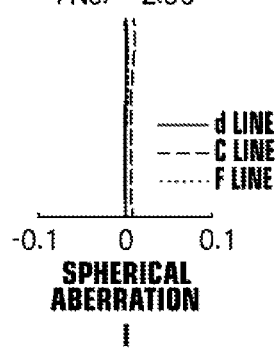
I
SPHERICAL ABERRATION
FNo. = 2.50

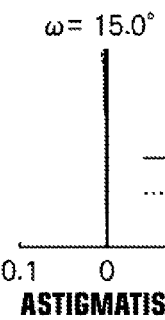
J
ASTIGMATISM
ω = 15.0°

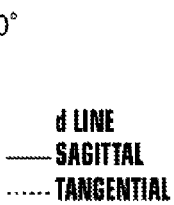
K
DISTORTION
ω = 15.0°

L
LATERAL CHROMATIC ABERRATION
ω = 15.0°

FIG.28
EXAMPLE 10
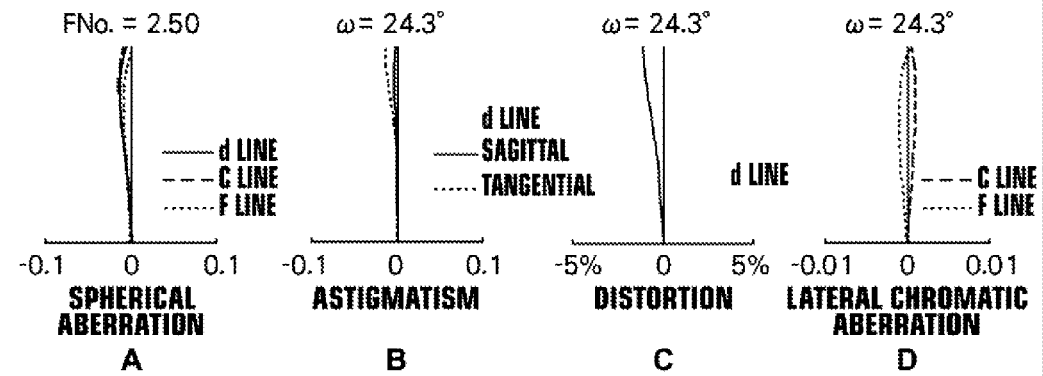
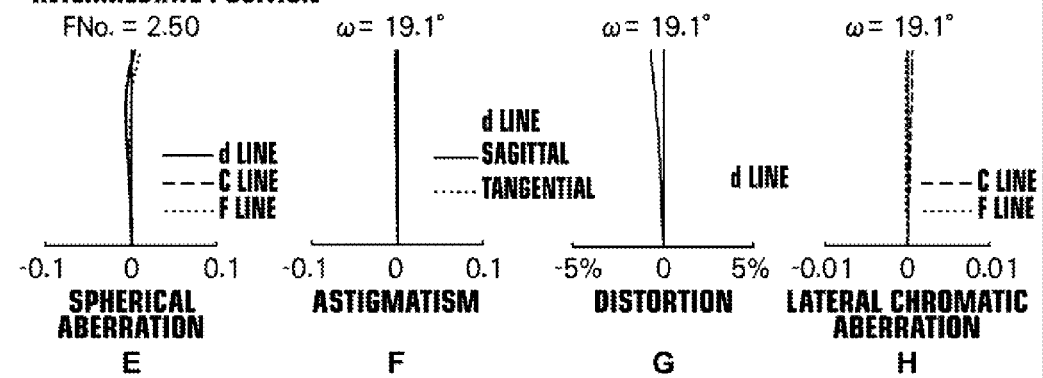
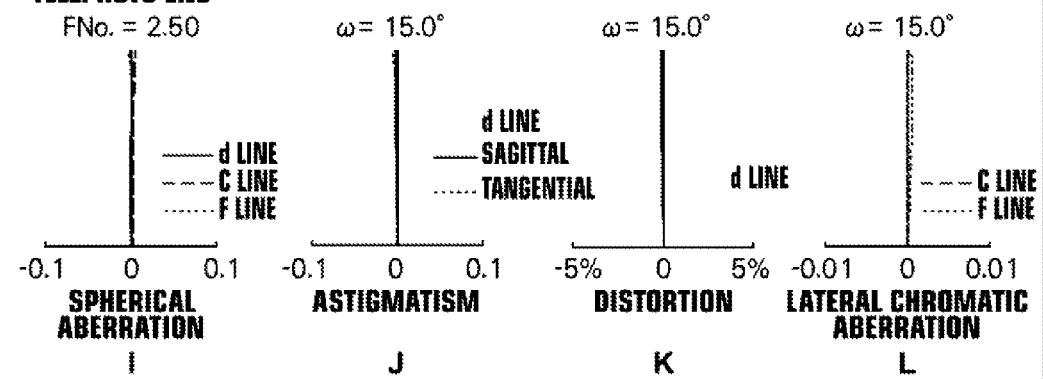

FIG.29

EXAMPLE 11

WIDE ANGLE END

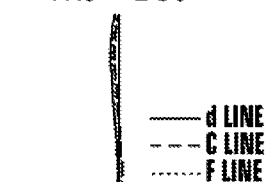
FNo. = 2.50
d LINE / C LINE / F LINE
-0.1  0  0.1
SPHERICAL ABERRATION
A

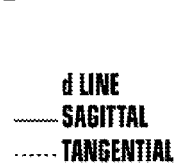
ω= 23.2°
d LINE
SAGITTAL
TANGENTIAL
-0.1  0  0.1
ASTIGMATISM
B

ω= 23.2°
d LINE
-5%  0  5%
DISTORTION
C

ω= 23.2°
C LINE / F LINE
-0.01  0  0.01
LATERAL CHROMATIC ABERRATION
D

INTERMEDIATE POSITION

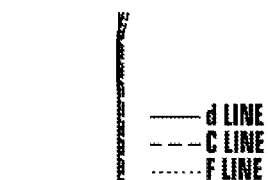
FNo. = 2.50
d LINE / C LINE / F LINE
-0.1  0  0.1
SPHERICAL ABERRATION
E

ω= 18.3°
d LINE
SAGITTAL
TANGENTIAL
-0.1  0  0.1
ASTIGMATISM
F

ω= 18.3°
d LINE
-5%  0  5%
DISTORTION
G

ω= 18.3°
C LINE / F LINE
-0.01  0  0.01
LATERAL CHROMATIC ABERRATION
H

TELEPHOTO END

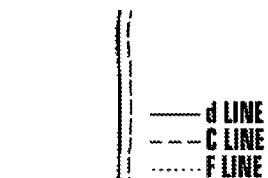
FNo. = 2.50
d LINE / C LINE / F LINE
-0.1  0  0.1
SPHERICAL ABERRATION
I

ω= 14.5°
d LINE
SAGITTAL
TANGENTIAL
-0.1  0  0.1
ASTIGMATISM
J

ω= 14.5°
d LINE
-5%  0  5%
DISTORTION
K

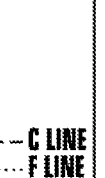
ω= 14.5°
C LINE / F LINE
-0.01  0  0.01
LATERAL CHROMATIC ABERRATION
L

FIG.30
EXAMPLE 12
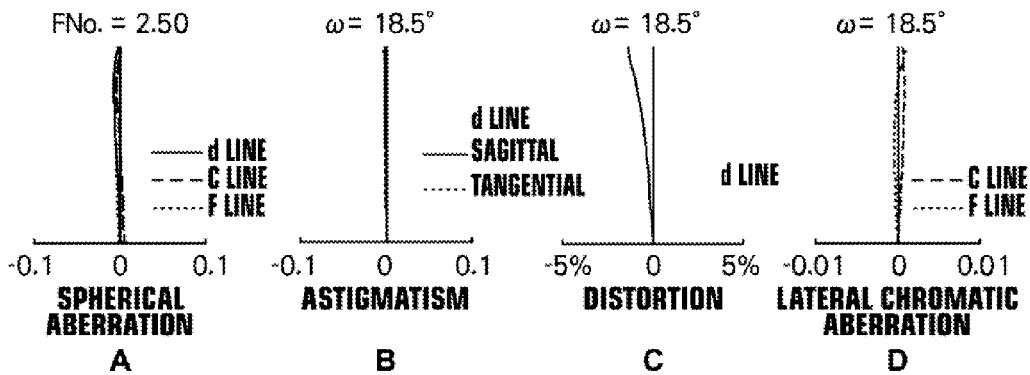
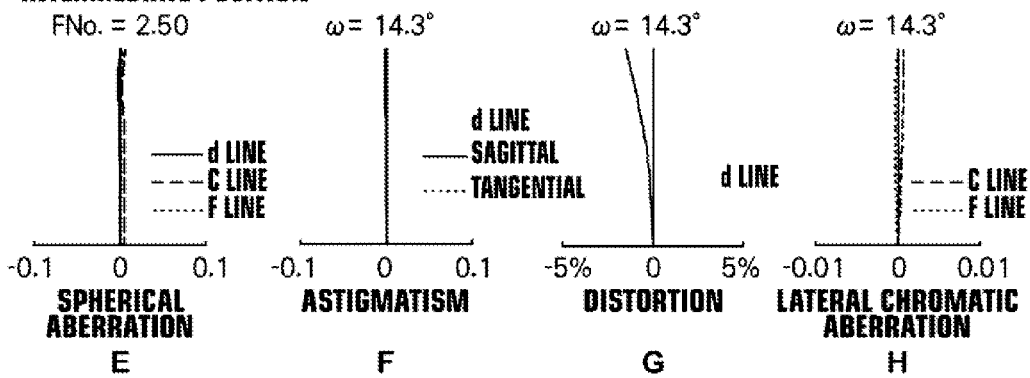
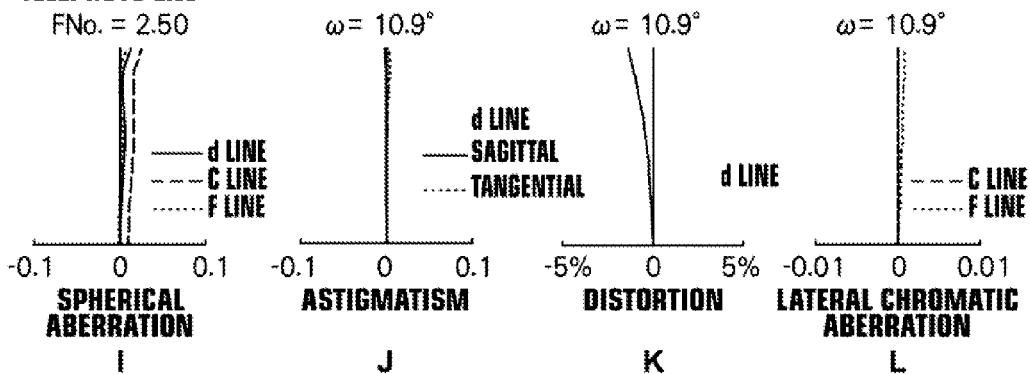

FIG.31
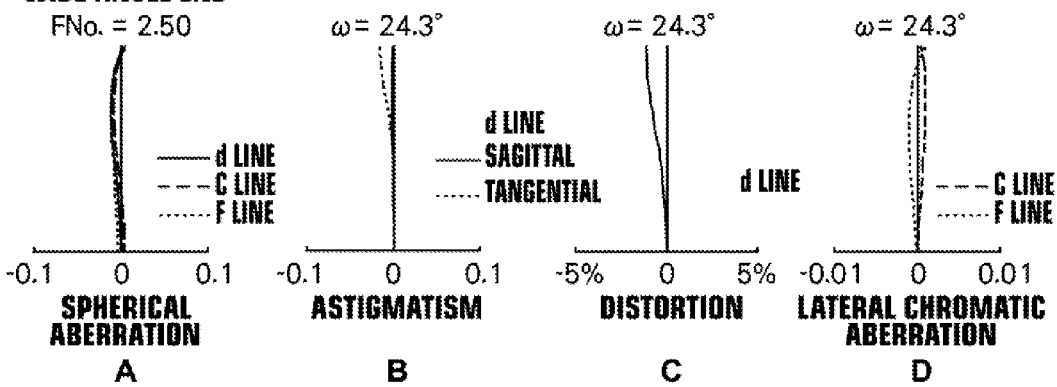
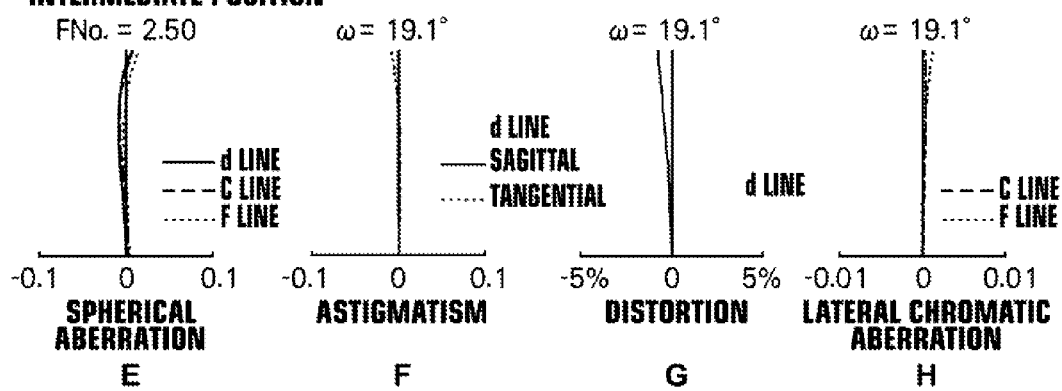
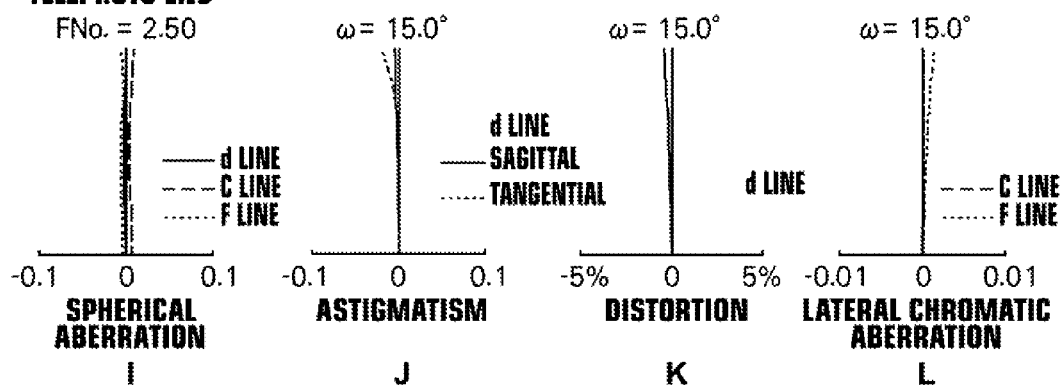

FIG.32
EXAMPLE 14
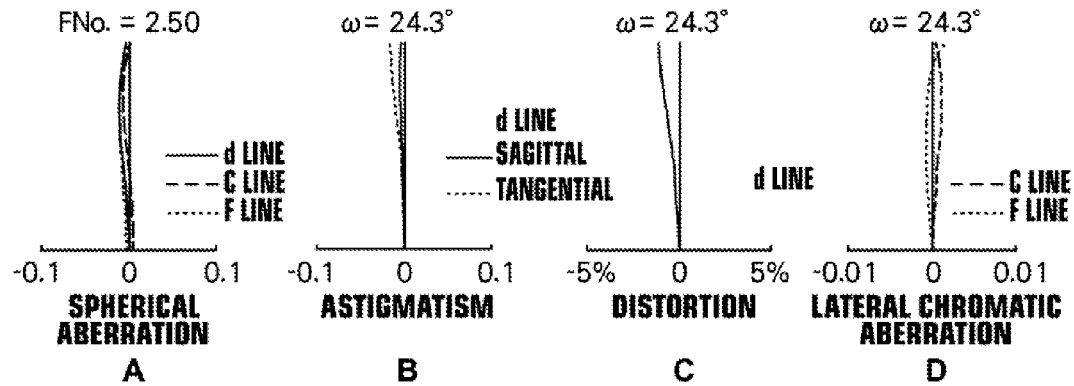
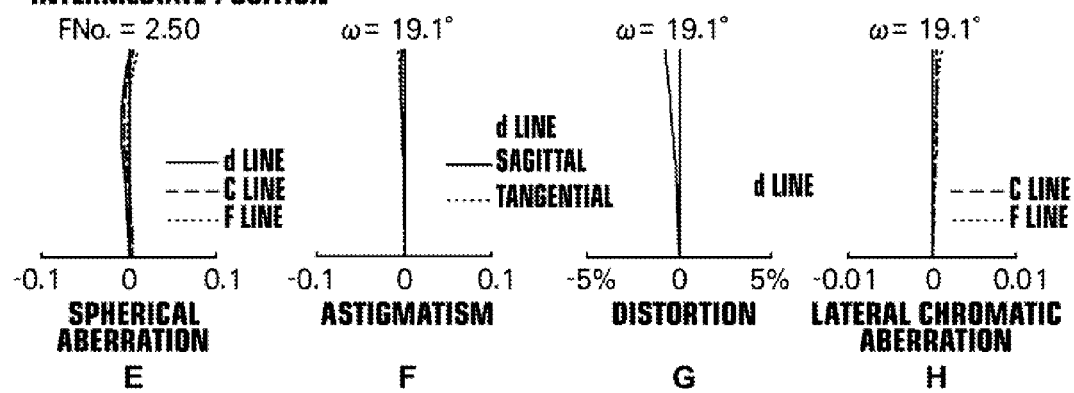
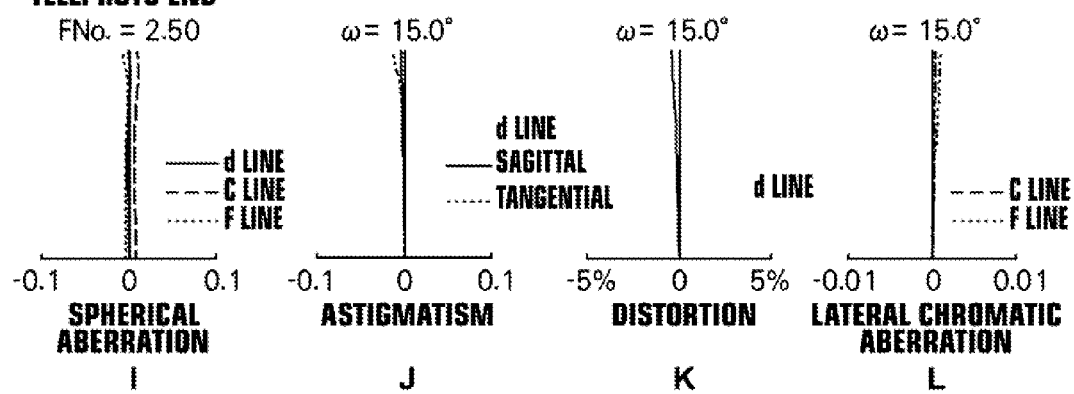

FIG.33
EXAMPLE 15
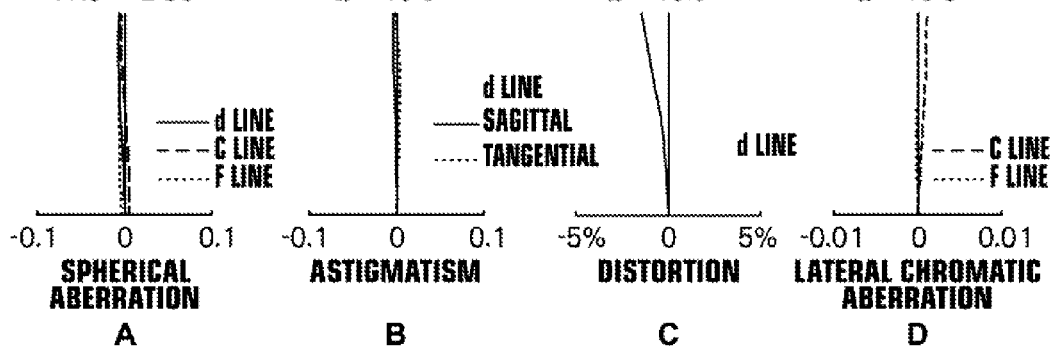
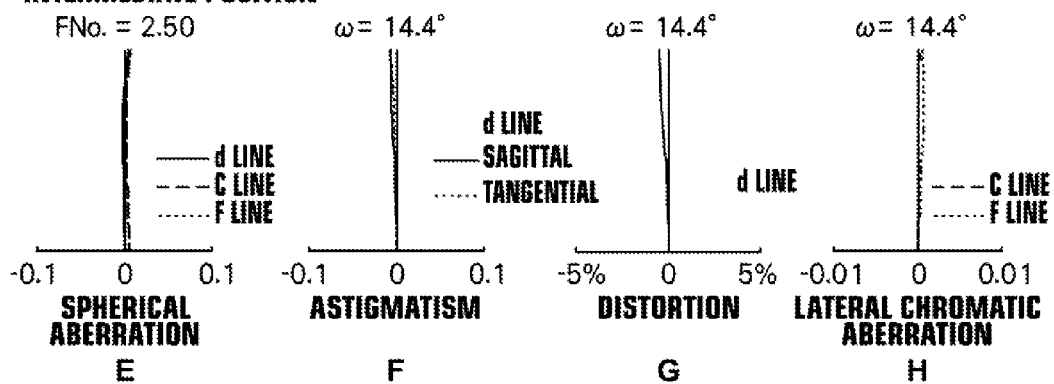
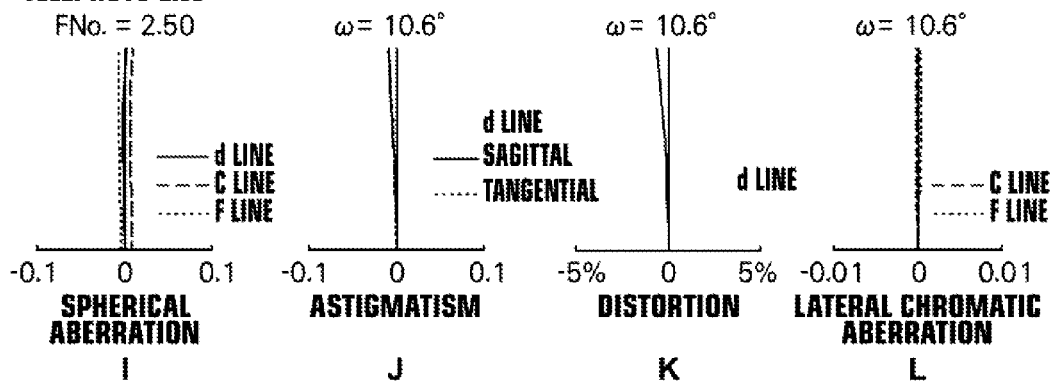

FIG.34
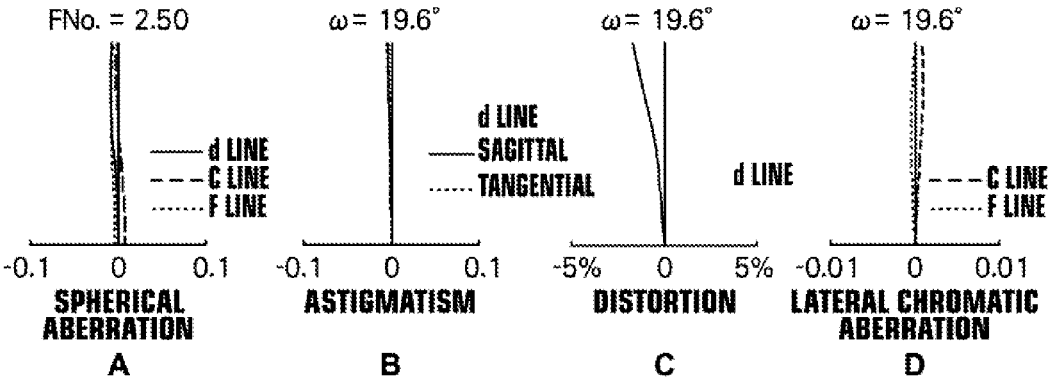
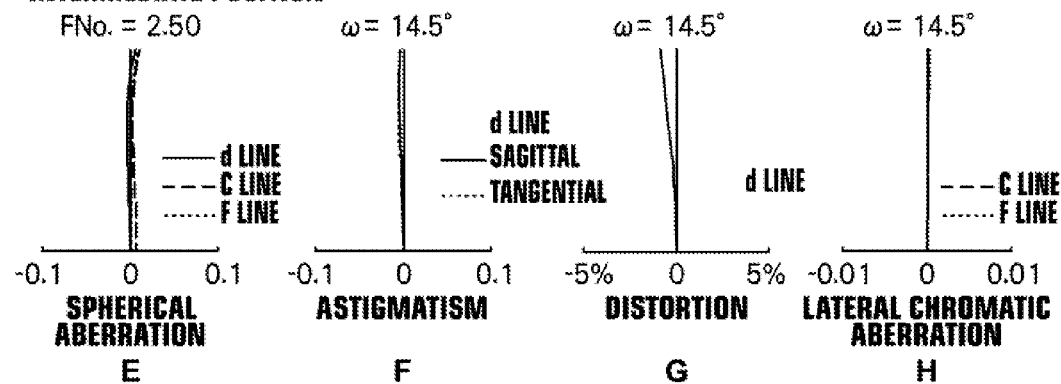
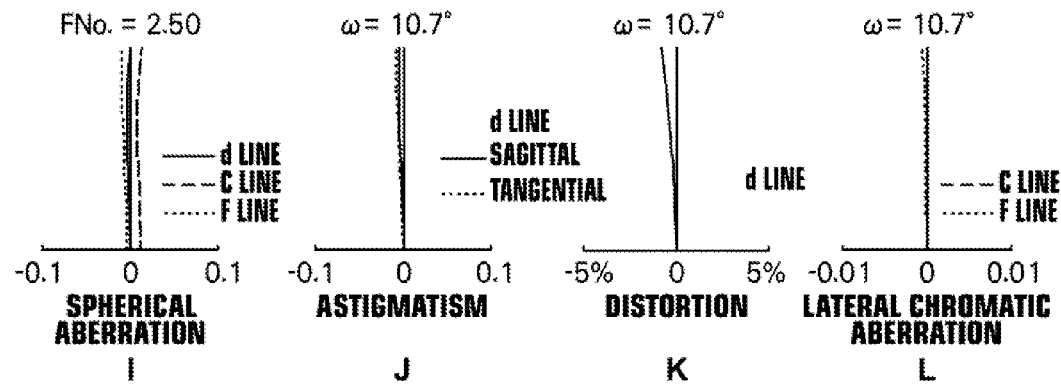

FIG.35
EXAMPLE 17
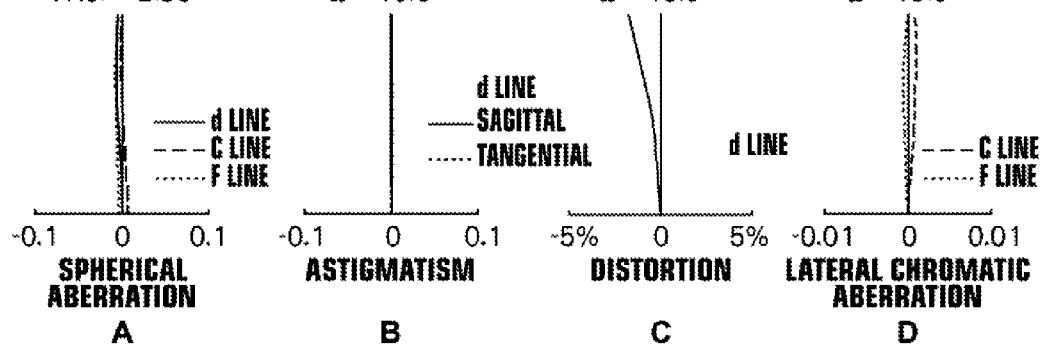
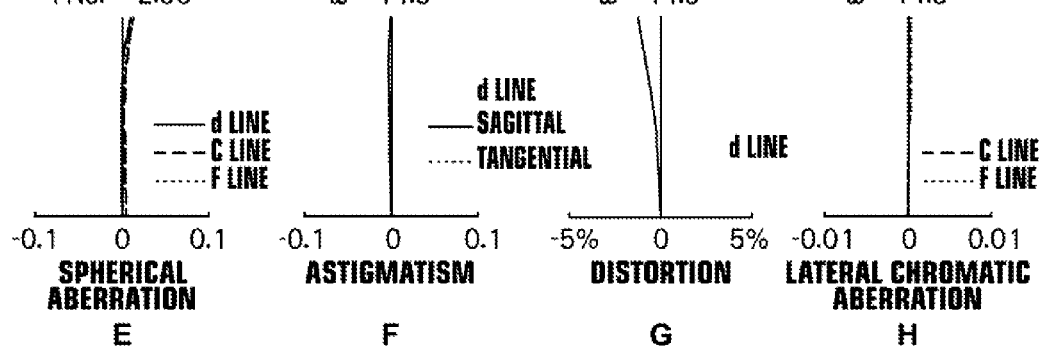
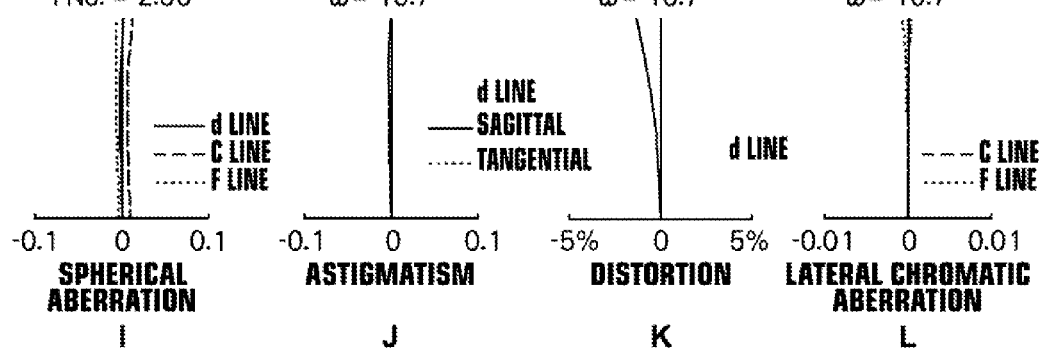

FIG.36
EXAMPLE 18
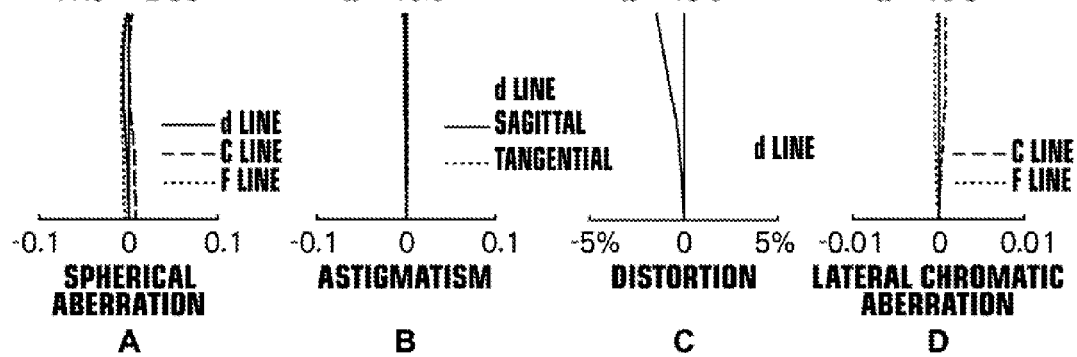
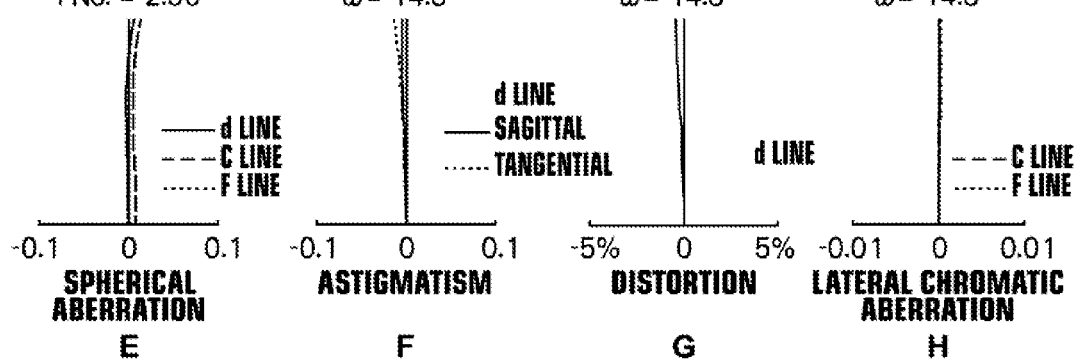
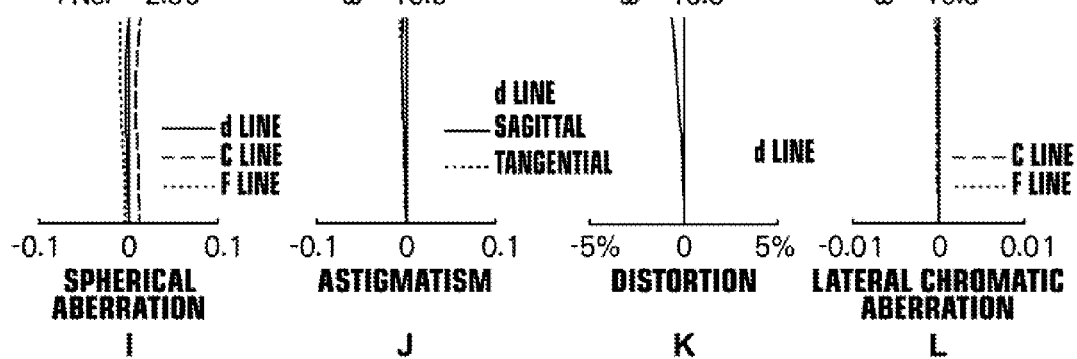

ated Application No. PCT/JP2013/006613 filed on Nov.
PROJECTION ZOOM LENS AND PROJECTION TYPE DISPLAY DEVICE

CROSS REFERENCE TO RELATED APPLICATIONS

The present application is a Continuation of PCT International Application No. PCT/JP2013/006613 filed on Nov. 11, 2013, which claims priority under 35 U.S.C. §119(a) to Japanese Patent Application No. 2012-253315 filed on Nov. 19, 2012. Each of the above applications is hereby expressly incorporated by reference in its entirety, into the present application.

BACKGROUND OF THE INVENTION

Technical Field

The present invention is related to a projection zoom lens, and particularly to a projection zoom lens for use in a projection type display device.

In addition, the present invention is related to a projection type display device equipped with a projection zoom lens.

Background Art

Conventionally, projection type display devices that utilize light valves, such as liquid crystal display elements, DMD's (Digital Micromirror Devices: registered trademark), etc., are in wide use. In addition, projection type display devices which are capable of displaying higher resolution images applicable to large screens are also being utilized recently, in cinema theaters and the like.

The three plate method, in which three light valves are provided, each for a primary color, a light beam from a light source is separated into three primary colors with a color separating optical system, combined by a color combining optical system after passing through each of the light valves, and then projected, is adopted in the aforementioned projection type display devices which are utilized in cinema theaters and the like. Therefore, there is demand for a long back focus and favorably telecentric properties in such projection type display devices.

In addition, zoom lenses having high zoom ratios are desired as projection lenses in projection type display apparatuses which are provided for use in cinema theaters and the like, so as to be compatible with projection distances and screen sizes which differ in each theater and each hall, and further the aspect ratio (cinema scope size, vista size, etc.) of displayed images, in order to match the sizes of displayed images with screen sizes.

There is also often demand for the numerical aperture (hereinafter, also referred to as "F number") of these types of zoom lenses to be maintained constant throughout the entire magnification range, in order to prevent the brightness of displayed images from changing when magnification is changed in these projection zoom lenses in order to match the sizes of displayed images with screen sizes.

Further, projection type display apparatuses are becoming compact and available at low cost, accompanying the digitization of cinema screens. There is a tendency for miniaturization and cost reduction to be desired in projection zoom lenses, in addition to the aforementioned demand for back focus, telecentric properties, and high zoom ratios.

Japanese Unexamined Patent Publication Nos. 2006-184723, 2005-106948, and 2008-046259 disclose zoom lenses which are presumed to be applied to projection type display apparatuses. More specifically, Japanese Unexamined Patent Publication No. 2006-184723 discloses a projection zoom lens having a six group configuration that includes a first lens group having a negative refractive power provided at the most magnification side and a final lens group having a positive refractive power provided at the most reduction side, which are fixed when changing magnification. An aperture stop is provided in a fourth lens group in this zoom lens. Meanwhile, Japanese Unexamined Patent Publication No. 2005-106948 discloses a projection zoom lens that maintains a constant numerical aperture, by configuring lens groups toward the reduction side of an aperture stop to not move while changing magnification. In addition, Japanese Unexamined Patent Publication No. 2008-046259 discloses a projection zoom lens that includes a first lens group having a negative refractive power provided at the most magnification side and a final lens group having a positive refractive power provided at the most reduction side, which are fixed when changing magnification. The numerical aperture of this projection zoom lens is maintained constant throughout the entire magnification range, by a variable stop, of which the aperture diameter varies accompanying changes in magnification, being employed.

DISCLOSURE OF THE INVENTION

However, the projection zoom lens disclosed in Japanese Unexamined Patent Publication No. 2006-184723 is not equipped with a mechanism for maintaining the numerical aperture constant while changing magnification. In addition, the back focus of this projection zoom lens is short.

Meanwhile, it cannot be said that the projection zoom lens disclosed in Japanese Unexamined Patent Publication No. 2005-106948, which maintains a constant numerical aperture while changing magnification by not moving lens groups toward the reduction side of the aperture stop, secures a sufficiently high zoom ratio as a projection zoom lens. In addition, the diameters of lenses toward the magnification side and the total lengths tend to become great in projection zoom lenses having this type of configuration. Therefore, installation conditions will become severe, and costs are likely to increase.

In addition, although the projection zoom lens that maintains a constant numerical aperture by employing the variable stop disclosed in Japanese Unexamined Patent Publication No. 2008-046259 has a high zoom ratio, the back focus of this projection zoom lens is not sufficiently long. Therefore, there is a disadvantage that it is difficult to provide an optical system that includes a prism.

The present invention has been developed in view of the foregoing circumstances. It is an object of the present invention to provide a projection zoom lens that secures a high zoom ratio, is capable of maintaining a constant numerical aperture through the entire magnification range, has a sufficiently long back focus, and achieves a short total length. It is another object of the present invention to provide a projection type display device equipped with such a projection zoom lens.

A projection zoom lens of the present invention includes:

at least two moving lens groups that move while changing magnification; and an aperture stop provided between adjacent moving lens groups or provided within one of the moving lens groups;

the aperture stop being a variable stop, of which the aperture diameter changes such that the numerical aperture of the zoom lens becomes constant through the entire magnification range;

the projection zoom lens being configured such that the reduction side is telecentric; and the projection zoom lens satisfying Conditional Formulae (1) and (2) below:

$$2.5 < Bf/Im\phi \quad (1)$$

$$L/Im\phi < 12 \quad (2)$$

wherein Bf is the back focus (an air converted length) of the entire system at the reduction side at the wide angle end, Im$\phi$ is the maximum effective image circle diameter (image circle diameter) at the reduction side, and L is the distance along the optical axis from the lens surface most toward the magnification side to the lens surface most toward the reduction side when the projection distance is infinity.

Note that the expression "provided within one of the moving lens groups" refers not only to cases in which the aperture stop is provided between the lens most toward the magnification side of the moving lens group and the lens most toward the reduction side of the moving lens group, but also refers to cases in which the aperture stop is provided more toward the magnification side than the lens most toward the magnification side and cases in which the aperture stop is provided more toward the reduction side than the lens most toward the reduction side.

In addition, the expression "the reduction side is telecentric" means that an angular line that bisects the cross section of a light beam focused at an arbitrary point on an image surface at the reduction side between the maximum ray of light at the upper side and the maximum ray of light at the lower side thereof is close to being parallel with the optical axis. The expression "the reduction side is telecentric" is not limited to cases in which the reduction side is completely telecentric, that is, cases in which the bisecting angular line is completely parallel to the optical axis, but also refers to cases in which a certain degree of error is present. Here, the certain degree of error refers to a range of inclination between the bisecting angular line and the optical path of ±3°.

Here, with respect to the condition defined by Conditional Formula (1), it is more desirable for Conditional Formula (1') below to be satisfied.

$$2.8 < NBf/Im\phi \quad (1')$$

In addition, with respect to the condition defined by Conditional Formula (2), it is more desirable for Conditional Formula (2') below to be satisfied.

$$7 < L/Im\phi < 11 \quad (2')$$

In the projection zoom lens of the present invention, it is desirable for a final lens group provided most toward the reduction side to have a positive refractive power and to be fixed while changing magnification, and for Conditional Formula (3) below to be satisfied:

$$2.0 < fe/fw < 7.0 \quad (3)$$

wherein fe is the focal length of the final lens group, and fw is the focal length of the entire system at the wide angle end.

Further, with respect to the condition defined by Conditional Formula (3), it is more desirable for Conditional Formula (3') below to be satisfied.

$$3.0 < fe/fw < 6.0 \quad (3')$$

In addition, in the projection zoom lens of the present invention, it is desirable for a first lens group provided most toward the magnification side to have a negative refractive power and to be fixed while changing magnification, and for the final lens group provided most toward the reduction side to have a positive refractive power and to be fixed while changing magnification.

In addition, it is desirable for the projection zoom lens of the present invention to satisfy Conditional Formula (4) below:

$$-2.0 < f1/fw < -0.8 \quad (4)$$

wherein f1 is the focal length of the first lens group, and fw is the focal length of the entire system at the wide angle end.

Further, with respect to the condition defined by Conditional Formula (4), it is more desirable for Conditional Formula (4') below to be satisfied.

$$-1.8 < f1/fw < -1.0 \quad (4')$$

In addition, it is desirable for the projection zoom lens of the present invention to consist essentially of: a first lens group, which is provided most toward the magnification side, has a negative refractive power, and is fixed while changing magnification; a second lens group, which is positioned at the reduction side after the first lens group, has a positive refractive power, and moves while changing magnification; a third lens group which is positioned at the reduction side after the second lens group, has a positive refractive power, and moves while changing magnification; a final lens group, which is provided most toward the reduction side, has a positive refractive power, and is fixed while changing magnification; and at least one lens group positioned between the final lens group and the third lens group.

Here, the expression "consists essentially of" also refers to cases in which the projection zoom lens includes lenses that substantially do not have any power, optical elements other than lenses such as a stop and a cover glass, and mechanical components such as lens flanges, a lens barrel, an imaging element, and a camera shake correcting mechanism.

In addition, it is desirable for the projection zoom lens of the present invention to satisfy Conditional Formula (5) below:

$$3.0 < f3/fw < 8.0 \quad (5)$$

wherein f3 is the focal length of the third lens group, and fw is the focal length of the entire system at the wide angle end.

In addition, it is desirable for the projection lens of the present invention to satisfy Conditional Formula (6) below:

$$1.4 < Zr \quad (6)$$

wherein Zr is the zoom ratio of the telephoto end with respect to the wide angle end.

In addition, cemented lenses may be employed as the lenses that constitute each of the lens groups. However, if a cemented lens is constituted by n lenses cemented together, the cemented lens will be counted as n lenses.

In addition, the shapes and the signs of the refractive powers of the lenses of the projection zoom lens of the present invention will be considered in the paraxial region for lenses that include aspherical surfaces.

Meanwhile, a projection type display device of the present invention comprises:

a light source;

a light valve, into which light from the light source enters; and a projection zoom lens that projects optical images formed by light modulated by the light valve onto a screen, and is characterized by:

the projection zoom lens of the present invention described above being applied as the projection zoom lens.

In the projection zoom lens of the present invention, a variable stop, in which the aperture diameter changes, is employed as the aperture stop as described above. Therefore, the numerical aperture can be maintained constant through the entire zoom range. A projection zoom lens having such a configuration can realize a higher zoom ratio compared to the projection zoom lens disclosed in Japanese Unexamined Patent Publication No. 2005-106948. Specific values of the zoom ratio will be described in detail in connection with Examples to be described later.

In addition, the projection zoom lens of the present invention satisfies the conditional formula below.

$$2.5 < Bf/Im\phi \qquad (1)$$

Therefore, a sufficiently long back focus can be achieved. That is, if the value of Bf/Im$\phi$ is less than or equal to the lower limit value of 2.5, it will become difficult to secure a sufficient amount of back focus. As a result, it will become difficult to insert the aforementioned prism.

The above advantageous effect will become more prominent in the case that the conditional formula below is satisfied within the range defined by Conditional Formula (1).

$$2.8 < Bf/Im\phi \qquad (1')$$

Further, the projection zoom lens of the present invention satisfies the conditional formula below.

$$L/Im\phi < 12 \qquad (2)$$

Therefore, the total length of the projection zoom lens can be shortened.

The above advantageous effect will become more prominent in the case that the conditional formula below is satisfied within the range defined by Conditional Formula (2).

$$7 < L/Im\phi < 11 \qquad (2')$$

In the case that the value of L/Im$\phi$ is less than or equal to 7, correction of chromatic aberration will become difficult. However, this problem can be avoided and chromatic aberration can be favorably corrected in the case that Conditional Formula (2') is satisfied.

In addition, the following advantageous effects can be obtained by the projection zoom lens of the present invention in the case that a final lens group provided most toward the reduction side has a positive refractive power and is fixed while changing magnification and aforementioned conditional formula (3) is satisfied.

$$2.0 < fe/fw < 7.0 \qquad (3)$$

That is, if the value of fe/fw is less than or equal to 2.0, correction of spherical aberration will become difficult. In addition, the outer diameters of the lenses toward the magnification side will increase, which will lead to the zoom lens becoming large. However, such problems can be avoided if the value of fe/fw is greater than 2.0. That is, spherical aberration can be favorably corrected, while the outer diameters of the lenses toward the magnification side can be decreased to enable the zoom lens to be formed compact if the value of fe/fw is greater than 2.0.

In addition, if the value of fe/fw is greater than or equal to 7.0, the amount of spherical aberration tends to increase at the telephoto end. However, this problem can be avoided if the value of fe/fw is less than 7.0. That is, the amount of spherical aberration at the telephoto end can be suppressed if the value of fe/fw is less than 7.0.

The above advantageous effect will become more prominent in the case that the conditional formula below is satisfied within the range defined by Conditional Formula (3).

$$3.0 < fe/fw < 6.0 \qquad (3')$$

In addition, the following advantageous effects can be obtained in the case that the projection zoom lens of the present invention satisfies aforementioned conditional formula (4).

$$-2.0 < f1/fw < -0.8 \qquad (4)$$

That is, if the value of f1/fw is less than or equal to −2.0, the outer diameters of the lenses toward the magnification side will increase, which will lead to the zoom lens becoming large, and it will also become difficult to secure a sufficient amount of back focus. However, such problems can be avoided if the value of f1/fw is greater than −2.0. That is, the outer diameters of the lenses toward the magnification side can be decreased to enable the zoom lens to be formed compact, and a sufficient amount of back focus can be secured if the value of f1/fw is greater than −2.0.

In addition, if the value of f1/fw is greater than or equal to −0.8, correction of field curvature and distortion will become difficult. However, this problem can be avoided if the value of f1/fw is less than −0.8. That is, field curvature and distortion can be favorably corrected if the value of f1/fw is less than −0.8.

The above advantageous effect will become more prominent in the case that the conditional formula below is satisfied within the range defined by Conditional Formula (4).

$$-1.8 < f1/fw < -1.0 \qquad (4')$$

In addition, the following advantageous effects can be obtained if the projection zoom lens of the present invention satisfies aforementioned conditional formula (5).

$$3.0 < f3/fw < 8.0 \qquad (5)$$

That is, if the value of f3/fw is less than or equal to 3.0, correction of field curvature and lateral chromatic aberration will become difficult. However, this problem can be avoided if the value of f3/fw is greater than 3.0. That is, field curvature and lateral chromatic aberration can be favorably corrected if the value of f3/fw is greater than 3.0.

In addition, if the value of f3/fw is greater than or equal to 8.0, the total length of the projection zoom lens will become long. However, this problem can be avoided if the value of f3/fw is less than 8.0. That is, the total length of the projection zoom lens can be suppressed if the value of f3/fw is less than 8.0.

In addition, a high zoom ratio can be secured and the utilizable range of the projection zoom lens can be broadened, if the projection zoom lens of the present invention satisfies aforementioned conditional formula (6).

$$1.4 < Zr \qquad (6)$$

Note that it is generally desired for zoom lenses which are applied to projection type display devices for use in cinema theaters and the like to have an F number less than 3.0 (bright) through the entire zoom range. The projection zoom lens of the present invention is capable of meeting this demand. Specific numerical values of the F number will be described in detail in connection with the Examples to be described later.

In addition, it is generally desired for zoom lenses which are applied to the aforementioned projection type display devices to suppress distortion to within approximately 2% through the entire zoom range. The projection zoom lens of the present invention is capable of meeting this demand. Specific numerical values of the distortion will be described in detail in connection with the Examples to be described later.

Meanwhile, the projection type display device of the present invention utilizes the zoom lens of the present invention described above as a projection zoom lens. Therefore, a high zoom ratio can be secured, the numerical aperture can be maintained constant through the entire magnification range, the aforementioned optical system that utilizes a prism can be easily provided, and a short total length can be realized, enabling the projection type display device to be formed compact.

BRIEF DESCRIPTION OF THE DRAWINGS

FIG. 1 is a collection of sectional diagrams that illustrate the lens configuration of a projection zoom lens according to Example 1 of the present invention.

FIG. 5 is a collection of sectional diagrams that illustrate the lens configuration of a projection zoom lens according to Example 5 of the present invention.

FIG. 6 is a collection of sectional diagrams that illustrate the lens configuration of a projection zoom lens according to Example 6 of the present invention.

FIG. 9 is a collection of sectional diagrams that illustrate the lens configuration of a projection zoom lens according to Example 9 of the present invention.

FIG. 10 is a collection of sectional diagrams that illustrate the lens configuration of a projection zoom lens according to Example 10 of the present invention.

FIG. 14 is a collection of sectional diagrams that illustrate the lens configuration of a projection zoom lens according to Example 14 of the present invention.

FIG. 16 is a collection of sectional diagrams that illustrate the lens configuration of a projection zoom lens according to Example 16 of the present invention.

FIG. 18 is a collection of sectional diagrams that illustrate the lens configuration of a projection zoom lens according to Example 18 of the present invention.

A through L of FIG. 19 are diagrams that illustrate aberrations of the projection zoom lens according to Example 1.

Figure 20:
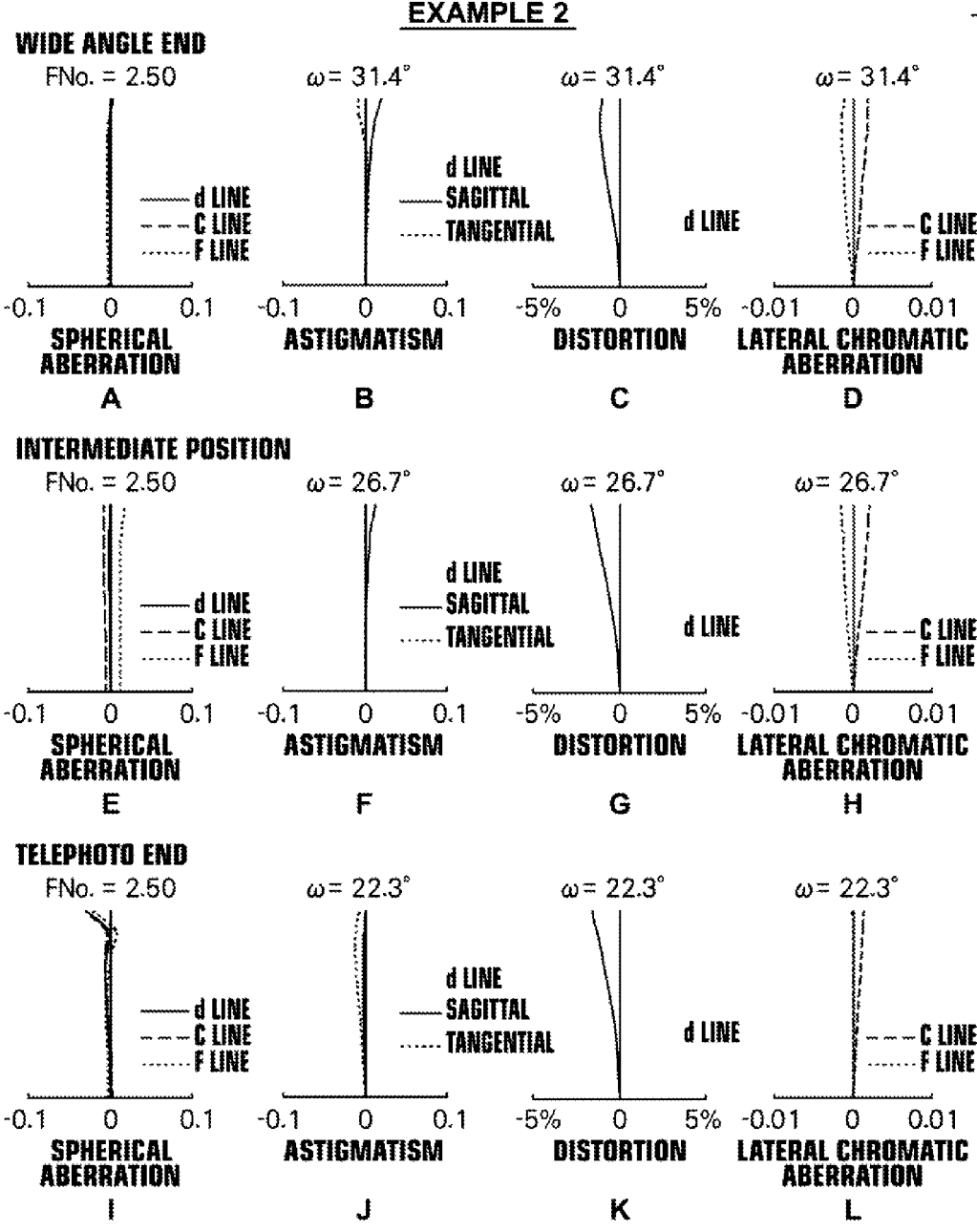

A through L of FIG. 20 are diagrams that illustrate aberrations of the projection zoom lens according to Example 2.

A through L of FIG. 21 are diagrams that illustrate aberrations of the projection zoom lens according to Example 3.

A through L of FIG. 22 are diagrams that illustrate aberrations of the projection zoom lens according to Example 4.

A through L of FIG. 23 are diagrams that illustrate aberrations of the projection zoom lens according to Example 5.

A through L of FIG. 24 are diagrams that illustrate aberrations of the projection zoom lens according to Example 6.

A through L of FIG. 25 are diagrams that illustrate aberrations of the projection zoom lens according to Example 7.

A through L of FIG. 26 are diagrams that illustrate aberrations of the projection zoom lens according to Example 8.

A through L of FIG. 27 are diagrams that illustrate aberrations of the projection zoom lens according to Example 9.

A through L of FIG. 28 are diagrams that illustrate aberrations of the projection zoom lens according to Example 10.

A through L of FIG. 29 are diagrams that illustrate aberrations of the projection zoom lens according to Example 11.

A through L of FIG. 30 are diagrams that illustrate aberrations of the projection zoom lens according to Example 12.

A through L of FIG. 31 are diagrams that illustrate aberrations of the projection zoom lens according to Example 13.

A through L of FIG. 32 are diagrams that illustrate aberrations of the projection zoom lens according to Example 14.

A through L of FIG. 33 are diagrams that illustrate aberrations of the projection zoom lens according to Example 15.

A through L of FIG. 34 are diagrams that illustrate aberrations of the projection zoom lens according to Example 16.

A through L of FIG. 35 are diagrams that illustrate aberrations of the projection zoom lens according to Example 17.

A through L of FIG. 36 are diagrams that illustrate aberrations of the projection zoom lens according to Example 18.

Figure 37:
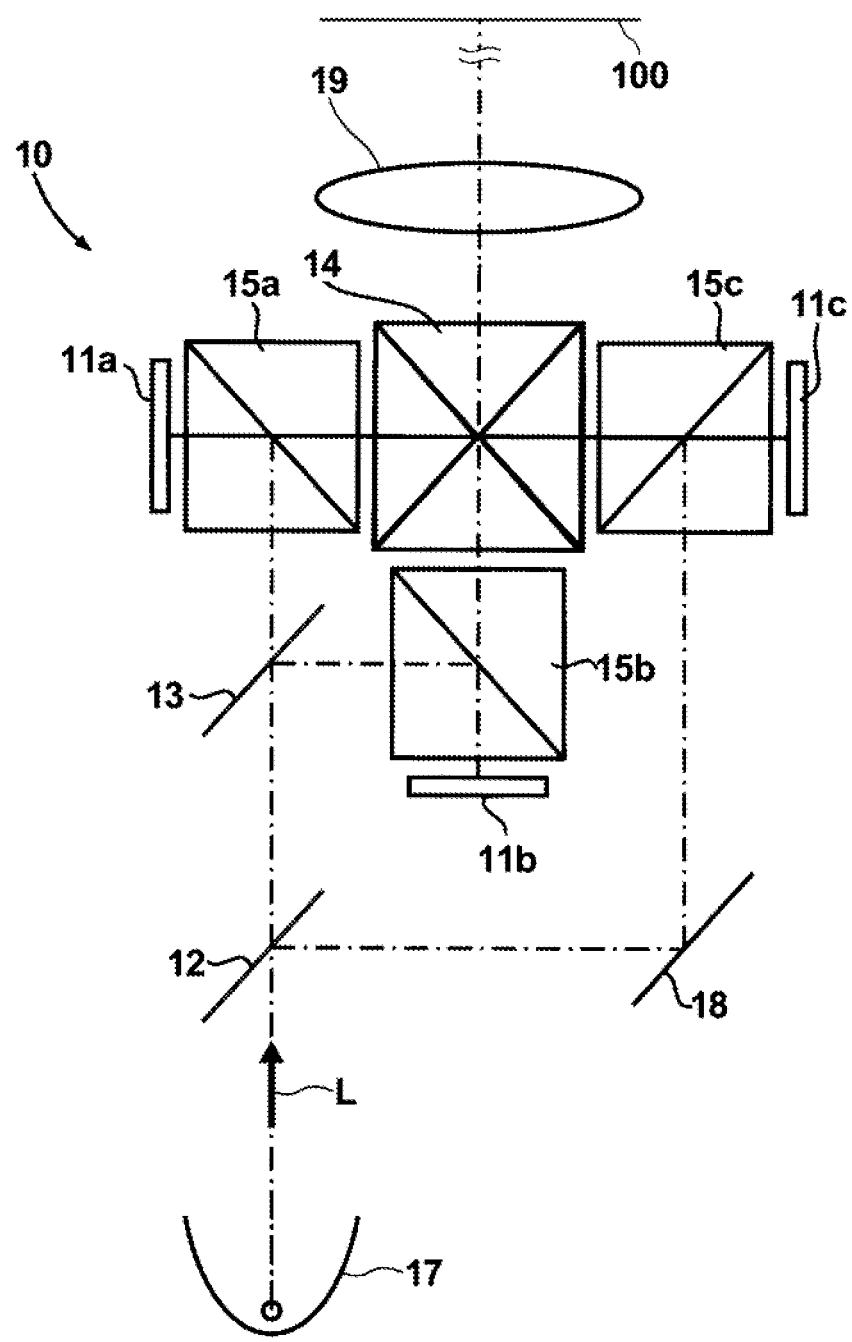

FIG. 37 is a diagram that illustrates the schematic configuration of a projection type display device according to an embodiment of the present invention.

Figure 38:
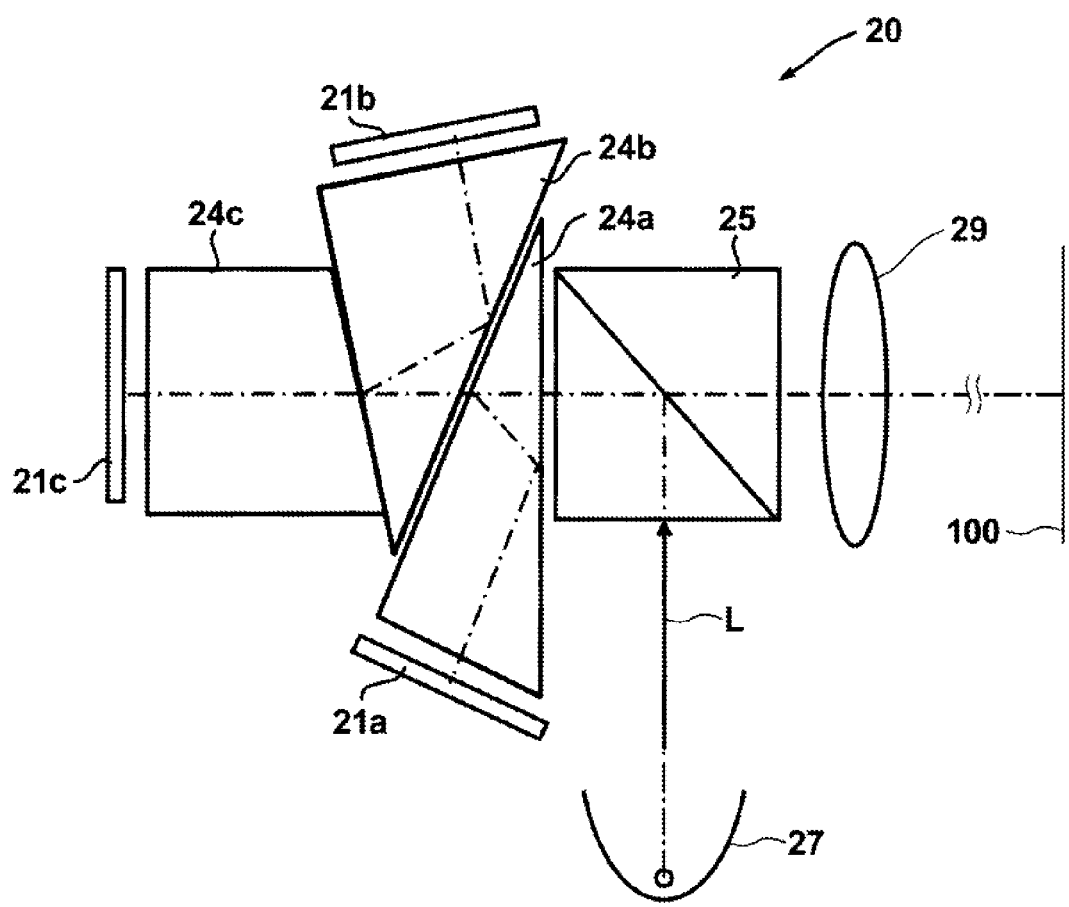

FIG. 38 is a diagram that illustrates the schematic configuration of a projection type display device according to another embodiment of the present invention.

BEST MODE FOR CARRYING OUT THE INVENTION

Hereinafter, embodiments of the present invention will be described in detail with reference to the accompanying drawings. First, a projection zoom lens according to an embodiment of the present invention will be described with reference to FIG. 1. FIG. 1 illustrates the positions of lens groups of a projection zoom lens according to Example 1 of the present invention at a wide angle end, a telephoto end, and an intermediate position between the wide angle end and the telephoto end, when zooming operations are performed. The manner in which the projection zoom lens is illustrated is the same in FIGS. 1 through 18.

FIG. 2 through FIG. 18 are collections of sectional diagrams that illustrate other examples of the configurations of projection zoom lenses according to embodiments of the present invention. Each of the projection zoom lenses illustrated in FIGS. 2 through 18 respectively correspond to projection zoom lenses of Examples 2 through 18 to be described later. Among these projection zoom lenses, the projection zoom lenses of Examples 1 through 12 are those having six group configurations, and the projection zoom lenses of Examples 13 through 18 are those having five group configurations.

<<Embodiments Having Six Group Configurations>>

First, the projection zoom lenses of Examples 1 through 12 that have six group configurations will be described. The basic configurations of these projection zoom lenses are similar to that of Example 1 other than portions that will be particularly described in detail. Therefore, the embodiments will be described mainly with reference to the configuration illustrated in FIG. 1.

The projection zoom lens of the present embodiment is capable of being mounted in a projection type display device for displaying digital projected images for use in cinema theaters and the like. For example, the projection zoom lens of the present embodiment may be utilized as a projection lens that projects image information displayed by a light valve onto a screen. In FIG. 1, the left side is the magnification side, and the right side is the reduction side. FIG. 1 also illustrates glass blocks 2 and 1 that function as a color combining prism (including filters, etc.), presuming a case in which the projection zoom lens is mounted on a projection type display device. This applies to FIGS. 2 through 18 as well. Note that an image display surface of the light valve is positioned at the surface of the glass block 1 toward the reduction side, for example.

In the projection type display device, light beams, to which the image information is imparted by the image display surface, enter the projection zoom lens via the glass blocks 2 and 1. The projection zoom lens projects the beams onto a screen (not shown) disposed toward the left side direction of the drawing sheet.

Note that although the position of the surface of the glass block 2 toward the reduction side and the position of the image display surface are the same in the above description, the projection zoom lens of the present invention is not limited to such a configuration. In addition, FIG. 1 illustrates only one image display surface. However, the projection type display device may be configured to separate beams from a light source into three primary colors with a color separating optical system. In this case, three light valves that respectively correspond to the three primary colors may be provided, to enable display of full color images.

The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; a fifth lens group G5 which is positioned at the reduction side after the fourth lens group G4, has a negative refractive power, and moves while changing magnification; and a sixth lens group G6, which is provided most toward the reduction side, has a positive refractive power, and is fixed while changing magnification. The projection zoom lens of the present embodiment is configured such that the reduction side is telecentric. The configuration of the lens groups described above is common to Examples 1 through 6, as well as Examples 11 and 12.

This projection zoom lens is configured to perform focusing operations by moving the first lens group G1.

In the example illustrated in FIG. 1, the first lens group G1 is constituted by four lenses (a first lens L1 through a fourth lens L4), the second lens group G2 is constituted by two lenses (a fifth lens L5 and a sixth lens L6), the third lens group G3 is constituted by two lenses (a seventh lens L7 and an eighth lens L8), the fourth lens group G4 is constituted by a single lens (a ninth lens L9) and an aperture stop St positioned at the magnification side thereof, the fifth lens group G5 is constituted by five lenses (a tenth lens L10 through a fourteenth lens L14), and the sixth lens group G6 is constituted by a single lens (a fifteenth lens L15).

However, the numbers of lenses that constitute each of the lens groups are not necessarily limited to those of the example illustrated in FIG. 1. For example, in the projection zoom lens of Example 3 to be described later, a second lens group G2 is constituted by a single lens, and a fourth lens group G4 is constituted by two lenses. In addition, in the zoom lens of Example 4 to be described later, a sixth lens group G6 is constituted by two lenses.

In the projection zoom lens of the present embodiment, the aperture stop St provided in the fourth lens group G4 is a variable stop that changes the aperture diameter thereof such that the numerical aperture of the zoom lens is constant through the entire zoom range. This point is also common to all of the other embodiments, including cases in which the position at which the aperture stop St is provided is different.

This projection zoom lens satisfies Conditional Formulae (1) and (2) below.

$$2.5 < Bf/Im\phi \tag{1}$$

$$L/Im\phi < 12 \tag{2}$$

wherein $Bf$ is the back focus (an air converted length) of the entire system at the reduction side at the wide angle end, $Im\phi$ is the maximum effective image circle diameter (image circle diameter) at the reduction side, and $L$ is the distance along the optical axis from the lens surface most toward the magnification side (the surface of the first lens L1 toward the magnification side) to the lens surface most toward the reduction side (the surface of the fifteenth lens L15 toward the reduction side) when the projection distance is infinity.

The projection zoom lens of the present embodiment is capable of having a sufficiently long back focus, by Conditional Formula (1) being satisfied in this manner. The reason therefor is as described in detail earlier. Specific values of the back focus for each of the Examples will be shown in tables later. The above advantageous effect will become more prominent in the case that aforementioned Conditional Formula (1') is satisfied within the range defined by Conditional Formula (1).

Further, the total length of the projection zoom lens of the present embodiment can be shortened and miniaturization can be achieved, by Conditional Formula (2) being satisfied. This advantageous effect will become more prominent in the case that aforementioned Conditional Formula (2') is satisfied within the range defined by Conditional Formula (2). Further, chromatic aberration can be favorably corrected in this case. The reasons therefore are as described in detail earlier.

Note that values of each of the Examples for the conditions defined in Conditional Formulae (1) and (2), as well as Conditional Formulae (3) through (6) to be described later are summarized and shown in Table 39. As shown in Table 39, the projection zoom lenses according to the embodiments of the present invention secure high zoom ratios Zr within a range from 1.43 to 1.87.

In addition, in the projection zoom lens of the present embodiment, the sixth lens group G6, which is the final lens group provided most toward the reduction side, has a positive refractive power and is fixed while changing magnification. In addition, Conditional Formula (3) below is satisfied:

$$2.0 < fe/fw < 7.0 \qquad (3)$$

wherein fe is the focal length of the final lens group, and fw is the focal length of the entire system at the wide angle end.

The projection zoom lens of the present embodiment can favorably correct spherical aberration, can reduce the outer diameters of the lenses of the first lens group G1 toward the magnification side, resulting in being capable of being formed compact, and further can suppress the amount of spherical aberration at the telephoto end, by Conditional Formula (3) being satisfied. The detailed reasons therefor are as described earlier.

These advantageous effects will become more prominent in the case that aforementioned Conditional Formula (3') is satisfied within the range defined by Conditional Formula (3).

In addition, the projection zoom lens of the present embodiment satisfies Conditional Formula (4) below.

$$-2.0 < f1/fw < -0.8 \qquad (4)$$

wherein f1 is the focal length of the first lens group, and fw is the focal length of the entire system at the wide angle end.

The projection zoom lens of the present embodiment can reduce the outer diameters of the lenses toward the magnification side, resulting in being capable of being formed compact, can secure a sufficient amount of back focus, and further can suppress field curvature and distortion, by Conditional Formula (4) being satisfied. The detailed reasons therefor are as described earlier.

These advantageous effects will become more prominent in the case that aforementioned Conditional Formula (4') is satisfied within the range defined by Conditional Formula (4).

In addition, the zoom lens of the present embodiment satisfies Conditional Formula (6) below.

$$1.4 < Zr \qquad (6)$$

wherein Zr is the zoom ratio of the telephoto end with respect to the wide angle end.

The projection zoom lens of the present embodiment secures a high zoom ratio and the utilizable range thereof can be broadened, by Conditional Formula (6) being satisfied.

Figure 7:
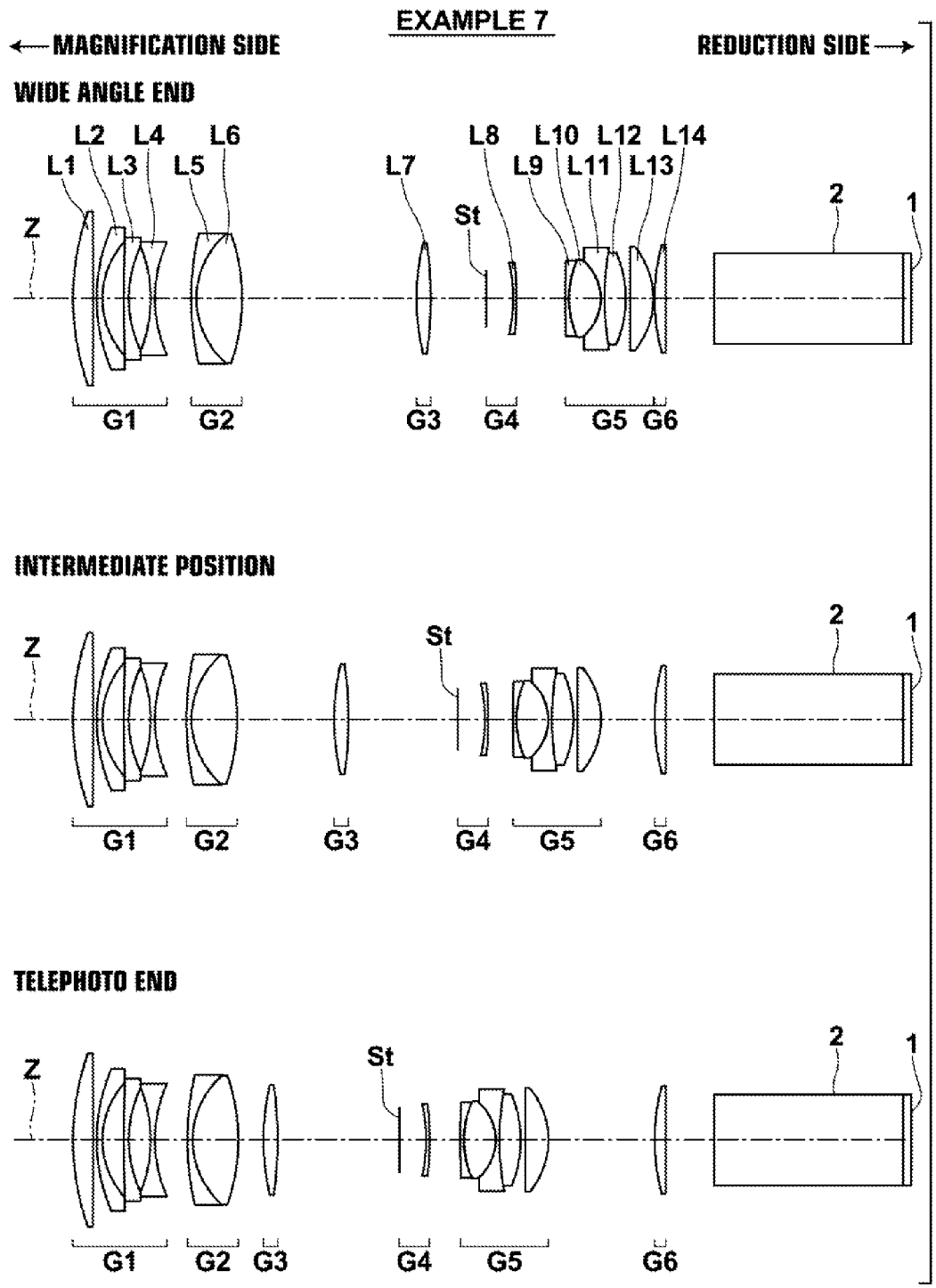
FIG. 7 is a collection of sectional diagrams that illustrate the lens configuration of a projection zoom lens according to Example 7 of the present invention.

Next, embodiments having six group configurations different from the configuration of the lens groups described above will be described. The projection zoom lens according to an embodiment, of which sectional diagrams are illustrated in FIG. 7, corresponds to the projection zoom lens of Example 7 to be described later. The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a negative refractive power, and moves while changing magnification; a fifth lens group G5 which is positioned at the reduction side after the fourth lens group G4, has a positive refractive power, and moves while changing magnification; and a sixth lens group G6, which is provided most toward the reduction side, has a positive refractive power, and is fixed while changing magnification. The projection zoom lens of the present embodiment is configured such that the reduction side is telecentric. The configuration of the lens groups described above is common to Examples 7 and 8.

The above configuration differs from that of the projection zoom lens of Example 1 described previously in the points that the fourth lens group G4 has a negative refractive power, and the fifth lens group G5 has a positive refractive power.

The projection zoom lens according to the embodiment illustrated in FIG. 7 satisfies all of aforementioned Conditional Formulae (1), (2), (3), (4), and (6). The advantageous effects obtained thereby are the same as those described previously.

In addition, the projection zoom lens of the present embodiment satisfies Conditional Formula (5) below.

$$3.0 < f3/fw < 8.0 \qquad (5)$$

wherein f3 is the focal length of the third lens group, and fw is the focal length of the entire system at the wide angle end.

The projection zoom lens of the present embodiment can favorably correct field curvature and lateral chromatic aberration while also suppressing the total length of the lens, by Conditional Formula (5) being satisfied. The detailed reasons therefor are as described previously.

These advantageous effects will become more prominent in the case that aforementioned Conditional Formula (5') is satisfied within the range defined by Conditional Formula (5).

Next, other embodiments having six group configurations which are again different from the configuration of the lens groups described above will be described. The projection zoom lens according to an embodiment, of which sectional diagrams are illustrated in FIG. 9, corresponds to the projection zoom lens of Example 9 to be described later. The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; a fifth lens group G5 which is positioned at the reduction side after the fourth lens group G4, has a positive refractive power, and moves while changing magnification; and a sixth lens group G6, which is provided most toward the reduction side, has a positive refractive power, and is fixed while changing magnification. The projection zoom lens of the present embodiment is configured such that the reduction side is telecentric. The configuration of the lens groups described above is common to Examples 9 and 10.

The above configuration basically differs from that of the projection zoom lens of Example 1 described previously in the point that the fifth lens group G5 has a positive refractive power.

The projection zoom lens according to the embodiment illustrated in FIG. 9 satisfies all of Conditional Formulae (1) through (6). The advantageous effects obtained thereby are the same as those described previously.

<<Embodiments Having Five Group Configurations>>

Next, the projection zoom lenses of Examples 13 through 18 that have five group configurations will be described. The basic configurations of these projection zoom lenses are the same as that of Example 13 other than portions that will be particularly described in detail. Therefore, the embodiments will be described mainly with reference to the configuration illustrated in FIG. 13.

The projection zoom lens of the present embodiment consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; and a fifth lens group G5, which is provided most toward the reduction side, has a positive refractive power, and is fixed while changing magnification. The projection zoom lens of the present embodiment is configured such that the reduction side is telecentric. The configuration of the lens groups described above is common to Examples 13 and 14.

Figure 13:
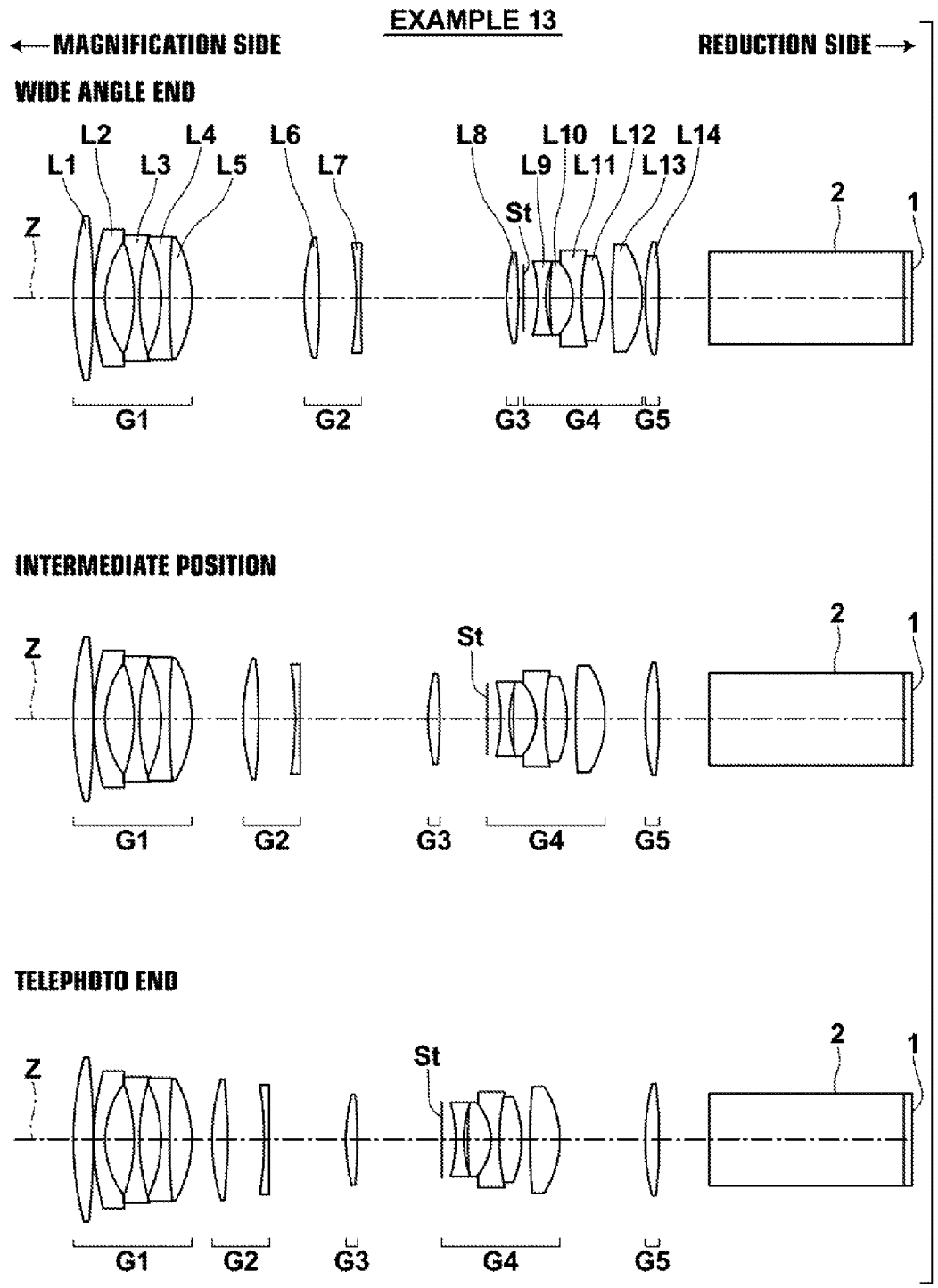
FIG. 13 is a collection of sectional diagrams that illustrate the lens configuration of a projection zoom lens according to Example 13 of the present invention.

In the example illustrated in FIG. 13, the first lens group G1 is constituted by five lenses (a first lens L1 through a fifth lens L5), the second lens group G2 is constituted by two lenses (a sixth lens L6 and a seventh lens L7), the third lens group G3 is constituted by a single lens (an eighth lens L8), the fourth lens group G4 is constituted by five lenses (a ninth lens L9 through a thirteenth lens L13) and an aperture stop St positioned at the magnification side thereof, and the fifth lens group G5 is constituted by a single lens (a fourteenth lens L14).

However, the numbers of lenses that constitute each of the lens groups are not necessarily limited to those of the example illustrated in FIG. 13. For example, in the projection zoom lens of Example 15 to be described later, a first lens group G1 is constituted by three lenses, a second lens group G2 is constituted by three lenses, and a third lens group G3 is constituted by three lenses.

In the projection zoom lens of the present embodiment, the aperture stop St provided in the fourth lens group G4 is a variable stop that changes the aperture diameter thereof such that the numerical aperture of the zoom lens is constant through the entire zoom range.

The projection zoom lens of the present embodiment satisfies Conditional Formulae (1) through (3), (5), and (6). The advantageous effects obtained thereby are the same as those described previously.

Figure 15:
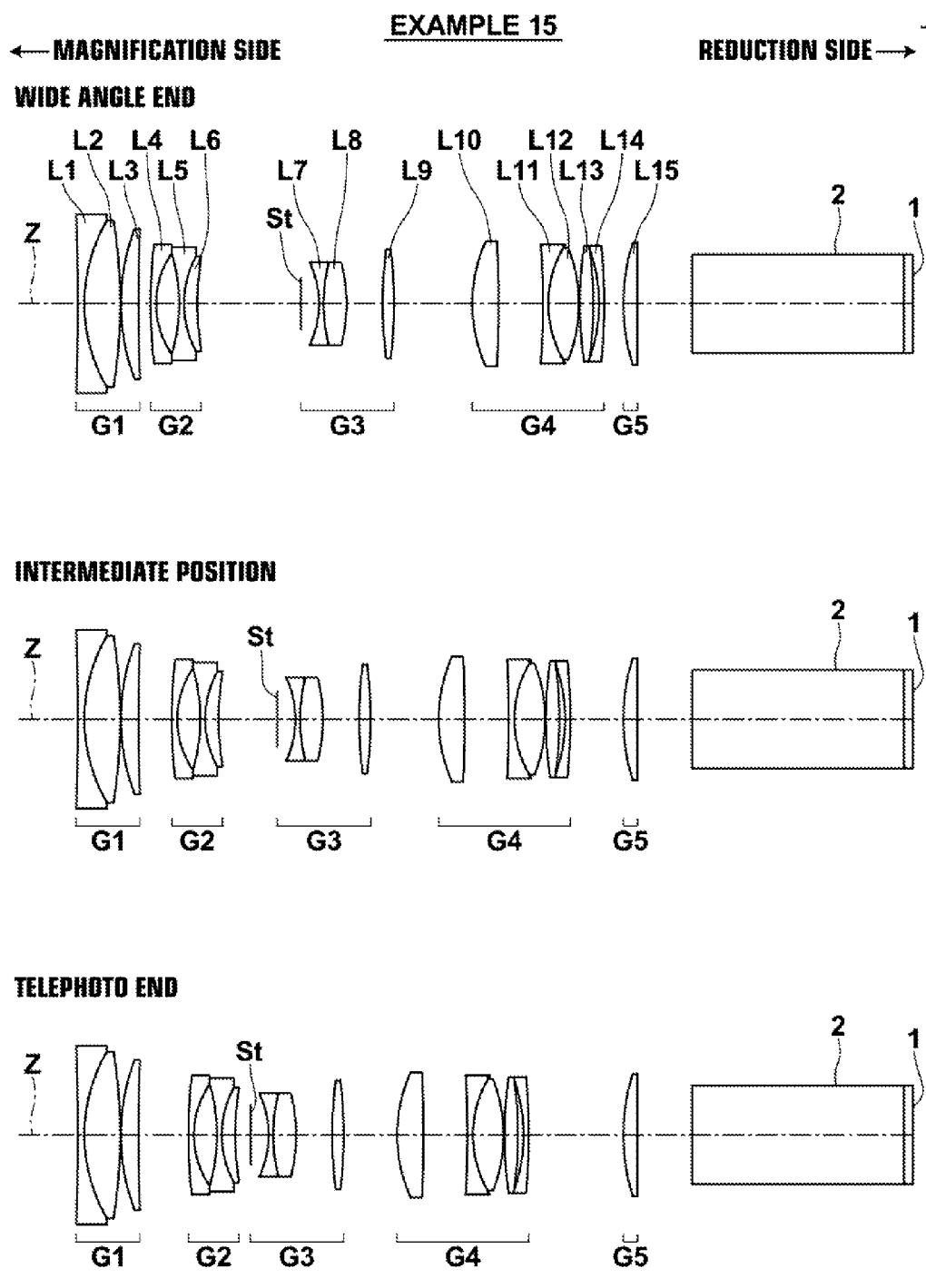
FIG. 15 is a collection of sectional diagrams that illustrate the lens configuration of a projection zoom lens according to Example 15 of the present invention.

Next, embodiments having five group configurations different from the lens group configuration described above will be described. The projection zoom lens according to an embodiment, of which sectional diagrams are illustrated in FIG. 15, corresponds to the projection zoom lens of Example 15 to be described later. The projection zoom lens of the present embodiment consists essentially of: a first lens group G1, which is provided most toward the magnification side, has a positive refractive power, and is fixed while changing magnification; a second lens group G2, which is positioned at the reduction side after the first lens group G1, has a negative refractive power, and moves while changing magnification; a third lens group G3 which is positioned at the reduction side after the second lens group G2, has a negative refractive power, and moves while changing magnification; a fourth lens group G4 which is positioned at the reduction side after the third lens group G3, has a positive refractive power, and moves while changing magnification; and a fifth lens group G5, which is provided most toward the reduction side, has a positive refractive power, and is fixed while changing magnification. The projection zoom lens of the present embodiment is configured such that the reduction side is telecentric. The configuration of the lens groups described above is common to Examples 15 through 18.

The above configuration basically differs from the projection zoom lens of Example 13 described previously in the points that the second lens group G2 and the third lens group G3 have negative refractive powers.

The projection zoom lens of the present embodiment satisfies Conditional Formulae (1) through (3) and (6). The advantageous effects obtained thereby are the same as those described previously.

Next, embodiments of a projection type display device of the present invention will be described with reference to FIGS. 37 and 38. FIG. 37 is a schematic diagram that illustrates a portion of a projection type display device according to an embodiment of the present invention. The projection type display device illustrated in FIG. 37 is equipped with an illuminating optical system 10 including: reflective display elements 11a through 11c as light valves corresponding to light of each of three colors; dichroic mirrors 12 and 13 for separating colors; a cross dichroic prism 14 for combining colors; a total reflection mirror 18 for deflecting an optical path; and polarization splitting prisms 15a through 15c. Note that a light source 17 that emits white light L is provided in front of the dichroic mirror 12.

The white light L output by the light source 17 is separated into three colored light beams (G light, B light, and R light) by the dichroic mirrors 12 and 13. The three colored light beams pass through the polarization splitting prisms 15a through 15c, then enter the reflective display elements 11a through 11c corresponding each of the light beams and are optically modulated thereby. Then, the colored light beams are combined by the cross dichroic prism 14, and enter a projection zoom lens 19 according to an embodiment of the present invention. The projection zoom lens 19 projects an optical image formed by the light that enters thereinto onto a screen 100.

Next, FIG. 38 is a schematic diagram that illustrates a portion of a projection type display device according to another embodiment of the present invention. The projection type display device illustrated in FIG. 38 is equipped with an illuminating optical system 20 including: reflective display elements 21a through 21c as light valves corresponding to light of each of three colors; TIR (Total Internal Reflection) prisms 24a through 24c for separating and combining colors; and a polarization splitting prism 25. Note that a light source 27 that emits white light L is provided in front of the polarization splitting prism 25.

The white light L output by the light source 27 passes through the polarization splitting prism 25, then is separated into three colored light beams (G light, B light, and R light) by the TIR prisms 24a through 24c. The three colored light beams enter the reflective display elements 21a through 21c corresponding each of the light beams and are optically modulated thereby. Then, the optically modulated light beams propagate through the TIR prisms 24a through 24c in the reverse direction such that the colors are combined, pass through the polarization splitting prism 25, and enter a projection zoom lens 29 according to an embodiment of the present invention. The projection zoom lens 29 projects an optical image formed by the light that enters thereinto onto a screen 100.

Note that reflective liquid crystal display elements, DMD's, or the like may be employed as the reflective display elements 11a through 11c and 21a through 21c. FIGS. 37 and 38 illustrate examples in which reflective display elements are employed as the light valves. However, the light valves provided in the projection type display device of the present invention is not limited to these examples, and transmissive display elements, such as transmissive liquid crystal display elements may alternatively be employed.

Next, specific examples of the projection zoom lens of the present invention will be described. Note that the projection zoom lenses of Examples 1 through 12 to be described hereunder all have six group configurations, and the projection zoom lenses of Examples 13 through 18 all have five group configurations.

Example 1

The lens configuration of a projection zoom lens of Example 1 is illustrated in FIG. 1. FIG. 1 illustrates the positions of lens groups of a projection zoom lens according to Example 1 of the present invention at a wide angle end, a telephoto end, and an intermediate position between the two. Because a description has already been given regarding FIG. 1, redundant descriptions will be omitted here.

The projection zoom lens of Example 1 consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; a fifth lens group G5 which is positioned at the reduction side after the fourth lens group G4, has a negative refractive power, and moves while changing magnification; and a sixth lens group G6, which is provided most toward the reduction side, has a positive refractive power, and is fixed while changing magnification. The projection zoom lens of the present embodiment is configured such that the reduction side is telecentric. The configuration of the lens groups described above is common to Examples 1 through 6, as well as Examples 11 and 12.

The first lens group G1 is constituted by four lenses, which are a first lens L1 having a positive refractive power (hereinafter, lenses will simply be referred to as "positive" or "negative"), a negative second lens L2, a negative third lens L3, and a negative fourth lens L4, provided in this order from the magnification side. The second lens group G2 is constituted by two lenses, which are a negative fifth lens L5 and a positive sixth lens L6, provided in this order from the magnification side.

The third lens group G3 is constituted by two lenses, which are a positive seventh lens L7 and a negative eighth lens L8, provided in this order from the magnification side. The fourth lens group G4 is constituted by an aperture stop St, which is a variable stop, and a positive ninth lens L9.

The fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. The sixth lens group G6 is constituted by a single positive fifteenth lens L15. Note that the twelfth lens L12 and the thirteenth lens L13 are cemented together.

Table 1 shows basic lens data of the projection zoom lens of Example 1. Data regarding glass blocks 2 and 1 are also shown here. In Table 1, ith (i=1, 2, 3, . . . ) lens surface numbers that sequentially increase from the magnification side to the reduction side, with the lens surface at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) constituent elements that sequentially increase from the magnification side to the reduction side, with the lens at the most magnification side designated as first, with respect to the d line (wavelength: 587.6 nm) are shown in the column Ndj. The Abbe's numbers of the jth constituent elements with respect to the d line are shown in the column vdj.

Note that the radii of curvature R and the values of the distances D are values which are normalized by designating the focal length of the entire projection zoom lens at the wide angle end as 10.00. Table 1 shows numerical values which are rounded off at a predetermined number of digits. In addition, in Table 1, the signs of the radii of curvature are positive in cases that the surface shape is convex toward the magnification side, and negative in cases that the surface shape is convex toward the reduction side.

Among the distances D, the distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6 change when changing magnification. The letters "DD" are appended to the surface number toward the front of these distances and shown as DD8, DD11, DD15, DD18, and DD27 in the columns of the distances between surfaces corresponding to these distances.

The above is the same for Tables 3, 5, 8, 10, 12, 14, 16, 19, 21, 23, 25, 27, 29, 31, 33, 35, and 37 to be described later. Note that with respect to the aforementioned variable distances among lens groups, the number that follows the letters "DD" are different according to the number of constituent elements in each Example. However, that letters "DD" are appended to the surface number toward the front of these distances is the same in all of the above tables. In addition, the symbol "*" is appended to aspherical surfaces.

Table 2 shows the values of the focal length f of the entire system, the back focus Bf, the distances DD8, DD11, DD15, DD18, and DD27, and the stop diameter of the aperture stop (aperture diameter: represented as diameters) of the projection zoom lens of Example 1 when changing magnification at the wide angle end, the intermediate position, and the telephoto end. These numerical values are also values which are normalized by designating the focal length of the entire projection zoom lens at the wide angle end as 10.00. In addition, these values are for a case in which the projection distance is infinity. In addition, Table 2 also shows the values of the zoom magnification rate (designating the wide angle end as 1.00), the F number (numerical aperture) F No., and the full angle of view 2ω (using degrees as the unit) of the zoom lens of Example 1. The F number is maintained constant at 2.5, which is sufficiently smaller than the aforementioned value of 3.0. This is the same for Examples 2 through 18 to be described later.

The manner in which the items of Table 2 are shown is the same for Tables 4, 6, 9, 11, 13, 15, 17, 20, 22, 24, 26, 28, 30, 32, 34, 36, and 38 as well.

TABLE 1

Example 1: Basic Lens Data

| Si (Surface Number) | Ri (Radius of Curvature) | Di (Distance) | Ndj (Refractive Index) | νdj (Abbe's Number) |
|---|---|---|---|---|
| 1 | 71.9343 | 3.715 | 1.62299 | 58.16 |
| 2 | ∞ | 0.107 | | |
| 3 | 39.2386 | 1.148 | 1.61800 | 63.33 |
| 4 | 19.4267 | 3.886 | | |
| 5 | 61.3212 | 0.966 | 1.71299 | 53.87 |
| 6 | 23.6763 | 5.903 | | |
| 7 | −30.5448 | 0.858 | 1.61800 | 63.33 |
| 8 | 81.9992 | DD[8] | | |
| 9 | ∞ | 0.971 | 1.84661 | 23.78 |
| 10 | 27.2828 | 6.802 | 1.72047 | 34.71 |
| 11 | −44.9101 | DD[11] | | |
| 12 | 35.6924 | 3.256 | 1.67270 | 32.10 |
| 13 | −164.3529 | 5.921 | | |
| 14 | 39.5138 | 0.805 | 1.49700 | 81.54 |
| 15 | 16.1272 | DD[15] | | |
| 16 (aperture Stop) | ∞ | 8.985 | | |
| 17 | 132.4478 | 2.145 | 1.49700 | 81.54 |
| 18 | −25.7826 | DD[18] | | |
| 19 | −27.4801 | 0.536 | 1.61772 | 49.81 |
| 20 | 27.4801 | 0.579 | | |
| 21 | 103.8717 | 2.379 | 1.48749 | 70.23 |
| 22 | −16.3936 | 0.473 | | |
| 23 | −12.5784 | 0.649 | 1.77250 | 49.60 |
| 24 | 52.1011 | 3.203 | 1.49700 | 81.54 |
| 25 | −18.1370 | 3.093 | | |
| 26 | 252.4568 | 4.204 | 1.49700 | 81.54 |
| 27 | −18.6515 | DD[27] | | |
| 28 | 52.7115 | 2.898 | 1.49700 | 81.54 |
| 29 | −52.7115 | 9.661 | | |
| 30 | ∞ | 37.550 | 1.51633 | 64.14 |
| 31 | ∞ | 1.609 | 1.50847 | 61.19 |
| 32 | ∞ | | | |

TABLE 2

Example 1: Data Related to Zoom

| | Wide Angle | Intermediate | Telephoto |
|---|---|---|---|
| Zoom Ratio | 1.00 | 1.20 | 1.43 |
| f | 10.00 | 11.96 | 14.30 |
| Bf | 35.49 | 35.49 | 35.49 |
| FNo. | 2.50 | 2.50 | 2.50 |
| 2ω (°) | 62.8 | 54.2 | 46.2 |
| DD[8] | 15.342 | 10.968 | 9.388 |
| DD[11] | 14.078 | 8.183 | 0.654 |
| DD[15] | 24.171 | 23.075 | 22.125 |
| DD[18] | 0.776 | 7.024 | 13.512 |
| DD[27] | 0.269 | 5.386 | 8.956 |
| Stop Diameter | 10.858 | 12.28 | 13.678 |

Here, Table 39 shows values corresponding to the conditions (the text portions) defined by Conditional Formulae (1) through (6) for each of Examples 1 through 18. As shown in Table 39, Example 1 does not satisfy Conditional Formula (5), Example 4 does not satisfy Conditional Formula (5), Example 13 does not satisfy Conditional Formula (4), Example 14 does not satisfy Conditional Formulae (3) and (5), and Examples 15 through 18 do not satisfy Conditional Formulae (4) and (5). However, all of the other Examples satisfy Conditional Formulae (1) through (6).

In addition, Table 40 shows the main specifications of Examples 1 through 18. Here, f2, f4, and f5 are the focal lengths of the second lens group, the fourth lens group, and the fifth lens group, respectively.

The spherical aberration, the astigmatism, the distortion, and the lateral chromatic aberration (chromatic aberration of magnification) of the projection zoom lens of Example 1 at the wide angle end are respectively illustrated in A through D of FIG. 19. The spherical aberration, the astigmatism, the distortion, and the lateral chromatic aberration of the projection zoom lens of Example 1 at the intermediate position are respectively illustrated in E through H of FIG. 19. The spherical aberration, the astigmatism, the distortion, and the lateral chromatic aberration of the projection zoom lens of Example 1 at the telephoto end are respectively illustrated in I through L of FIG. 19. As shown in these figures, distortion is suppressed to approximately 2% or less through the entire zoom range in Example 1. This is approximately the same for all of the other Examples 2 through 18 as well.

Each of A through L of FIG. 19, which are diagrams that illustrate the aberrations, use the d line (wavelength: 587.6 nm) as a standard. However, aberrations related to the C line (wavelength: 656.3 nm) and the F line (wavelength: 486.1 nm) are also shown in the diagrams that illustrate spherical aberration. In addition, the diagrams that illustrate lateral chromatic aberration also show aberrations related to the C line and the F line. In the diagrams that illustrate astigmatism, aberrations in the sagittal direction are indicated by solid lines, while aberrations in the tangential direction are indicated by broken lines. In the diagrams that illustrate spherical aberrations, the item "FNo." above the vertical axes denotes F numbers. In the other diagrams that illustrate the aberrations, the item ω above the vertical axes denotes half angles of view. Note that these values are for a case in which the projection distance is infinity.

The diagrams of lens arrangements, the symbols in the Tables and the diagrams that illustrate aberrations, the meanings thereof, and the manners in which they are shown for Example 1 basically apply to Examples 2 through 18 to be described below, unless otherwise noted. In addition, the points that the lens arrangement diagrams of Example 1

(FIG. 1) are those for the wide angle end, an intermediate position, and the telephoto end, and that the diagrams that illustrate aberrations are those for the wide angle end, an intermediate position, and the telephoto end are also the same for Examples 2 through 18 as well.

Example 2

Figure 2:
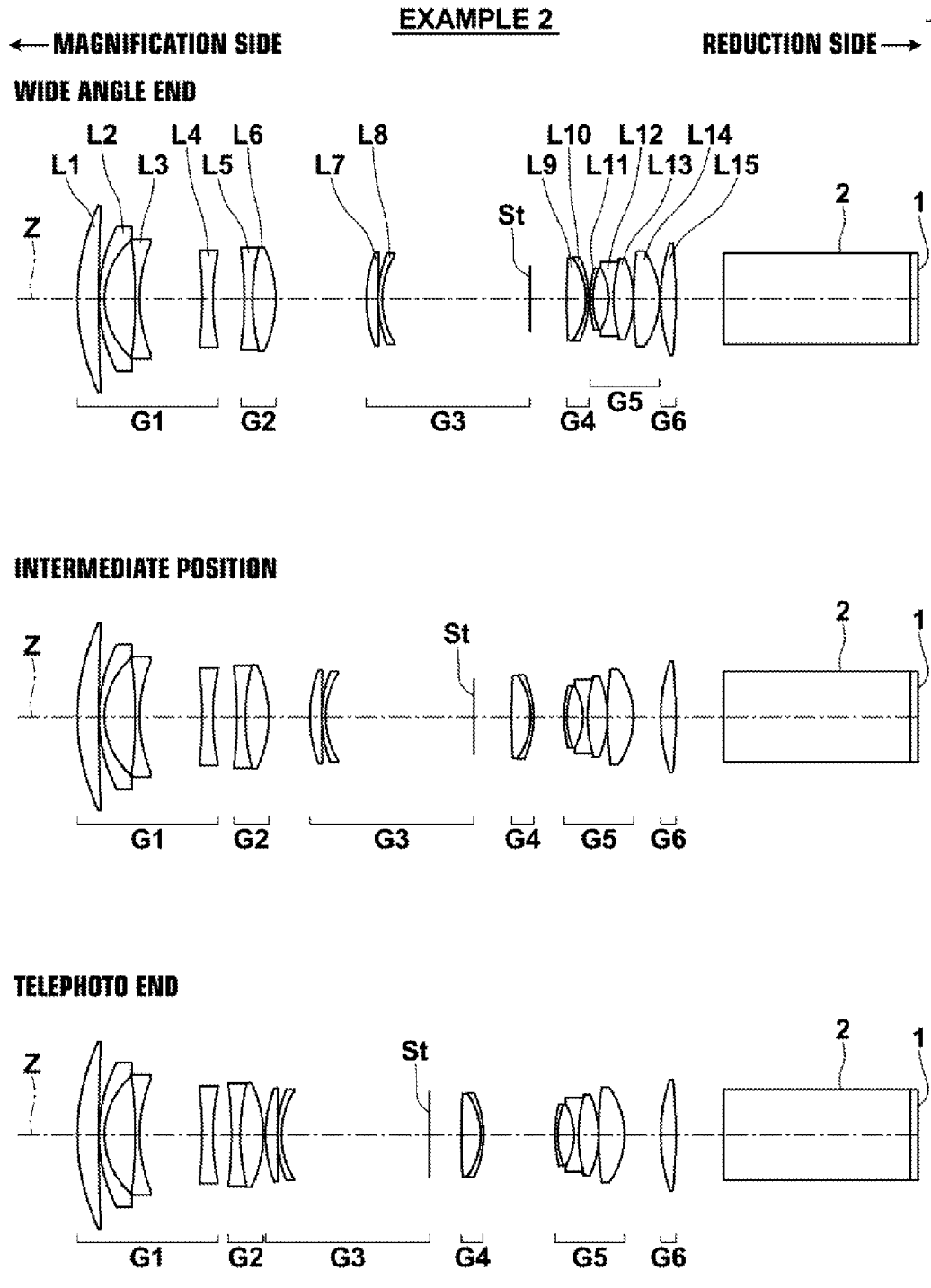
FIG. 2 is a collection of sectional diagrams that illustrate the lens configuration of a projection zoom lens according to Example 2 of the present invention.

FIG. 2 illustrates the arrangements of lens groups of the projection zoom lens of Example 2 at the wide angle end, an intermediate position, and the telephoto end. In Example 2, a first lens group G1 is constituted by four lenses, which are a positive first lens L1, a negative second lens L2, a negative third lens L3, and a negative fourth lens L4, provided in this order from the magnification side. A second lens group G2 is constituted by two lenses, which are a negative fifth lens L5 and a positive sixth lens L6, provided in this order from the magnification side.

A third lens group G3 is constituted by two lenses, which are a positive seventh lens L7 and a negative eighth lens L8, and an aperture stop St, which is a variable stop, provided in this order from the magnification side. A fourth lens group G4 is constituted by two lenses, which are a positive ninth lens L9 and a negative tenth lens L10, provided in this order from the magnification side.

A fifth lens group G5 is constituted by four lenses, which are a negative eleventh lens L11, a negative twelfth lens L12, a positive thirteenth lens L13, and a positive fourteenth lens L14, provided in this order from the magnification side. A sixth lens group G6 is constituted by a single positive fifteenth lens L15.

Note that the fifth lens L5 and the sixth lens L6 are cemented together, and the twelfth lens L12 and the thirteenth lens L13 are cemented together as well.

Table 3 shows basic lens data of the projection zoom lens of Example 2. In addition, Table 4 shows data related to items at the wide angle end, the intermediate position, and the telephoto end as the projection zoom lens of Example 2 changes magnification, in the same manner as Table 2. The items and the manners in which they are shown are as described previously.

TABLE 3

Example 2: Basic Lens Data

| Si (Surface Number) | Ri (Radius of Curvature) | Di (Distance) | Ndj (Refractive Index) | vdj (Abbe's Number) |
|---|---|---|---|---|
| 1 | 45.7579 | 4.344 | 1.62299 | 58.16 |
| 2 | 467.3392 | 0.053 | | |
| 3 | 33.1150 | 1.076 | 1.61800 | 63.33 |
| 4 | 16.2843 | 6.223 | | |
| 5 | −96.8726 | 0.861 | 1.80000 | 29.84 |
| 6 | 29.3536 | 12.664 | | |
| 7 | −94.9873 | 2.153 | 1.61800 | 63.33 |
| 8 | 44.2696 | DD[8] | | |
| 9 | −80.5721 | 1.728 | 1.61800 | 63.33 |
| 10 | 42.6826 | 4.694 | 1.53172 | 48.84 |
| 11 | −25.0831 | DD[11] | | |
| 12 | 27.2603 | 2.418 | 1.62004 | 36.26 |
| 13 | 383.5231 | 0.000 | | |
| 14 | 25.6143 | 0.807 | 1.49700 | 81.54 |
| 15 | 17.5732 | 29.989 | | |
| 16 (aperture Stop) | ∞ | DD[16] | | |
| 17 | 161.0274 | 3.875 | 1.49700 | 81.54 |
| 18 | −14.7190 | 0.054 | | |
| 19 | −14.7218 | 0.538 | 1.77250 | 49.60 |
| 20 | −21.1206 | DD[20] | | |
| 21 | 26.7946 | 0.538 | 1.62004 | 36.26 |

TABLE 3-continued

Example 2: Basic Lens Data

| Si (Surface Number) | Ri (Radius of Curvature) | Di (Distance) | Ndj (Refractive Index) | vdj (Abbe's Number) |
|---|---|---|---|---|
| 22 | 17.1750 | 3.280 | | |
| 23 | −12.6915 | 0.935 | 1.77250 | 49.60 |
| 24 | 28.6702 | 4.026 | 1.49700 | 81.54 |
| 25 | −20.9505 | 0.000 | | |
| 26 | 78.4969 | 5.248 | 1.49700 | 81.54 |
| 27 | −17.1140 | DD[27] | | |
| 28 | 36.5091 | 3.039 | 1.49700 | 81.54 |
| 29 | −110.3778 | 9.687 | | |
| 30 | ∞ | 37.668 | 1.51633 | 64.14 |
| 31 | ∞ | 1.614 | 1.50847 | 61.19 |
| 32 | ∞ | | | |

TABLE 4

Example 2: Data Related to Zoom

| | Wide Angle | Intermediate | Telephoto |
|---|---|---|---|
| Zoom Ratio | 1.00 | 1.23 | 1.50 |
| f | 10.00 | 12.25 | 15.00 |
| Bf | 35.60 | 35.60 | 35.60 |
| FNo. | 2.50 | 2.50 | 2.50 |
| 2ω (°) | 62.8 | 53.4 | 44.6 |
| DD[8] | 6.331 | 4.902 | 3.814 |
| DD[11] | 18.299 | 8.323 | 0.455 |
| DD[16] | 7.399 | 7.655 | 6.453 |
| DD[20] | 0.269 | 6.162 | 14.487 |
| DD[27] | 0.270 | 5.526 | 7.359 |
| Stop Diameter | 12.43 | 14.152 | 16.252 |

Meanwhile, A through L of FIG. 20 are diagrams that illustrate various aberrations of the projection zoom lens of Example 2.

Example 3

Figure 3:
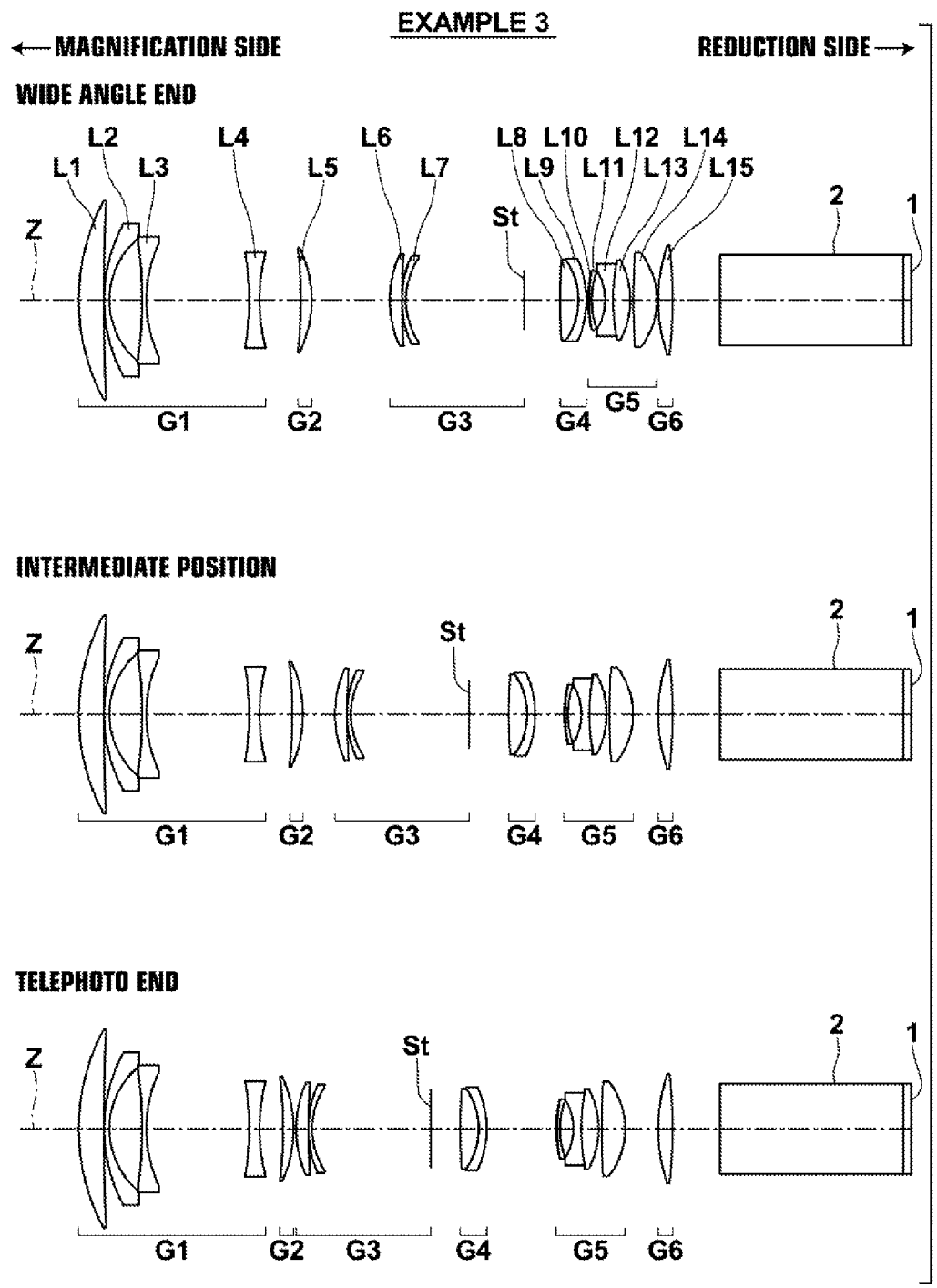
FIG. 3 is a collection of sectional diagrams that illustrate the lens configuration of a projection zoom lens according to Example 3 of the present invention.

FIG. 3 illustrates the arrangements of lens groups of the projection zoom lens of Example 3 at the wide angle end, an intermediate position, and the telephoto end. In Example 3, a first lens group G1 is constituted by four lenses, which are a positive first lens L1, a negative second lens L2, a negative third lens L3, and a negative fourth lens L4, provided in this order from the magnification side. A second lens group G2 is constituted by a single positive fifth lens L5.

A third lens group G3 is constituted by two lenses, which are a positive sixth lens L6 and a negative seventh lens L7, and an aperture stop St, which is a variable stop, provided in this order from the magnification side. A fourth lens group G4 is constituted by two lenses, which are a positive eighth lens L8 and a negative ninth lens L9, provided in this order from the magnification side.

A fifth lens group G5 is constituted by five lenses, which are a positive tenth lens L10, negative eleventh lens L11, a negative twelfth lens L12, a positive thirteenth lens L13, and a positive fourteenth lens L14, provided in this order from the magnification side. A sixth lens group G6 is constituted by a single positive fifteenth lens L15.

Note that the twelfth lens L12 and the thirteenth lens L13 are cemented together. In addition, the tenth lens L10 is formed by a thin resin layer which is adhesively attached to the surface of the eleventh lens L11 toward the magnification side, and forms a compound aspherical surface.

Table 5 shows basic lens data of the projection zoom lens of Example 3. In addition, Table 6 shows data related to items at the wide angle end, the intermediate position, and the telephoto end as the projection zoom lens of Example 3 changes magnification, in the same manner as Table 2. The items and the manners in which they are shown are as described previously.

In Example 3, the surface of the tenth lens L10 toward the magnification side (the surface having surface number 20) is an aspherical surface. Therefore, Table 7 shows data related to the aspherical surface. The aspherical surface data of Table 7 shows the surface number of aspherical surfaces and aspherical surface coefficients related to each aspherical surface. In the numerical values shown as the aspherical surface data, the symbol "E−n" (n is an integer) indicates that the numerical value is to be multiplied by $10^{-n}$. Note that the aspherical surface coefficients are the values of coefficients KA and Am (m=4, 6, 8, 10) in the aspherical surface shape formula below.

$$Zd = C \cdot h^2 / \{1 + (1 - KA \cdot C^2 \cdot h^2)^{1/2}\} \Sigma Am \cdot h^m$$

wherein: Z is the depth of the aspherical surface (the length of a normal line that extends from a point on the aspherical surface having a height h to a plane perpendicular to the optical axis that contacts the apex of the aspherical surface), h is the height (the distance from the optical axis to the surface of the lens, C is the inverse of the paraxial radius of curvature, and KA and Am are aspherical surface coefficients (m=4, 6, 8, 10). The manner in which the data are shown are the same in Table 18 to be described later. However, in Table 18, Am (m=3, 4, 5, . . . , 16).

TABLE 5

Example 3: Basic Lens Data

| Si (Surface Number) | Ri (Radius of Curvature) | Di (Distance) | Ndj (Refractive Index) | νdj (Abbe's Number) |
|---|---|---|---|---|
| 1 | 44.4548 | 5.139 | 1.62299 | 58.16 |
| 2 | 449.9823 | 0.053 | | |
| 3 | 33.6464 | 1.073 | 1.61800 | 63.33 |
| 4 | 16.9420 | 6.722 | | |
| 5 | −96.1192 | 0.858 | 1.80000 | 29.84 |
| 6 | 28.6256 | 21.069 | | |
| 7 | −61.4227 | 2.148 | 1.61800 | 63.33 |
| 8 | 40.3354 | DD[8] | | |
| 9 | −90.4267 | 2.148 | 1.61340 | 44.27 |
| 10 | −26.1910 | DD[10] | | |
| 11 | 23.6952 | 2.490 | 1.62004 | 36.26 |
| 12 | 145.1646 | 0.000 | | |
| 13 | 22.5174 | 0.805 | 1.49700 | 81.54 |
| 14 | 16.1394 | 24.258 | | |
| 15 (aperture Stop) | ∞ | DD[15] | | |
| 16 | 115.8703 | 3.752 | 1.49700 | 81.54 |
| 17 | −14.8330 | 0.054 | | |
| 18 | −14.8044 | 1.611 | 1.84501 | 43.50 |
| 19 | −20.7760 | DD[19] | | |
| *20 | 24.8007 | 0.268 | 1.52771 | 41.85 |
| 21 | 35.1740 | 0.536 | 1.84499 | 39.40 |
| 22 | 18.1974 | 2.746 | | |
| 23 | −11.8592 | 1.617 | 1.82521 | 45.48 |
| 24 | 40.1636 | 3.549 | 1.49700 | 81.54 |
| 25 | −18.0499 | 0.591 | | |
| 26 | 131.9405 | 4.852 | 1.49700 | 81.54 |
| 27 | −16.1881 | DD[27] | | |
| 28 | 35.7619 | 2.975 | 1.49700 | 81.54 |
| 29 | −97.0667 | 9.663 | | |
| 30 | ∞ | 37.576 | 1.51633 | 64.14 |
| 31 | ∞ | 1.610 | 1.50847 | 61.19 |
| 32 | ∞ | | | |

*aspherical Surface

TABLE 6

Example 3: Data Related to Zoom

| | Wide Angle | Intermediate | Telephoto |
|---|---|---|---|
| Zoom Ratio | 1.00 | 1.23 | 1.50 |
| f | 10.00 | 12.25 | 15.00 |
| Bf | 35.51 | 35.51 | 35.51 |
| FNo. | 2.50 | 2.50 | 2.50 |
| 2ω (°) | 62.8 | 53.2 | 44.4 |
| DD[8] | 8.470 | 6.755 | 4.831 |
| DD[10] | 16.083 | 6.546 | 0.514 |
| DD[15] | 7.381 | 8.111 | 6.124 |
| DD[19] | 0.268 | 5.916 | 14.223 |
| DD[27] | 0.269 | 5.144 | 6.778 |
| Stop Diameter | 12.232 | 13.932 | 16.194 |

TABLE 7

Example 3: Aspherical Surface Data

| Surface Number | 20 |
|---|---|
| KA | −3.0102846E+00 |
| A4 | 2.4570443E−05 |
| A6 | −1.4061270E−07 |
| A8 | 1.1295324E−09 |
| A10 | −2.1103229E−11 |

Meanwhile, A through L of FIG. 21 are diagrams that illustrate various aberrations of the projection zoom lens of Example 3.

Example 4

Figure 4:
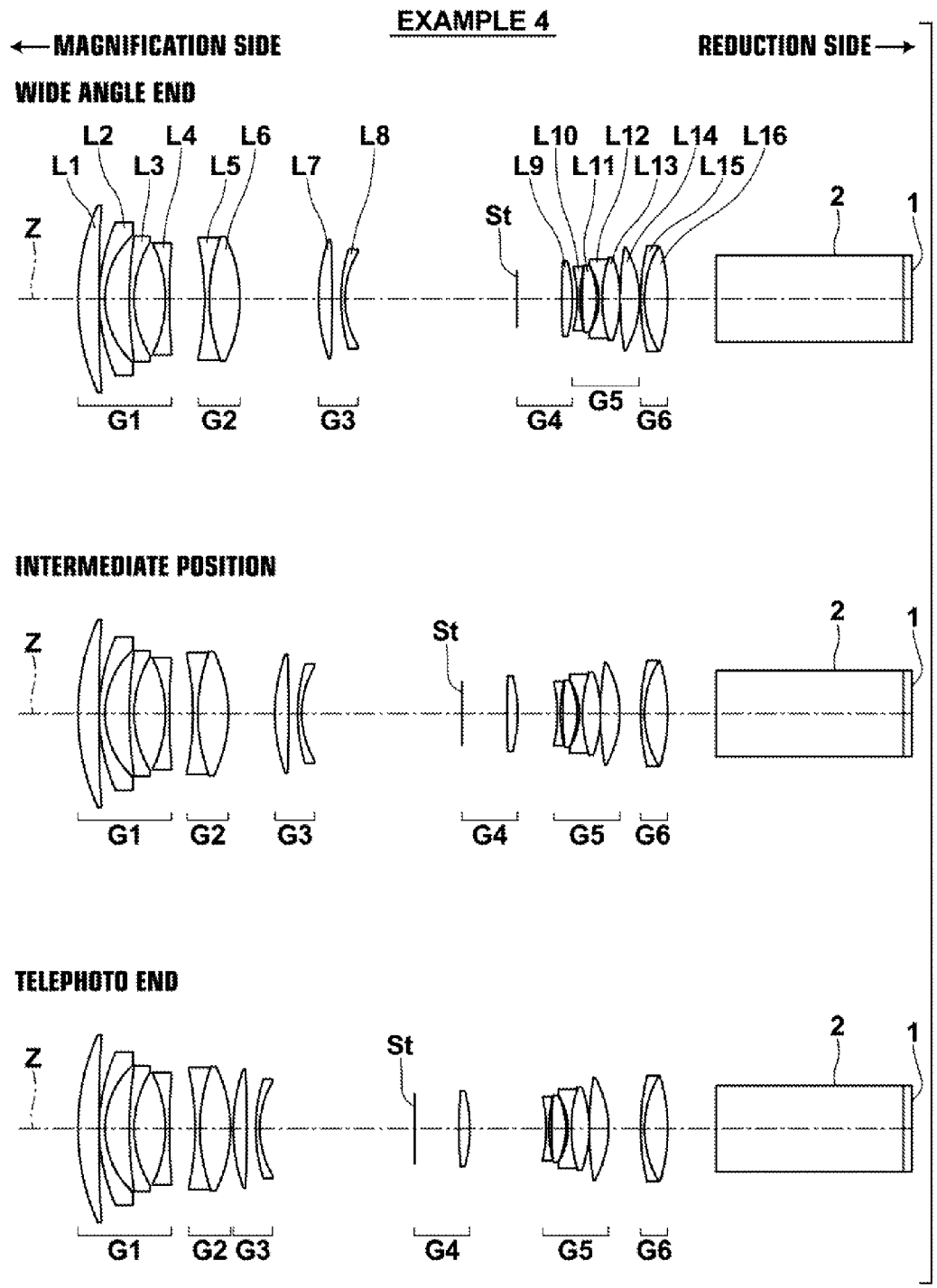
FIG. 4 is a collection of sectional diagrams that illustrate the lens configuration of a projection zoom lens according to Example 4 of the present invention.

FIG. 4 illustrates the arrangements of lens groups of the projection zoom lens of Example 4 at the wide angle end, an intermediate position, and the telephoto end. In Example 4, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens L6, provided in this order from the magnification side.

A third lens group G3 is constituted by two lenses, which are a positive seventh lens L7 and a negative eighth lens L8, provided in this order from the magnification side. A fourth lens group G4 is constituted by an aperture stop St, which is a variable stop, and a positive ninth lens L9, provided in this order from the magnification side.

A fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. A sixth lens group G6 is constituted by two lenses, which are a negative fifteenth lens L15 and a positive sixteenth lens L16, provided in this order from the magnification side.

Note that the fifth lens L5 and the sixth lens L6 are cemented together, the twelfth lens L12 and the thirteenth lens L13 are cemented together, and the fifteenth lens L15 and the sixteenth lens L16 are cemented together as well.

Table 8 shows basic lens data of the projection zoom lens of Example 4. In addition, Table 9 shows data related to items at the wide angle end, the intermediate position, and the telephoto end as the projection zoom lens of Example 4 changes magnification, in the same manner as Table 2. The items and the manners in which they are shown are as described previously.

TABLE 8

Example 4: Basic Lens Data

| Si (Surface Number) | Ri (Radius of Curvature) | Di (Distance) | Ndj (Refractive Index) | νdj (Abbe's Number) |
|---|---|---|---|---|
| 1 | 47.6244 | 4.170 | 1.62299 | 58.16 |
| 2 | 342.8017 | 0.107 | | |
| 3 | 38.4051 | 1.147 | 1.61800 | 63.33 |
| 4 | 17.8824 | 4.848 | | |
| 5 | 82.6651 | 0.965 | 1.71299 | 53.87 |
| 6 | 22.3424 | 6.268 | | |
| 7 | −25.5241 | 0.857 | 1.61800 | 63.33 |
| 8 | 195.3033 | DD[8] | | |
| 9 | −57.4995 | 0.970 | 1.84661 | 23.78 |
| 10 | 36.2694 | 6.107 | 1.74950 | 35.33 |
| 11 | −28.6044 | DD[11] | | |
| 12 | 36.6738 | 2.742 | 1.71736 | 29.52 |
| 13 | −286.0788 | 1.765 | | |
| 14 | 34.3412 | 0.804 | 1.49700 | 81.54 |
| 15 | 18.7183 | DD[15] | | |
| 16 (aperture Stop) | ∞ | 8.975 | | |
| 17 | 139.0259 | 2.143 | 1.49700 | 81.54 |
| 18 | −29.3123 | DD[18] | | |
| 19 | −27.4161 | 0.536 | 1.78800 | 47.37 |
| 20 | 27.6022 | 0.493 | | |
| 21 | 61.9035 | 2.880 | 1.51742 | 52.43 |
| 22 | −16.0045 | 0.454 | | |
| 23 | −12.9940 | 0.648 | 1.78800 | 47.37 |
| 24 | 27.7002 | 3.574 | 1.61800 | 63.33 |
| 25 | −25.4591 | 0.000 | | |
| 26 | 65.3022 | 3.855 | 1.61800 | 63.33 |
| 27 | −21.3736 | DD[27] | | |
| 28 | 46.6856 | 0.755 | 1.71299 | 53.87 |
| 29 | 21.6274 | 4.635 | 1.49700 | 81.54 |
| 30 | −37.7068 | 9.646 | | |
| 31 | ∞ | 37.509 | 1.51633 | 64.14 |
| 32 | ∞ | 1.608 | 1.50847 | 61.19 |
| 33 | ∞ | | | |

TABLE 9

Example 4: Data Related to Zoom

| | Wide Angle | Intermediate | Telephoto |
|---|---|---|---|
| Zoom Ratio | 1.00 | 1.20 | 1.43 |
| f | 10.00 | 11.96 | 14.30 |
| Bf | 35.45 | 35.45 | 35.45 |
| FNo. | 2.50 | 2.50 | 2.50 |
| 2ω (°) | 62.8 | 54.2 | 46.2 |
| DD[8] | 6.954 | 4.636 | 5.053 |
| DD[11] | 15.673 | 9.320 | 0.531 |
| DD[15] | 34.389 | 32.115 | 30.937 |
| DD[18] | 0.931 | 7.963 | 15.246 |
| DD[27] | 0.269 | 4.183 | 6.449 |
| Stop Diameter | 11.298 | 12.734 | 14.12 |

Meanwhile, A through L of FIG. 22 are diagrams that illustrate various aberrations of the projection zoom lens of Example 4.

Example 5

FIG. 5 illustrates the arrangements of lens groups of the projection zoom lens of Example 5 at the wide angle end, an intermediate position, and the telephoto end. In Example 5, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens L6, provided in this order from the magnification side. A third lens group G3 is constituted by two lenses, which are a positive seventh lens L7 and a negative eighth lens L8, provided in this order from the magnification side. A fourth lens group G4 is constituted by an aperture stop St, which is a variable stop, and a positive ninth lens L9, provided in this order from the magnification side.

A fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. A sixth lens group G6 is constituted by a single positive fifteenth lens L15.

Note that the fifth lens L5 and the sixth lens L6 are cemented together, and the twelfth lens L12 and the thirteenth lens L13 are cemented together as well.

Table 10 shows basic lens data of the projection zoom lens of Example 5. In addition, Table 11 shows data related to items at the wide angle end, the intermediate position, and the telephoto end as the projection zoom lens of Example 5 changes magnification, in the same manner as Table 2. The items and the manners in which they are shown are as described previously.

TABLE 10

Example 5: Basic Lens Data

| Si (Surface Number) | Ri (Radius of Curvature) | Di (Distance) | Ndj (Refractive Index) | νdj (Abbe's Number) |
|---|---|---|---|---|
| 1 | 47.0437 | 3.350 | 1.67003 | 47.23 |
| 2 | 330.2142 | 0.097 | | |
| 3 | 34.7902 | 1.015 | 1.62299 | 58.16 |
| 4 | 16.7348 | 3.911 | | |
| 5 | 117.0256 | 0.890 | 1.62041 | 60.29 |
| 6 | 22.4972 | 4.230 | | |
| 7 | −32.0741 | 0.774 | 1.62299 | 58.16 |
| 8 | 60.4108 | DD[8] | | |
| 9 | −119.2924 | 0.779 | 1.84661 | 23.78 |
| 10 | 24.8416 | 5.371 | 1.73800 | 32.26 |
| 11 | −37.2610 | DD[11] | | |
| 12 | 34.9176 | 2.678 | 1.74950 | 35.28 |
| 13 | −188.1975 | 6.730 | | |
| 14 | 25.4222 | 0.725 | 1.48749 | 70.23 |
| 15 | 14.8481 | DD[15] | | |
| 16 (aperture stop) | ∞ | 7.735 | | |
| 17 | 113.1459 | 2.379 | 1.49700 | 81.54 |
| 18 | −24.3331 | DD[18] | | |
| 19 | −21.3273 | 0.532 | 1.74320 | 49.34 |
| 20 | 26.4153 | 0.450 | | |
| 21 | 65.3902 | 3.128 | 1.51633 | 64.14 |
| 22 | −13.4188 | 0.280 | | |
| 23 | −11.7678 | 0.633 | 1.77250 | 49.60 |
| 24 | 71.5360 | 3.486 | 1.49700 | 81.54 |
| 25 | −18.6012 | 0.793 | | |
| 26 | 124.6524 | 4.046 | 1.49700 | 81.54 |
| 27 | −17.0531 | DD[27] | | |
| 28 | 39.7147 | 2.683 | 1.49700 | 81.54 |
| 29 | −63.1218 | 8.717 | | |
| 30 | ∞ | 33.841 | 1.51633 | 64.14 |
| 31 | ∞ | 1.450 | 1.50847 | 61.19 |
| 32 | ∞ | | | |

TABLE 11

Example 5: Data Related to Zoom

| | Wide Angle | Intermediate | Telephoto |
|---|---|---|---|
| Zoom Ratio | 1.00 | 1.32 | 1.58 |
| f | 10.00 | 13.20 | 15.80 |
| Bf | 0.01 | 0.01 | 0.01 |

TABLE 11-continued

Example 5: Data Related to Zoom

|  | Wide Angle | Intermediate | Telephoto |
|---|---|---|---|
| FNo. | 2.50 | 2.50 | 2.50 |
| 2ω (°) | 57.8 | 45.2 | 38.4 |
| DD[8] | 11.670 | 8.093 | 7.465 |
| DD[11] | 15.386 | 6.207 | 0.578 |
| DD[15] | 21.430 | 19.285 | 17.350 |
| DD[18] | 0.941 | 9.383 | 16.288 |
| DD[27] | 0.244 | 6.704 | 7.991 |
| Stop Diameter | 10.142 | 12.2748 | 13.7542 |

Meanwhile, A through L of FIG. 23 are diagrams that illustrate various aberrations of the projection zoom lens of Example 5.

Example 6

FIG. 6 illustrates the arrangements of lens groups of the projection zoom lens of Example 6 at the wide angle end, an intermediate position, and the telephoto end. In Example 6, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens L6, provided in this order from the magnification side.

A third lens group G3 is constituted by two lenses, which are a positive seventh lens L7 and a negative eighth lens L8, provided in this order from the magnification side. A fourth lens group G4 is constituted by an aperture stop St, which is a variable stop, and a positive ninth lens L9, provided in this order from the magnification side.

A fifth lens group G5 is constituted by five lenses, which are a negative tenth lens L10, a positive eleventh lens L11, a negative twelfth lens L12, a positive thirteenth lens L13, and a positive fourteenth lens L14, provided in this order from the magnification side. A sixth lens group G6 is constituted by a single positive fifteenth lens L15.

Note that the fifth lens L5 and the sixth lens L6 are cemented together, and the twelfth lens L12 and the thirteenth lens L13 are cemented together as well.

Table 12 shows basic lens data of the projection zoom lens of Example 6. In addition, Table 13 shows data related to items at the wide angle end, the intermediate position, and the telephoto end as the projection zoom lens of Example 6 changes magnification, in the same manner as Table 2. The items and the manners in which they are shown are as described previously.

TABLE 12

Example 6: Basic Lens Data

| Si (Surface Number) | Ri (Radius of Curvature) | Di (Distance) | Ndj (Refractive Index) | νdj (Abbe's Number) |
|---|---|---|---|---|
| 1 | 50.0884 | 3.237 | 1.70154 | 41.24 |
| 2 | 384.8019 | 0.097 |  |  |
| 3 | 35.9455 | 1.015 | 1.63854 | 55.38 |
| 4 | 17.3466 | 3.760 |  |  |
| 5 | 108.3901 | 0.894 | 1.62041 | 60.29 |
| 6 | 21.7691 | 4.354 |  |  |
| 7 | −31.7646 | 0.774 | 1.58913 | 61.14 |
| 8 | 60.9474 | DD[8] |  |  |
| 9 | −96.9782 | 0.827 | 1.84661 | 23.78 |
| 10 | 24.7320 | 5.402 | 1.73800 | 32.26 |
| 11 | −36.3082 | DD[11] |  |  |
| 12 | 34.6544 | 2.666 | 1.74950 | 35.28 |
| 13 | −217.1542 | 7.002 |  |  |
| 14 | 25.6579 | 0.725 | 1.48749 | 70.23 |
| 15 | 15.0992 | DD[15] |  |  |
| 16 (aperture stop) | ∞ | 7.614 |  |  |
| 17 | 111.3602 | 3.449 | 1.49700 | 81.54 |
| 18 | −24.7471 | DD[18] |  |  |
| 19 | −21.5612 | 0.532 | 1.72916 | 54.68 |
| 20 | 27.6715 | 0.429 |  |  |
| 21 | 63.9589 | 3.097 | 1.48749 | 70.23 |
| 22 | −13.5757 | 0.290 |  |  |
| 23 | −11.9088 | 0.633 | 1.78800 | 47.37 |
| 24 | 50.0219 | 3.319 | 1.53715 | 74.81 |
| 25 | −19.6002 | 0.484 |  |  |
| 26 | 121.8129 | 4.030 | 1.53715 | 74.81 |
| 27 | −17.3652 | DD[27] |  |  |
| 28 | 39.9649 | 2.651 | 1.49700 | 81.54 |
| 29 | −64.6217 | 8.716 |  |  |
| 30 | ∞ | 33.841 | 1.51633 | 64.14 |
| 31 | ∞ | 1.450 | 1.50847 | 61.19 |
| 32 | ∞ |  |  |  |

TABLE 13

Example 6: Data Related to Zoom

|  | Wide Angle | Intermediate | Telephoto |
|---|---|---|---|
| Zoom Ratio | 1.00 | 1.32 | 1.58 |
| f′ | 10.00 | 13.20 | 15.80 |
| Bf | 0.01 | 0.01 | 0.01 |
| FNo. | 2.50 | 2.50 | 2.50 |
| 2ω (°) | 57.8 | 45.2 | 38.2 |
| DD[8] | 10.981 | 7.638 | 7.110 |
| DD[11] | 15.359 | 6.112 | 0.579 |
| DD[15] | 21.494 | 19.273 | 17.158 |
| DD[18] | 0.972 | 9.667 | 16.934 |
| DD[27] | 0.250 | 6.366 | 7.275 |
| Stop Diameter | 10.217 | 12.3132 | 13.7752 |

Meanwhile, A through L of FIG. 24 are diagrams that illustrate various aberrations of the projection zoom lens of Example 6.

Example 7

FIG. 7 illustrates the arrangements of lens groups of the projection zoom lens of Example 7 at the wide angle end, an intermediate position, and the telephoto end. The projection zoom lens of Example 7 consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a negative refractive power, and moves while changing magnification; a fifth lens group G5 which is positioned at the reduction side after the second lens group G4, has a positive refractive power, and moves while changing magnification; and a sixth lens group G6, which is provided most toward the reduction side, has a positive refractive power, and is fixed while changing magnification. The projection zoom lens of Example 7 is configured such that the reduction side is telecentric. The configuration of the lens groups described above is common to Examples 7 and 8.

In Example 7, a first lens group G1 is constituted by four lenses, which are a positive first lens L1, a negative second lens L2, a negative third lens L3, and a negative fourth lens L4, provided in this order from the magnification side. A second lens group G2 is constituted by a negative fifth lens L5 and a positive sixth lens L6, provided in this order from the magnification side.

A third lens group G3 is constituted by a single positive seventh lens L7. A fourth lens group G4 is constituted by an aperture stop St, which is a variable stop, and a negative eighth lens L8, provided in this order from the magnification side.

A fifth lens group G5 is constituted by five lenses, which are a negative ninth lens L9, a positive tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the fifth lens L5 and the sixth lens L6 are cemented together, and the twelfth lens L12 and the thirteenth lens L13 are cemented together as well.

Table 14 shows basic lens data of the projection zoom lens of Example 7. In addition, Table 15 shows data related to items at the wide angle end, the intermediate position, and the telephoto end as the projection zoom lens of Example 7 changes magnification, in the same manner as Table 2. The items and the manners in which they are shown are as described previously.

TABLE 14

Example 7: Basic Lens Data

| Si (Surface Number) | Ri (Radius of Curvature) | Di (Distance) | Ndj (Refractive Index) | νdj (Abbe's Number) |
|---|---|---|---|---|
| 1 | 48.1363 | 3.632 | 1.62299 | 58.16 |
| 2 | −1316.2876 | 0.614 | | |
| 3 | 33.0425 | 1.025 | 1.63854 | 55.38 |
| 4 | 15.6313 | 3.864 | | |
| 5 | 378.8269 | 0.885 | 1.72342 | 37.95 |
| 6 | 22.6357 | 3.917 | | |
| 7 | −25.7503 | 0.774 | 1.61800 | 63.33 |
| 8 | 25.7503 | DD[8] | | |
| 9 | 53.8423 | 0.924 | 1.74077 | 27.79 |
| 10 | 15.7094 | 8.168 | 1.73800 | 32.26 |
| 11 | −36.5776 | DD[11] | | |
| 12 | 43.9205 | 2.554 | 1.51823 | 58.90 |
| 13 | −72.8993 | DD[13] | | |
| 14 (aperture stop) | ∞ | 4.836 | | |
| 15 | −29.9496 | 0.580 | 1.77250 | 49.60 |
| 16 | −73.3444 | DD[16] | | |
| 17 | 228.2400 | 0.580 | 1.80610 | 33.27 |
| 18 | 16.9946 | 0.088 | | |
| 19 | 18.1462 | 5.615 | 1.49700 | 81.61 |
| 20 | −9.2265 | 0.064 | | |
| 21 | −9.0930 | 0.658 | 1.83481 | 42.73 |
| 22 | 51.9940 | 3.806 | 1.62004 | 36.26 |
| 23 | −21.5508 | 0.783 | | |
| 24 | ∞ | 4.178 | 1.49700 | 81.61 |
| 25 | −15.0657 | DD[25] | | |
| 26 | 38.3182 | 1.978 | 1.70154 | 41.24 |
| 27 | ∞ | 8.756 | | |

TABLE 14-continued

Example 7: Basic Lens Data

| Si (Surface Number) | Ri (Radius of Curvature) | Di (Distance) | Ndj (Refractive Index) | νdj (Abbe's Number) |
|---|---|---|---|---|
| 28 | ∞ | 33.853 | 1.51633 | 64.14 |
| 29 | ∞ | 1.451 | 1.50847 | 61.19 |
| 30 | ∞ | | | |

TABLE 15

Example 7: Data Related to Zoom

| | Wide Angle | Intermediate | Telephoto |
|---|---|---|---|
| Zoom Ratio | 1.00 | 1.32 | 1.58 |
| f | 10.00 | 13.20 | 15.80 |
| Bf | 0.05 | 0.05 | 0.05 |
| FNo. | 2.50 | 2.50 | 2.50 |
| 2ω (°) | 57.6 | 45.2 | 38.2 |
| DD[8] | 6.511 | 5.643 | 5.833 |
| DD[11] | 31.331 | 17.426 | 4.533 |
| DD[13] | 9.979 | 19.688 | 21.827 |
| DD[16] | 8.827 | 4.475 | 5.615 |
| DD[25] | 0.231 | 9.645 | 19.071 |
| Stop Diameter | 10.1512 | 10.9926 | 11.6166 |

Meanwhile, A through L of FIG. 25 are diagrams that illustrate various aberrations of the projection zoom lens of Example 7.

Example 8

Figure 8:
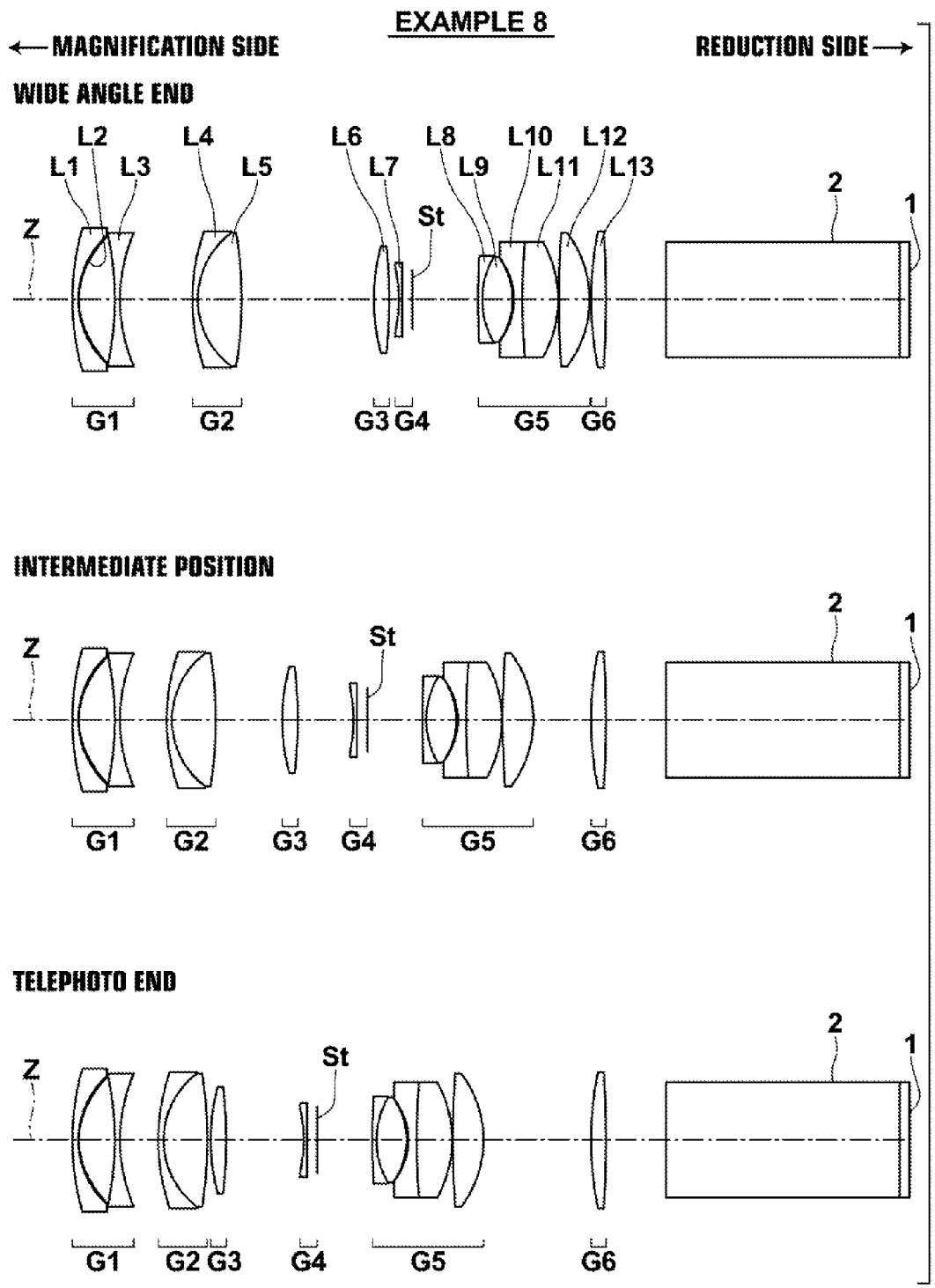
FIG. 8 is a collection of sectional diagrams that illustrate the lens configuration of a projection zoom lens according to Example 8 of the present invention.

FIG. 8 illustrates the arrangements of lens groups of the projection zoom lens of Example 8 at the wide angle end, an intermediate position, and the telephoto end. In Example 8, a first lens group G1 is constituted by three lenses, which are a negative first lens L1, a negative second lens L2, and a negative third lens L3, provided in this order from the magnification side. A second lens group G2 is constituted by a negative fourth lens L4 and a positive fifth lens L5, provided in this order from the magnification side.

A third lens group G3 is constituted by a single positive sixth lens L6. A fourth lens group G4 is constituted by a negative seventh lens L7 and an aperture stop St, which is a variable stop, provided in this order from the magnification side.

A fifth lens group G5 is constituted by five lenses, which are a negative eighth lens L8, a positive ninth lens L9, a negative tenth lens L10, a positive eleventh lens L11, and a positive twelfth lens L12, provided in this order from the magnification side. A sixth lens group G6 is constituted by a single positive thirteenth lens L13.

Note that the fourth lens L4 and the fifth lens L5 are cemented together, the eighth lens L8 and the ninth lens L9 are cemented together, and the tenth lens L10 and the eleventh lens L11 are cemented together as well. In addition, the second lens L2 is formed by a thin resin layer which is adhesively attached to the surface of the first lens L1 toward the reduction side, and forms a compound aspherical surface.

Table 16 shows basic lens data of the projection zoom lens of Example 8. In addition, Table 17 shows data related to items at the wide angle end, the intermediate position, and the telephoto end as the projection zoom lens of Example 8 changes magnification, in the same manner as Table 2.

Further, Table 18 shows data related to the aspherical surface of the second lens L2 toward the reduction side (the surface having surface number 3).

TABLE 16

Example 8: Basic Lens Data

| Si (Surface Number) | Ri (Radius of Curvature) | Di (Distance) | Ndj (Refractive Index) | vdj (Abbe's Number) |
|---|---|---|---|---|
| 1 | 38.8679 | 0.872 | 1.67003 | 47.23 |
| 2 | 12.8384 | 0.073 | 1.52771 | 41.86 |
| *3 | 11.2617 | 5.209 | | |
| 4 | −46.1298 | 0.751 | 1.49700 | 81.54 |
| 5 | 24.9090 | DD[5] | | |
| 6 | 30.7719 | 0.780 | 1.74077 | 27.79 |
| 7 | 12.3571 | 6.351 | 1.73800 | 32.26 |
| 8 | −62.9591 | DD[8] | | |
| 9 | 30.4509 | 2.257 | 1.51742 | 52.43 |
| 10 | −69.9484 | DD[10] | | |
| 11 | −22.3193 | 0.509 | 1.72916 | 54.68 |
| 12 | 4825.4325 | 1.453 | | |
| 13 (aperture stop) | ∞ | DD[13] | | |
| 14 | 156.9934 | 0.587 | 1.80400 | 46.58 |
| 15 | 12.6311 | 4.398 | 1.49700 | 81.54 |
| 16 | −10.8480 | 0.222 | | |
| 17 | −9.8962 | 1.217 | 1.80400 | 46.58 |
| 18 | 104.4568 | 5.189 | 1.49700 | 81.54 |
| 19 | −17.4220 | 0.096 | | |
| 20 | 138.5610 | 4.469 | 1.49700 | 81.54 |
| 21 | −16.4603 | DD[21] | | |
| 22 | 51.6540 | 2.155 | 1.67003 | 47.23 |
| 23 | −152.6019 | 8.770 | | |
| 24 | ∞ | 33.914 | 1.51633 | 64.14 |
| 25 | ∞ | 1.453 | 1.50847 | 61.19 |
| 26 | ∞ | | | |

*aspherical surface

TABLE 17

Example 8: Data Related to Zoom

| | Wide Angle | Intermediate | Telephoto |
|---|---|---|---|
| Zoom Ratio | 1.00 | 1.32 | 1.58 |
| f | 10.00 | 13.20 | 15.80 |
| Bf | 0.05 | 0.05 | 0.05 |
| FNo. | 2.50 | 2.50 | 2.50 |
| 2ω (°) | 57.8 | 45.0 | 38.2 |
| DD[5] | 10.522 | 6.788 | 5.561 |
| DD[8] | 19.225 | 9.646 | 0.483 |
| DD[10] | 1.370 | 8.118 | 11.244 |
| DD[13] | 9.613 | 8.009 | 8.039 |
| DD[21] | 0.228 | 8.397 | 15.631 |
| Stop Diameter | 8.6432 | 9.3216 | 9.806 |

TABLE 18

Example 8: Aspherical Surface Data

| | Surface Number 3 |
|---|---|
| KA | 1.0000000E+00 |
| A3 | 6.7776168E−06 |
| A4 | −5.7833183E−05 |
| A5 | −4.9497647E−06 |
| A6 | 2.0585791E−06 |
| A7 | −2.1978980E−07 |
| A8 | −1.3484847E−07 |
| A9 | 4.9158816E−08 |
| A10 | −7.3692226E−09 |
| A11 | 6.1627499E−10 |
| A12 | −4.8390077E−11 |

TABLE 18-continued

Example 8: Aspherical Surface Data

| | Surface Number 3 |
|---|---|
| A13 | 5.2879972E−12 |
| A14 | −3.9439680E−13 |
| A15 | 1.1068858E−14 |
| A16 | 2.1443745E−17 |

Meanwhile, A through L of FIG. 26 are diagrams that illustrate various aberrations of the projection zoom lens of Example 8.

Example 9

FIG. 9 illustrates the arrangements of lens groups of the projection zoom lens of Example 9 at the wide angle end, an intermediate position, and the telephoto end. The projection zoom lens of Example 9 consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; a fifth lens group G5 which is positioned at the reduction side after the second lens group G4, has a positive refractive power, and moves while changing magnification; and a sixth lens group G6, which is provided most toward the reduction side, has a positive refractive power, and is fixed while changing magnification. The projection zoom lens of Example 9 is configured such that the reduction side is telecentric. The configuration of the lens groups described above is common to Examples 9 and 10.

In Example 9, a first lens group G1 is constituted by three lenses, which are a positive first lens L1, a negative second lens L2, and a negative third lens L3, provided in this order from the magnification side. A second lens group G2 is constituted by a negative fourth lens L4 and a positive fifth lens L5, provided in this order from the magnification side.

A third lens group G3 is constituted by a positive sixth lens L6 and a negative seventh lens L7, provided in this order from the magnification side. A fourth lens group G4 is constituted by a single positive eighth lens L8.

A fifth lens group G5 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the fourth lens L4 and the fifth lens L5 are cemented together, and the eleventh lens L11 and the twelfth lens L12 are cemented together as well.

Table 19 shows basic lens data of the projection zoom lens of Example 9. In addition, Table 20 shows data related to items at the wide angle end, the intermediate position, and the telephoto end as the projection zoom lens of Example 9 changes

TABLE 19

Example 9: Basic Lens Data

| Si (Surface Number) | Ri (Radius of Curvature) | Di (Distance) | Ndj (Refractive Index) | νdj (Abbe's Number) |
|---|---|---|---|---|
| 1 | 57.1672 | 2.570 | 1.63854 | 55.38 |
| 2 | −119.3632 | 1.522 | | |
| 3 | 28.2685 | 1.054 | 1.77250 | 49.60 |
| 4 | 13.3522 | 3.773 | | |
| 5 | −22.6907 | 0.851 | 1.80518 | 25.42 |
| 6 | 30.2483 | DD[6] | | |
| 7 | −16.7245 | 0.871 | 1.63854 | 55.38 |
| 8 | −72.0209 | 2.441 | 1.73800 | 32.26 |
| 9 | −16.5806 | DD[9] | | |
| 10 | 40.8653 | 2.529 | 1.72047 | 34.71 |
| 11 | −40.8653 | 0.130 | | |
| 12 | −35.7758 | 0.758 | 1.62004 | 36.26 |
| 13 | −100.5522 | DD[13] | | |
| 14 | 33.8872 | 2.758 | 1.49700 | 81.54 |
| 15 | −50.9500 | DD[15] | | |
| 16 (aperture stop) | ∞ | 1.986 | | |
| 17 | −20.9424 | 1.162 | 1.51742 | 52.43 |
| 18 | 16.4127 | 0.583 | | |
| 19 | 56.7932 | 3.028 | 1.48749 | 70.23 |
| 20 | −8.2620 | 0.021 | | |
| 21 | −8.1912 | 1.196 | 1.78800 | 47.37 |
| 22 | 43.9783 | 3.875 | 1.49700 | 81.54 |
| 23 | −17.3897 | 0.081 | | |
| 24 | 77.6965 | 4.212 | 1.49700 | 81.54 |
| 25 | −15.0184 | DD[25] | | |
| 26 | 43.2833 | 1.986 | 1.49700 | 81.54 |
| 27 | −57.6954 | 7.164 | | |
| 28 | ∞ | 27.804 | 1.51633 | 64.14 |
| 29 | ∞ | 1.192 | 1.50847 | 61.19 |
| 30 | ∞ | | | |

TABLE 20

Example 9: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.29 | 26.29 | 26.29 |
| FNo. | 2.50 | 2.50 | 2.50 |
| 2ω (°) | 48.6 | 38.2 | 30.0 |
| DD[6] | 5.724 | 5.401 | 4.531 |
| DD[9] | 12.639 | 4.689 | 1.585 |
| DD[13] | 30.119 | 26.939 | 19.126 |
| DD[15] | 0.794 | 8.305 | 15.670 |
| DD[25] | 0.475 | 4.417 | 8.839 |
| Stop Diameter | 8.768 | 9.180 | 9.644 |

Meanwhile, A through L of FIG. 27 are diagrams that illustrate various aberrations of the projection zoom lens of Example 9.

Example 10

FIG. 10 illustrates the arrangements of lens groups of the projection zoom lens of Example 10 at the wide angle end, an intermediate position, and the telephoto end. In Example 10, a first lens group G1 is constituted by three lenses, which are a positive first lens L1, a negative second lens L2, and a negative third lens L3, provided in this order from the magnification side. A second lens group G2 is constituted by a negative fourth lens L4 and a positive fifth lens L5, provided in this order from the magnification side.

A third lens group G3 is constituted by positive sixth lens L6 and a negative seventh lens L7, provided in this order from the magnification side. A fourth lens group G4 is constituted by a single positive eighth lens L8.

A fifth lens group G5 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the fourth lens L4 and the fifth lens L5 are cemented together, and the eleventh lens L11 and the twelfth lens L12 are cemented together as well.

Table 21 shows basic lens data of the projection zoom lens of Example 10. In addition, Table 22 shows data related to items at the wide angle end, the intermediate position, and the telephoto end as the projection zoom lens of Example 10 changes

TABLE 21

Example 10: Basic Lens Data

| Si (Surface Number) | Ri (Radius of Curvature) | Di (Distance) | Ndj (Refractive Index) | νdj (Abbe's Number) |
|---|---|---|---|---|
| 1 | 49.0359 | 2.779 | 1.63854 | 55.38 |
| 2 | −115.0091 | 0.582 | | |
| 3 | 29.1697 | 0.884 | 1.71299 | 53.87 |
| 4 | 13.8954 | 3.946 | | |
| 5 | −25.7555 | 0.851 | 1.80518 | 25.42 |
| 6 | 26.7993 | DD[6] | | |
| 7 | −17.9988 | 0.897 | 1.62299 | 58.16 |
| 8 | −98.3079 | 2.461 | 1.73800 | 32.26 |
| 9 | −18.2535 | DD[9] | | |
| 10 | 44.0536 | 2.374 | 1.72047 | 34.71 |
| 11 | −44.0536 | 0.643 | | |
| 12 | −37.9866 | 0.788 | 1.60342 | 38.03 |
| 13 | −101.6000 | DD[13] | | |
| 14 | 40.6142 | 1.795 | 1.49700 | 81.54 |
| 15 | −44.7319 | DD[15] | | |
| 16 (aperture stop) | ∞ | 1.986 | | |
| 17 | −19.8048 | 1.144 | 1.51742 | 52.43 |
| 18 | 16.9153 | 0.589 | | |
| 19 | 90.5883 | 3.688 | 1.53715 | 74.81 |
| 20 | −8.1797 | 0.020 | | |
| 21 | −8.1196 | 1.195 | 1.78800 | 47.37 |
| 22 | 40.3923 | 3.698 | 1.53715 | 74.81 |
| 23 | −20.8848 | 0.207 | | |
| 24 | 96.4056 | 4.111 | 1.53715 | 74.81 |
| 25 | −15.2648 | DD[25] | | |
| 26 | 37.1467 | 1.986 | 1.49700 | 81.54 |
| 27 | −71.0526 | 7.159 | | |
| 28 | ∞ | 27.802 | 1.51633 | 64.14 |
| 29 | ∞ | 1.192 | 1.50847 | 61.19 |
| 30 | ∞ | | | |

TABLE 22

Example 10: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.28 | 26.28 | 26.28 |
| FNo. | 2.50 | 2.50 | 2.50 |
| 2ω (°) | 48.6 | 38.2 | 30.0 |
| DD[6] | 6.950 | 6.347 | 4.749 |
| DD[9] | 11.715 | 3.713 | 1.588 |
| DD[13] | 31.178 | 28.028 | 19.856 |
| DD[15] | 0.794 | 8.957 | 17.554 |
| DD[25] | 0.475 | 4.067 | 7.365 |
| Stop Diameter | 8.614 | 8.976 | 9.308 |

Meanwhile, A through L of FIG. 28 are diagrams that illustrate various aberrations of the projection zoom lens of Example 10.

Example 11

Figure 11:
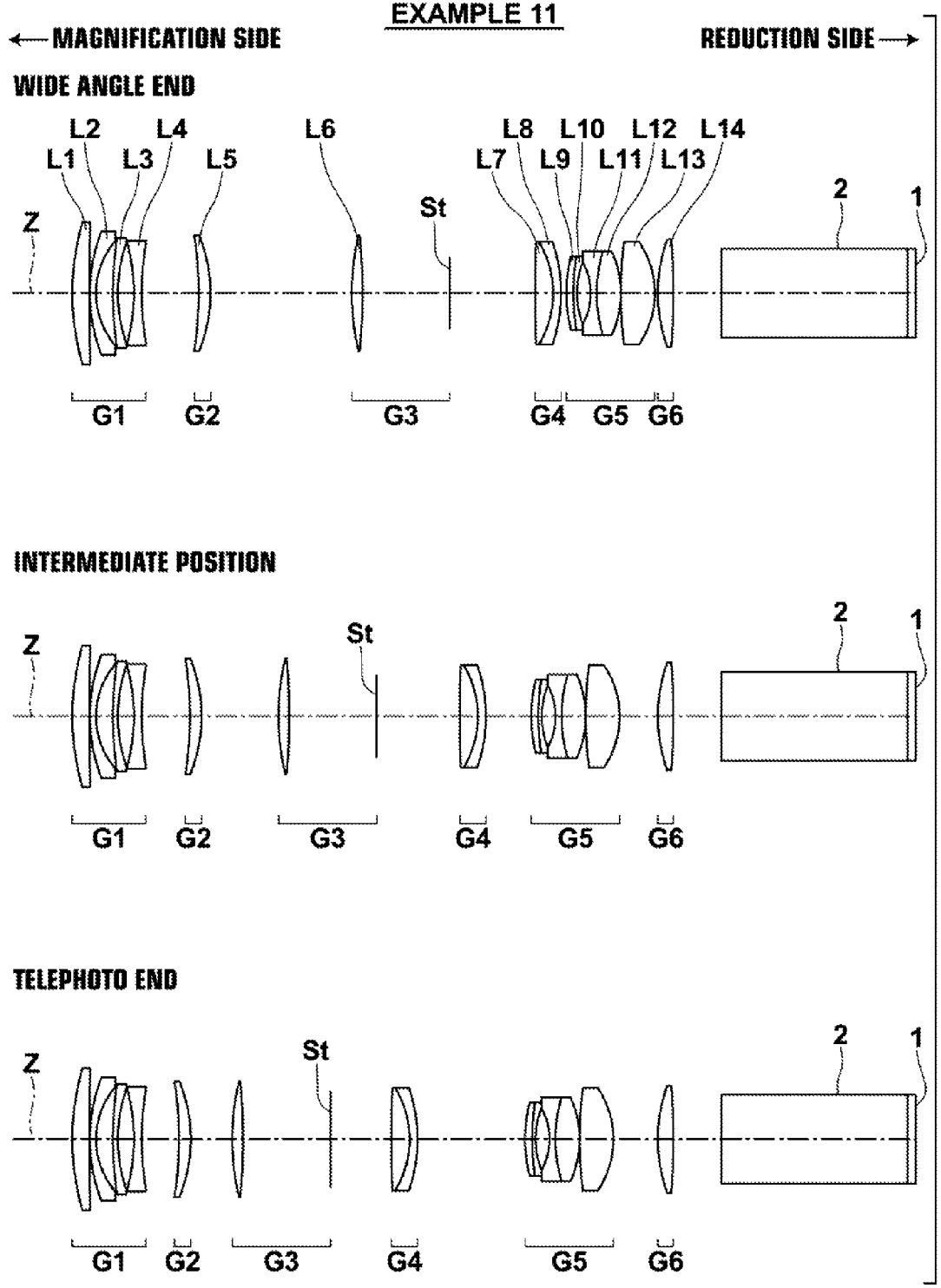
FIG. 11 is a collection of sectional diagrams that illustrate the lens configuration of a projection zoom lens according to Example 11 of the present invention.

FIG. 11 illustrates the arrangements of lens groups of the projection zoom lens of Example 11 at the wide angle end, an intermediate position, and the telephoto end. In Example 11, a first lens group G1 is constituted by four lenses, which are a positive first lens L1, a negative second lens L2, a negative third lens L3, and a negative fourth lens L4, provided in this order from the magnification side. A second lens group G2 is constituted by a single positive fifth lens L5.

A third lens group G3 is constituted by a positive sixth lens L6 and an aperture stop St, which is a variable stop, provided in this order from the magnification side. A fourth lens group G4 is constituted by a positive seventh lens L7 and a negative eighth lens L8, provided in this order from the magnification side.

A fifth lens group G5 is constituted by five lenses, which are a positive ninth lens L9, a negative tenth lens L10, a negative eleventh lens L11, a positive twelfth lens L12, and a positive thirteenth lens L13, provided in this order from the magnification side. A sixth lens group G6 is constituted by a single positive fourteenth lens L14.

Note that the seventh lens L7 and the eighth lens L8 are cemented together, the ninth lens L9 and the tenth lens L10 are cemented together, and the eleventh lens L11 and the twelfth lens L12 are cemented together as well.

Table 23 shows basic lens data of the projection zoom lens of Example 11. In addition, Table 24 shows data related to items at the wide angle end, the intermediate position, and the telephoto end as the projection zoom lens of Example 11 changes

TABLE 23

Example 11: Basic Lens Data

| Si (Surface Number) | Ri (Radius of Curvature) | Di (Distance) | Ndj (Refractive Index) | νdj (Abbe's Number) |
|---|---|---|---|---|
| 1 | 36.6537 | 2.354 | 1.51742 | 52.43 |
| 2 | 409.7181 | 0.073 | | |
| 3 | 24.3742 | 0.837 | 1.61800 | 63.33 |
| 4 | 11.4347 | 2.343 | | |
| 5 | 51.1421 | 0.691 | 1.72342 | 37.95 |
| 6 | 21.8063 | 2.201 | | |
| 7 | −27.5096 | 1.105 | 1.80518 | 25.42 |
| 8 | 44.0155 | DD[8] | | |
| 9 | −52.9373 | 1.623 | 1.80518 | 25.42 |
| 10 | −21.6979 | DD[10] | | |
| 11 | 36.1926 | 1.473 | 1.60562 | 43.70 |
| 12 | −91.0090 | 12.119 | | |
| 13 (aperture stop) | ∞ | DD[13] | | |
| 14 | 214.2251 | 2.501 | 1.58913 | 61.14 |
| 15 | −13.9810 | 1.105 | 1.83400 | 37.16 |
| 16 | −22.2201 | DD[16] | | |
| 17 | 21.9256 | 0.978 | 1.48749 | 70.23 |
| 18 | 34.1474 | 0.471 | 1.58144 | 40.75 |
| 19 | 12.0969 | 1.901 | | |
| 20 | −9.3490 | 0.839 | 1.80400 | 46.58 |
| 21 | 20.7715 | 3.334 | 1.49700 | 81.54 |
| 22 | −14.3296 | 0.000 | | |
| 23 | 56.3479 | 4.692 | 1.49700 | 81.54 |
| 24 | −13.0569 | DD[24] | | |
| 25 | 22.7265 | 2.145 | 1.49700 | 81.54 |
| 26 | −106.1534 | 6.623 | | |

TABLE 23-continued

Example 11: Basic Lens Data

| Si (Surface Number) | Ri (Radius of Curvature) | Di (Distance) | Ndj (Refractive Index) | νdj (Abbe's Number) |
|---|---|---|---|---|
| 27 | ∞ | 25.779 | 1.51633 | 64.14 |
| 28 | ∞ | 1.105 | 1.50847 | 61.19 |
| 29 | ∞ | | | |

TABLE 24

Example 11: Data Related to Zoom

| | Wide Angle | Intermediate | Telephoto |
|---|---|---|---|
| Zoom Ratio | 1.00 | 1.30 | 1.66 |
| f | 10.00 | 13.00 | 16.60 |
| Bf | 24.36 | 24.36 | 24.36 |
| FNo. | 2.30 | 2.30 | 2.30 |
| 2ω (°) | 46.4 | 36.6 | 29.0 |
| DD[8] | 7.873 | 6.648 | 5.152 |
| DD[10] | 19.566 | 10.652 | 5.744 |
| DD[13] | 11.799 | 11.526 | 8.440 |
| DD[16] | 0.732 | 6.283 | 14.926 |
| DD[24] | 0.438 | 5.298 | 6.147 |
| Stop Diameter | 9.834 | 11.338 | 13.274 |

Meanwhile, A through L of FIG. 29 are diagrams that illustrate various aberrations of the projection zoom lens of Example 11.

Example 12

Figure 12:
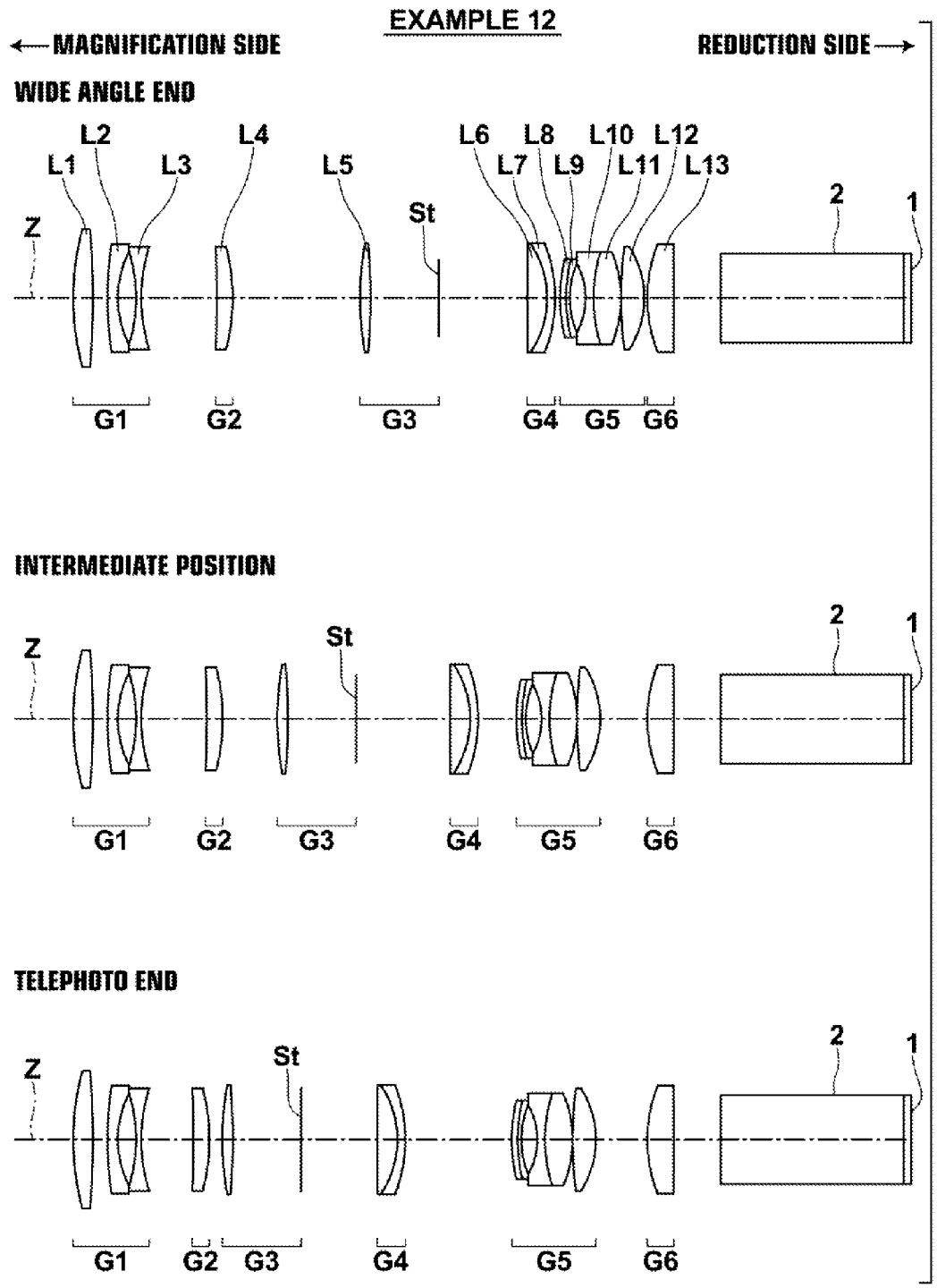
FIG. 12 is a collection of sectional diagrams that illustrate the lens configuration of a projection zoom lens according to Example 12 of the present invention.

FIG. 12 illustrates the arrangements of lens groups of the projection zoom lens of Example 12 at the wide angle end, an intermediate position, and the telephoto end. In Example 12, a first lens group G1 is constituted by three lenses, which are a positive first lens L1, a negative second lens L2, and a negative third lens L3, provided in this order from the magnification side. A second lens group G2 is constituted by a single positive fourth lens L4.

A third lens group G3 is constituted by a positive fifth lens L5 and an aperture stop St, which is a variable stop, provided in this order from the magnification side. A fourth lens group G4 is constituted by a positive sixth lens L6 and a negative seventh lens L7, provided in this order from the magnification side.

A fifth lens group G5 is constituted by five lenses, which are a positive eighth lens L8, a negative ninth lens L9, a negative tenth lens L10, positive eleventh lens L11, and a positive twelfth lens L12, provided in this order from the magnification side. A sixth lens group G6 is constituted by a single positive thirteenth lens L13.

Note that the sixth lens L6 and the seventh lens L7 are cemented together, the eighth lens L8 and the ninth lens L9 are cemented together, and the tenth lens L10 and the eleventh lens L11 are cemented together as well.

Table 25 shows basic lens data of the projection zoom lens of Example 12. In addition, Table 26 shows data related to items at the wide angle end, the intermediate position, and the telephoto end as the projection zoom lens of Example 12 changes magnification, in the same manner as Table 2.

TABLE 25

Example 12: Basic Lens Data

| Si (Surface Number) | Ri (Radius of Curvature) | Di (Distance) | Ndj (Refractive Index) | vdj (Abbe's Number) |
|---|---|---|---|---|
| 1 | 30.1839 | 2.134 | 1.72342 | 37.95 |
| 2 | −103.2523 | 1.602 | | |
| 3 | 39.3346 | 1.146 | 1.74320 | 49.34 |
| 4 | 11.4922 | 1.994 | | |
| 5 | −17.9482 | 0.562 | 1.80518 | 25.42 |
| 6 | 18.8292 | DD[6] | | |
| 7 | −135.1510 | 1.748 | 1.80518 | 25.42 |
| 8 | −22.8628 | DD[8] | | |
| 9 | 33.8765 | 1.146 | 1.63854 | 55.38 |
| 10 | −73.2840 | 7.509 | | |
| 11 (aperture stop) | ∞ | DD[11] | | |
| 12 | 1050.3377 | 2.191 | 1.58913 | 61.14 |
| 13 | −10.9223 | 0.859 | 1.83400 | 37.16 |
| 14 | −16.9650 | DD[14] | | |
| 15 | 18.8345 | 0.652 | 1.48749 | 70.23 |
| 16 | 18.9037 | 0.405 | 1.58144 | 40.75 |
| 17 | 10.2656 | 1.735 | | |
| 18 | −8.1473 | 0.862 | 1.80400 | 46.58 |
| 19 | 17.1499 | 3.023 | 1.49700 | 81.54 |
| 20 | −13.3324 | 0.000 | | |
| 21 | 46.1892 | 2.546 | 1.49700 | 81.54 |
| 22 | −10.8541 | DD[22] | | |
| 23 | 16.4670 | 2.906 | 1.49700 | 81.54 |
| 24 | −1073.5805 | 5.170 | | |
| 25 | ∞ | 20.047 | 1.51633 | 64.14 |
| 26 | ∞ | 0.859 | 1.50847 | 61.19 |
| 27 | ∞ | | | |

TABLE 26

Example 12: Data Related to Zoom

| | Wide Angle | Intermediate | Telephoto |
|---|---|---|---|
| Zoom Ratio | 1.00 | 1.32 | 1.73 |
| f | 10.00 | 13.15 | 17.30 |
| Bf | 18.96 | 18.96 | 18.96 |
| FNo. | 2.30 | 2.30 | 2.30 |
| 2ω (°) | 37.0 | 28.6 | 21.8 |
| DD[6] | 8.295 | 7.196 | 5.735 |
| DD[8] | 13.972 | 6.001 | 1.427 |
| DD[11] | 9.716 | 10.351 | 8.372 |
| DD[14] | 0.572 | 4.182 | 11.704 |
| DD[22] | 0.344 | 5.170 | 5.661 |
| Stop Diameter | 8.472 | 9.752 | 11.45 |

Meanwhile, A through L of FIG. 30 are diagrams that illustrate various aberrations of the projection zoom lens of Example 12.

Next, examples of the projection zoom lens of the present invention having five group configurations will be described.

Example 13

FIG. 13 illustrates the arrangements of lens groups of the projection zoom lens of Example 13 at the wide angle end, an intermediate position, and the telephoto end.

The projection zoom lens of Example 13 consists essentially of: a first lens group G1, which is provided most toward the magnification side, has a negative refractive power, and is fixed while changing magnification; a second lens group G2, which is positioned at the reduction side after the first lens group G1, has a positive refractive power, and moves while changing magnification; a third lens group G3 which is positioned at the reduction side after the second lens group G2, has a positive refractive power, and moves while changing magnification; a fourth lens group G4 which is positioned at the reduction side after the third lens group G3, has a positive refractive power, and moves while changing magnification; and a fifth lens group G5, which is provided most toward the reduction side, has a positive refractive power, and is fixed while changing magnification. The projection zoom lens of the present example is configured such that the reduction side is telecentric. The configuration of the lens groups described above is common to Examples 13 and 14.

A first lens group G1 is constituted by five lenses, which are a positive first lens L1, a negative second lens L2, a negative third lens L3, a negative fourth lens L4, and a positive fifth lens L5, provided in this order from the magnification side. A second lens group G2 is constituted by two lenses, which are a positive sixth lens L6 and a negative seventh lens L7, provided in this order from the magnification side. A third lens group G3 is constituted by a single positive eighth lens L8.

A fourth lens group G4 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A fifth lens group G5 is constituted by a single positive fourteenth lens L14.

Note that the fourth lens L4 and the fifth lens L5 are cemented together, and the eleventh lens L11 and the twelfth lens L12 are cemented together as well.

Table 27 shows basic lens data of the projection zoom lens of Example 13. In addition, Table 28 shows data related to items at the wide angle end, the intermediate position, and the telephoto end as the projection zoom lens of Example 13 changes

TABLE 27

Example 13: Basic Lens Data

| Si (Surface Number) | Ri (Radius of Curvature) | Di (Distance) | Ndj (Refractive Index) | vdj (Abbe's Number) |
|---|---|---|---|---|
| 1 | 48.5846 | 2.854 | 1.65844 | 50.88 |
| 2 | −107.8708 | 0.080 | | |
| 3 | 37.8639 | 1.588 | 1.63854 | 55.38 |
| 4 | 13.5679 | 4.139 | | |
| 5 | −22.8666 | 0.767 | 1.80518 | 25.42 |
| 6 | 28.5108 | 3.095 | | |
| 7 | −19.1843 | 1.195 | 1.62299 | 58.16 |
| 8 | 97.4610 | 3.170 | 1.73800 | 32.26 |
| 9 | −18.2143 | DD[9] | | |
| 10 | 31.0575 | 2.220 | 1.72047 | 34.71 |
| 11 | −82.1902 | 5.205 | | |
| 12 | −53.7384 | 0.710 | 1.62588 | 35.70 |
| 13 | 521.6010 | DD[13] | | |
| 14 | 26.9488 | 1.640 | 1.49700 | 81.54 |
| 15 | −66.8006 | DD[15] | | |
| 16 (aperture stop) | ∞ | 1.985 | | |
| 17 | −20.6337 | 1.191 | 1.51742 | 52.43 |
| 18 | 16.1202 | 0.578 | | |
| 19 | 63.9050 | 3.273 | 1.48749 | 70.24 |
| 20 | −8.0167 | 0.020 | | |
| 21 | −7.9511 | 1.195 | 1.77250 | 49.60 |
| 22 | 32.0361 | 3.187 | 1.49700 | 81.54 |
| 23 | −16.6166 | 1.182 | | |
| 24 | 86.6528 | 4.268 | 1.49700 | 81.54 |
| 25 | −14.4437 | DD[25] | | |
| 26 | 35.0914 | 1.985 | 1.49700 | 81.54 |
| 27 | −70.4236 | 7.152 | | |

TABLE 27-continued

Example 13: Basic Lens Data

| Si (Surface Number) | Ri (Radius of Curvature) | Di (Distance) | Ndj (Refractive Index) | vdj (Abbe's Number) |
|---|---|---|---|---|
| 28 | ∞ | 27.789 | 1.51633 | 64.14 |
| 29 | ∞ | 1.191 | 1.50847 | 61.19 |
| 30 | ∞ | | | |

TABLE 28

Example 13: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.27 | 26.27 | 26.27 |
| FNo. | 2.20 | 2.20 | 2.20 |
| 2ω (°) | 48.6 | 38.2 | 30.0 |
| DD[9] | 16.052 | 7.368 | 2.912 |
| DD[13] | 20.853 | 18.286 | 10.990 |
| DD[15] | 0.794 | 6.798 | 12.056 |
| DD[25] | 0.474 | 5.721 | 12.215 |
| Stop Diameter | 8.466 | 8.952 | 9.558 |

Meanwhile, A through L of FIG. 31 are diagrams that illustrate various aberrations of the projection zoom lens of Example 13.

Example 14

FIG. 14 illustrates the arrangements of lens groups of the projection zoom lens of Example 14 at the wide angle end, an intermediate position, and the telephoto end.

In the projection zoom lens of Example 14, a first lens group G1 is constituted by five lenses, which are a positive first lens L1, a negative second lens L2, a negative third lens L3, a negative fourth lens L4, and a positive fifth lens L5, provided in this order from the magnification side. A second lens group G2 is constituted by two lenses, which are a positive sixth lens L6 and a negative seventh lens L7, provided in this order from the magnification side. A third lens group G3 is constituted by a single positive eighth lens L8.

A fourth lens group G4 is constituted by an aperture stop St, which is a variable stop, and five lenses, which are a negative ninth lens L9, a positive tenth lens L10, a negative eleventh lens L11, a positive twelfth lens L12, and a positive thirteenth lens L13, provided in this order from the magnification side. A fifth lens group G5 is constituted by a single positive fourteenth lens L14.

Note that the fourth lens L4 and the fifth lens L5 are cemented together, and the eleventh lens L11 and the twelfth lens L12 are cemented together as well.

Table 29 shows basic lens data of the projection zoom lens of Example 14. In addition, Table 30 shows data related to items at the wide angle end, the intermediate position, and the telephoto end as the projection zoom lens of Example 14 changes

TABLE 29

Example 14: Basic Lens Data

| Si (Surface Number) | Ri (Radius of Curvature) | Di (Distance) | Ndj (Refractive Index) | vdj (Abbe's Number) |
|---|---|---|---|---|
| 1 | 47.4582 | 2.729 | 1.77250 | 49.60 |
| 2 | −147.9167 | 0.317 | | |
| 3 | 36.5717 | 1.588 | 1.72916 | 54.68 |
| 4 | 14.3687 | 3.792 | | |
| 5 | −25.2759 | 0.767 | 1.80518 | 25.42 |
| 6 | 26.2960 | 4.634 | | |
| 7 | −19.9011 | 1.109 | 1.61800 | 63.33 |
| 8 | −28540.6466 | 2.552 | 1.69895 | 30.13 |
| 9 | −19.2799 | DD[9] | | |
| 10 | 36.0796 | 2.513 | 1.72047 | 34.71 |
| 11 | −37.6616 | 0.400 | | |
| 12 | −35.4435 | 0.710 | 1.85026 | 32.27 |
| 13 | −99.8243 | DD[13] | | |
| 14 | 27.0951 | 1.701 | 1.49700 | 81.54 |
| 15 | −65.9862 | DD[15] | | |
| 16 (aperture stop) | ∞ | 1.985 | | |
| 17 | −20.8458 | 1.191 | 1.51742 | 52.43 |
| 18 | 16.2859 | 0.617 | | |
| 19 | 125.0040 | 2.863 | 1.48749 | 70.24 |
| 20 | −8.0234 | 0.177 | | |
| 21 | −7.7914 | 1.195 | 1.78800 | 47.37 |
| 22 | 32.4539 | 3.924 | 1.49700 | 81.54 |
| 23 | −16.9401 | 0.390 | | |
| 24 | 119.5908 | 4.249 | 1.53715 | 74.81 |
| 25 | −14.1508 | DD[25] | | |
| 26 | 29.6587 | 2.084 | 1.43875 | 94.94 |
| 27 | −77.4035 | 7.156 | | |
| 28 | ∞ | 27.792 | 1.51633 | 64.14 |
| 29 | ∞ | 1.191 | 1.50847 | 61.19 |
| 30 | ∞ | | | |

TABLE 30

Example 14: Data Related to Zoom

| | Wide Angle | Intermediate | Telephoto |
|---|---|---|---|
| Zoom Ratio | 1.00 | 1.30 | 1.67 |
| f | 10.00 | 13.00 | 16.70 |
| Bf | 26.27 | 26.27 | 26.27 |
| FNo. | 2.50 | 2.50 | 2.50 |
| 2ω (°) | 48.6 | 38.2 | 30.0 |
| DD[9] | 15.743 | 6.745 | 1.610 |
| DD[13] | 26.866 | 24.704 | 17.991 |
| DD[15] | 0.794 | 6.303 | 11.582 |
| DD[25] | 0.475 | 6.126 | 12.694 |
| Stop Diameter | 8.528 | 9.078 | 9.716 |

Meanwhile, A through L of FIG. 32 are diagrams that illustrate various aberrations of the projection zoom lens of Example 14.

Example 15

FIG. 15 illustrates the arrangements of lens groups of the projection zoom lens of Example 15 at the wide angle end, an intermediate position, and the telephoto end.

The projection zoom lens of Example 15 consists essentially of: a first lens group G1, which is provided most toward the magnification side, has a positive refractive power, and is fixed while changing magnification; a second lens group G2, which is positioned at the reduction side after the first lens group G1, has a negative refractive power, and moves while changing magnification; a third lens group G3 which is positioned at the reduction side after the second lens group G2, has a negative refractive power, and moves while changing magnification; a fourth lens group G4 which is positioned at the reduction side after the third lens group G3, has a positive refractive power, and moves while changing magnification; and a fifth lens group G5, which is provided most toward the reduction side, has a positive refractive power, and is fixed while changing magnification. The projection zoom lens of the present example is configured such that the reduction side is telecentric. The configuration of the lens groups described above is common to Examples 15 through 18.

In the projection zoom lens of Example 15, a first lens group G1 is constituted by three lenses, which are a negative first lens L1, a positive second lens L2, and a positive third lens L3, provided in this order from the magnification side. A second lens group G2 is constituted by three lenses, which are a negative fourth lens L4, a negative fifth lens L5, and a positive sixth lens L6, provided in this order from the magnification side.

A third lens group is constituted by an aperture stop St, which is a variable stop, and three lenses, which are a negative seventh lens L7, a positive eighth lens L8, and a positive ninth lens L9, provided in this order from the magnification side.

A fourth lens group G4 is constituted by five lenses, which are a positive tenth lens L10, a negative eleventh lens L11, a positive twelfth lens L12, a positive thirteenth lens L13, and a negative fourteenth lens L14, provided in this order from the magnification side. A fifth lens group G5 is constituted by a single positive fifteenth lens L15.

Note that the first lens L1 and the second lens L2 are cemented together, the fifth lens L5 and the sixth lens L6 are cemented together, and the eleventh lens L11 and the twelfth lens L12 are cemented together as well.

Table 31 shows basic lens data of the projection zoom lens of Example 15. In addition, Table 32 shows data related to items at the wide angle end, the intermediate position, and the telephoto end as the projection zoom lens of Example 15 changes

TABLE 31

Example 15: Basic Lens Data

| Si (Surface Number) | Ri (Radius of Curvature) | Di (Distance) | Ndj (Refractive Index) | νdj (Abbe's Number) |
| --- | --- | --- | --- | --- |
| 1 | −308.9615 | 0.685 | 1.80518 | 25.42 |
| 2 | 17.4931 | 3.669 | 1.72047 | 34.71 |
| 3 | −55.4171 | 0.062 | | |
| 4 | 22.1462 | 1.813 | 1.77250 | 49.60 |
| 5 | 196.1507 | DD[5] | | |
| 6 | 54.9244 | 0.558 | 1.61800 | 63.33 |
| 7 | 9.4940 | 2.361 | | |
| 8 | −18.7868 | 0.499 | 1.48749 | 70.23 |
| 9 | 10.5135 | 1.382 | 1.73800 | 32.26 |
| 10 | 29.6141 | DD[10] | | |
| 11 (aperture stop) | ∞ | 1.861 | | |
| 12 | −10.2665 | 0.465 | 1.78590 | 44.20 |
| 13 | 16.9441 | 0.012 | | |
| 14 | 17.3787 | 2.343 | 1.51742 | 52.43 |
| 15 | −17.3787 | 3.715 | | |
| 16 | 46.7497 | 1.159 | 1.80518 | 25.42 |
| 17 | −46.7497 | DD[17] | | |
| 18 | 16.1146 | 2.693 | 1.49700 | 81.54 |
| 19 | −135.8991 | 4.532 | | |
| 20 | −96.4823 | 0.561 | 1.78590 | 44.20 |
| 21 | 11.8321 | 3.138 | 1.49700 | 81.54 |
| 22 | −16.0758 | 0.091 | | |
| 23 | 41.9300 | 1.381 | 1.58913 | 61.14 |
| 24 | −41.9300 | 0.582 | | |
| 25 | −17.6180 | 0.527 | 1.75520 | 27.51 |
| 26 | −66.5989 | DD[26] | | |

TABLE 31-continued

Example 15: Basic Lens Data

| Si (Surface Number) | Ri (Radius of Curvature) | Di (Distance) | Ndj (Refractive Index) | νdj (Abbe's Number) |
| --- | --- | --- | --- | --- |
| 27 | 21.6119 | 1.450 | 1.62299 | 58.16 |
| 28 | ∞ | 5.595 | | |
| 29 | ∞ | 21.707 | 1.51633 | 64.14 |
| 30 | ∞ | 0.930 | 1.50847 | 61.19 |
| 31 | ∞ | | | |

TABLE 32

Example 15: Data Related to Zoom

| | Wide Angle | Intermediate | Telephoto |
| --- | --- | --- | --- |
| Zoom Ratio | 1.00 | 1.37 | 1.87 |
| f | 10.00 | 13.70 | 18.70 |
| Bf | 20.53 | 20.53 | 20.53 |
| FNo. | 2.50 | 2.50 | 2.50 |
| 2ω (°) | 39.0 | 28.8 | 21.2 |
| DD[5] | 1.240 | 3.412 | 5.113 |
| DD[10] | 10.588 | 6.005 | 1.552 |
| DD[17] | 8.042 | 6.981 | 5.481 |
| DD[26] | 1.973 | 5.446 | 9.696 |
| Stop Diameter | 5.41 | 5.714 | 6.144 |

Meanwhile, A through L of FIG. 33 are diagrams that illustrate various aberrations of the projection zoom lens of Example 15.

Example 16

FIG. 16 illustrates the arrangements of lens groups of the projection zoom lens of Example 16 at the wide angle end, an intermediate position, and the telephoto end.

In the projection zoom lens of Example 16, a first lens group G1 is constituted by three lenses, which are a negative first lens L1, a positive second lens L2, and a positive third lens L3, provided in this order from the magnification side. A second lens group G2 is constituted by three lenses, which are a negative fourth lens L4, a negative fifth lens L5, and a positive sixth lens L6, provided in this order from the magnification side.

A third lens group is constituted by an aperture stop St, which is a variable stop, and three lenses, which are a negative seventh lens L7, a positive eighth lens L8, and a positive ninth lens L9, provided in this order from the magnification side.

A fourth lens group G4 is constituted by five lenses, which are a positive tenth lens L10, a negative eleventh lens L11, a positive twelfth lens L12, a positive thirteenth lens L13, and a negative fourteenth lens L14, provided in this order from the magnification side. A fifth lens group G5 is constituted by a single positive fifteenth lens L15.

Note that the first lens L1 and the second lens L2 are cemented together, the fifth lens L5 and the sixth lens L6 are cemented together, the seventh lens L7 and the eighth lens L8 are cemented together, and the eleventh lens L11 and the twelfth lens L12 are cemented together as well.

Table 33 shows basic lens data of the projection zoom lens of Example 16. In addition, Table 34 shows data related to items at the wide angle end, the intermediate position, and the telephoto end as the projection zoom lens of Example 16 changes

TABLE 33

Example 16: Basic Lens Data

| Si (Surface Number) | Ri (Radius of Curvature) | Di (Distance) | Ndj (Refractive Index) | vdj (Abbe's Number) |
|---|---|---|---|---|
| 1 | 76.5490 | 0.874 | 1.80518 | 25.42 |
| 2 | 13.3935 | 3.988 | 1.72047 | 34.71 |
| 3 | −34212.0665 | 0.062 | | |
| 4 | 21.1772 | 2.080 | 1.77250 | 49.60 |
| 5 | 2815.0492 | DD[5] | | |
| 6 | 75.0061 | 0.622 | 1.61800 | 63.33 |
| 7 | 9.5305 | 2.429 | | |
| 8 | −24.4663 | 0.625 | 1.61800 | 63.33 |
| 9 | 9.2585 | 2.237 | 1.73800 | 32.26 |
| 10 | 36.2329 | DD[10] | | |
| 11 (aperture stop) | ∞ | 1.867 | | |
| 12 | −9.5751 | 0.626 | 1.80610 | 40.92 |
| 13 | 18.5396 | 2.597 | 1.51742 | 52.43 |
| 14 | −17.7270 | 3.486 | | |
| 15 | 58.5114 | 2.611 | 1.80518 | 25.42 |
| 16 | −33.7601 | DD[16] | | |
| 17 | 15.5439 | 3.543 | 1.49700 | 81.54 |
| 18 | −90.1437 | 4.275 | | |
| 19 | −59.6413 | 0.626 | 1.80610 | 40.92 |
| 20 | 11.6284 | 3.762 | 1.49700 | 81.54 |
| 21 | −19.9931 | 0.062 | | |
| 22 | 45.3783 | 1.745 | 1.58913 | 61.14 |
| 23 | −32.7877 | 0.547 | | |
| 24 | −18.2012 | 0.529 | 1.80518 | 25.42 |
| 25 | −39.9972 | DD[25] | | |
| 26 | 22.1653 | 1.763 | 1.62299 | 58.16 |
| 27 | −214748.3648 | 5.616 | | |
| 28 | ∞ | 21.781 | 1.51633 | 64.14 |
| 29 | ∞ | 0.933 | 1.50847 | 61.19 |
| 30 | ∞ | | | |

TABLE 34

Example 16: Data Related to Zoom

| | Wide Angle | Intermediate | Telephoto |
|---|---|---|---|
| Zoom Ratio | 1.00 | 1.37 | 1.87 |
| f | 10.00 | 13.70 | 18.70 |
| Bf | 20.60 | 20.60 | 20.60 |
| FNo. | 2.50 | 2.50 | 2.50 |
| 2ω (°) | 39.2 | 29.0 | 21.4 |
| DD[5] | 1.245 | 3.049 | 4.546 |
| DD[10] | 9.186 | 4.806 | 0.769 |
| DD[16] | 5.936 | 4.876 | 3.283 |
| DD[25] | 0.463 | 4.098 | 8.232 |
| Stop Diameter | 5.146 | 5.432 | 5.832 |

Meanwhile, A through L of FIG. 34 are diagrams that illustrate various aberrations of the projection zoom lens of Example 16.

Example 17

Figure 17:
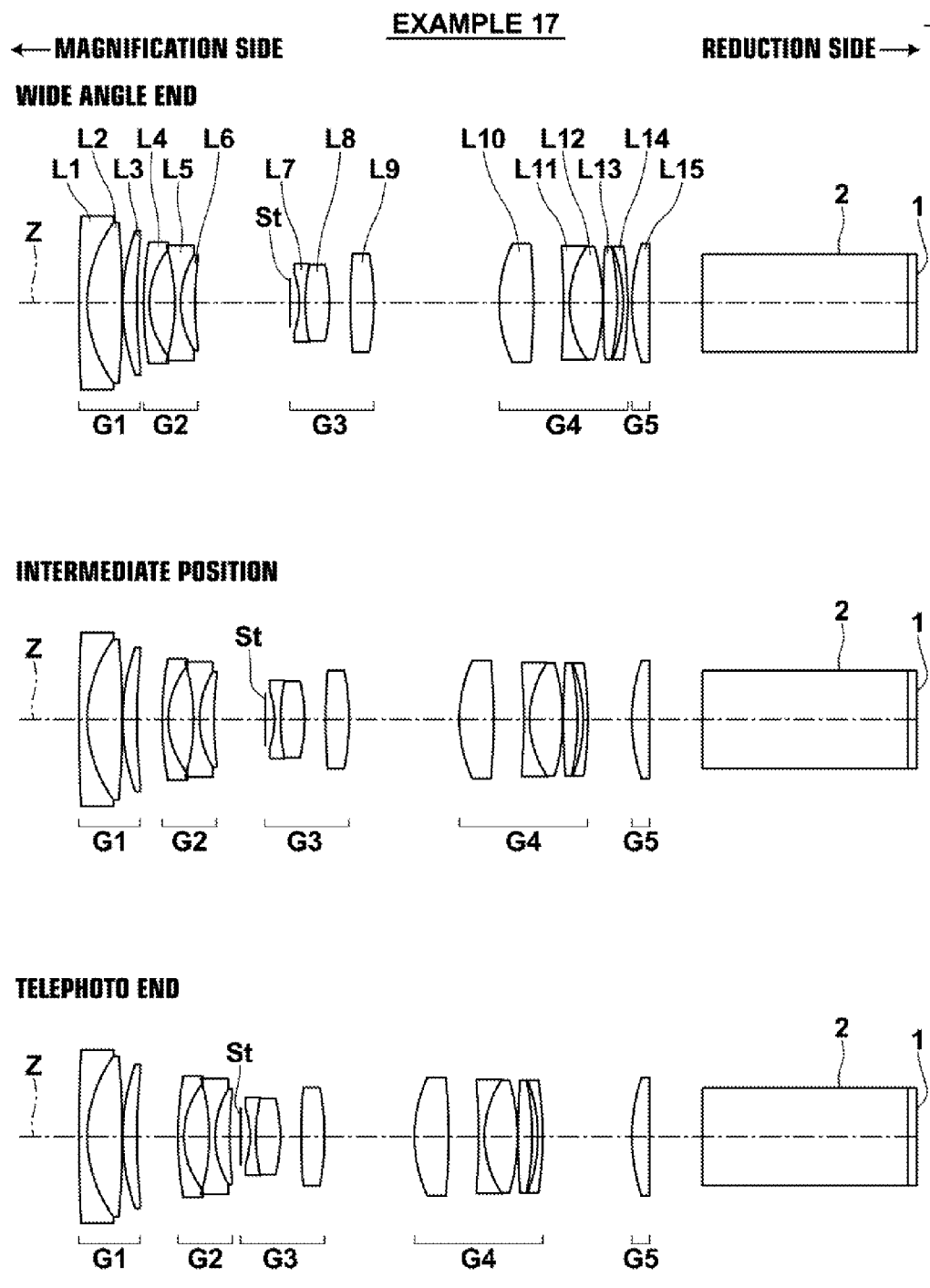
FIG. 17 is a collection of sectional diagrams that illustrate the lens configuration of a projection zoom lens according to Example 17 of the present invention.

FIG. 17 illustrates the arrangements of lens groups of the projection zoom lens of Example 17 at the wide angle end, an intermediate position, and the telephoto end.

In the projection zoom lens of Example 17, a first lens group G1 is constituted by three lenses, which are a negative first lens L1, a positive second lens L2, and a positive third lens L3, provided in this order from the magnification side. A second lens group G2 is constituted by three lenses, which are a negative fourth lens L4, a negative fifth lens L5, and a positive sixth lens L6, provided in this order from the magnification side.

A third lens group is constituted by an aperture stop St, which is a variable stop, and three lenses, which are a negative seventh lens L7, a positive eighth lens L8, and a positive ninth lens L9, provided in this order from the magnification side.

A fourth lens group G4 is constituted by five lenses, which are a positive tenth lens L10, a negative eleventh lens L11, a positive twelfth lens L12, a positive thirteenth lens L13, and a negative fourteenth lens L14, provided in this order from the magnification side. A fifth lens group G5 is constituted by a single positive fifteenth lens L15.

Note that the first lens L1 and the second lens L2 are cemented together, the fifth lens L5 and the sixth lens L6 are cemented together, the seventh lens L7 and the eighth lens L8 are cemented together, and the eleventh lens L11 and the twelfth lens L12 are cemented together as well.

Table 35 shows basic lens data of the projection zoom lens of Example 17. In addition, Table 36 shows data related to items at the wide angle end, the intermediate position, and the telephoto end as the projection zoom lens of Example 17 changes

TABLE 35

Example 17: Basic Lens Data

| Si (Surface Number) | Ri (Radius of Curvature) | Di (Distance) | Ndj (Refractive Index) | vdj (Abbe's Number) |
|---|---|---|---|---|
| 1 | 196.6138 | 0.875 | 1.80518 | 25.42 |
| 2 | 14.8356 | 3.694 | 1.83400 | 37.16 |
| 3 | −114.5447 | 0.062 | | |
| 4 | 23.1627 | 1.508 | 1.83400 | 37.16 |
| 5 | 68.0456 | DD[5] | | |
| 6 | 37.5400 | 0.623 | 1.61800 | 63.33 |
| 7 | 9.2583 | 2.701 | | |
| 8 | −21.7364 | 0.626 | 1.61800 | 63.33 |
| 9 | 10.1093 | 1.531 | 1.83400 | 37.16 |
| 10 | 38.9980 | DD[10] | | |
| 11 (aperture stop) | ∞ | 1.000 | | |
| 12 | −9.5725 | 0.626 | 1.80610 | 40.92 |
| 13 | 19.9128 | 2.573 | 1.48749 | 70.23 |
| 14 | −17.6173 | 2.220 | | |
| 15 | 64.8111 | 2.479 | 1.80518 | 25.42 |
| 16 | −28.1572 | DD[16] | | |
| 17 | 15.4157 | 3.636 | 1.49700 | 81.54 |
| 18 | −70.0910 | 3.203 | | |
| 19 | −77.5904 | 0.626 | 1.77250 | 49.60 |
| 20 | 11.1171 | 3.509 | 1.49700 | 81.54 |
| 21 | −21.5999 | 0.062 | | |
| 22 | 97.4566 | 1.494 | 1.58913 | 61.14 |
| 23 | −30.3414 | 0.600 | | |
| 24 | −17.4509 | 0.498 | 1.80518 | 25.42 |
| 25 | −42.8362 | DD[25] | | |
| 26 | 20.5835 | 1.874 | 1.62299 | 58.16 |
| 27 | −214748.3648 | 5.614 | | |
| 28 | ∞ | 21.790 | 1.51633 | 64.14 |
| 29 | ∞ | 0.934 | 1.50847 | 61.19 |
| 30 | ∞ | | | |

TABLE 36

Example 17: Data Related to Zoom

| | Wide Angle | Intermediate | Telephoto |
|---|---|---|---|
| Zoom Ratio | 1.00 | 1.37 | 1.87 |
| f | 16.23 | 22.23 | 30.35 |
| Bf | 35.31 | 35.31 | 35.31 |
| FNo. | 2.50 | 2.50 | 2.50 |
| 2ω (°) | 39.2 | 29.0 | 21.4 |
| DD[5] | 0.697 | 2.692 | 4.354 |

TABLE 36-continued

Example 17: Data Related to Zoom

|  | Wide Angle | Intermediate | Telephoto |
|---|---|---|---|
| DD[10] | 10.051 | 5.415 | 1.173 |
| DD[16] | 13.318 | 11.734 | 9.514 |
| DD[25] | 0.453 | 4.678 | 9.479 |
| Stop Diameter | 5.144 | 5.504 | 6.008 |

Meanwhile, A through L of FIG. 35 are diagrams that illustrate various aberrations of the projection zoom lens of Example 17.

Example 18

FIG. 18 illustrates the arrangements of lens groups of the projection zoom lens of Example 18 at the wide angle end, an intermediate position, and the telephoto end.

In the projection zoom lens of Example 18, a first lens group G1 is constituted by three lenses, which are a negative first lens L1, a positive second lens L2, and a positive third lens L3, provided in this order from the magnification side. A second lens group G2 is constituted by three lenses, which are a negative fourth lens L4, a negative fifth lens L5, and a positive sixth lens L6, provided in this order from the magnification side.

A third lens group is constituted by an aperture stop St, which is a variable stop, and three lenses, which are a negative seventh lens L7, a positive eighth lens L8, and a positive ninth lens L9, provided in this order from the magnification side.

A fourth lens group G4 is constituted by five lenses, which are a positive tenth lens L10, a negative eleventh lens L11, a positive twelfth lens L12, a positive thirteenth lens L13, and a negative fourteenth lens L14, provided in this order from the magnification side. A fifth lens group G5 is constituted by a single positive fifteenth lens L15.

Note that the first lens L1 and the second lens L2 are cemented together, the fifth lens L5 and the sixth lens L6 are cemented together, and the eleventh lens L11 and the twelfth lens L12 are cemented together as well.

Table 37 shows basic lens data of the projection zoom lens of Example 18. In addition, Table 38 shows data related to items at the wide angle end, the intermediate position, and the telephoto end as the projection zoom lens of Example 18 changes

TABLE 37

Example 18: Basic Lens Data

| Si (Surface Number) | Ri (Radius of Curvature) | Di (Distance) | Ndj (Refractive Index) | νdj (Abbe's Number) |
|---|---|---|---|---|
| 1 | 183.0727 | 0.809 | 1.84666 | 23.78 |
| 2 | 18.4457 | 3.387 | 1.72047 | 34.71 |
| 3 | −80.5449 | 0.062 | | |
| 4 | 22.4937 | 1.805 | 1.77250 | 49.60 |
| 5 | 254.0232 | DD[5] | | |
| 6 | 82.1705 | 0.558 | 1.61800 | 63.33 |
| 7 | 9.7437 | 2.120 | | |
| 8 | −22.3435 | 0.499 | 1.53715 | 74.81 |
| 9 | 10.0824 | 1.446 | 1.72047 | 34.71 |
| 10 | 33.8623 | DD[10] | | |
| 11 (aperture stop) | ∞ | 1.861 | | |
| 12 | −9.4830 | 0.620 | 1.80610 | 40.92 |
| 13 | 25.7302 | 0.040 | | |
| 14 | 28.3996 | 2.196 | 1.51742 | 52.43 |
| 15 | −17.3443 | 3.460 | | |
| 16 | 58.8269 | 2.190 | 1.80518 | 25.42 |
| 17 | −34.7210 | DD[17] | | |
| 18 | 15.1705 | 2.951 | 1.53715 | 74.81 |
| 19 | −128.7052 | 4.322 | | |
| 20 | −77.7489 | 0.623 | 1.80610 | 40.92 |
| 21 | 10.8170 | 3.074 | 1.49700 | 81.54 |
| 22 | −18.6816 | 0.062 | | |
| 23 | 53.9367 | 1.228 | 1.58913 | 61.14 |
| 24 | −56.9792 | 0.750 | | |
| 25 | −16.2349 | 0.543 | 1.80518 | 25.42 |
| 26 | −28.5157 | DD[26] | | |
| 27 | 20.9770 | 1.501 | 1.62041 | 60.29 |
| 28 | −4723.6871 | 5.593 | | |
| 29 | ∞ | 21.706 | 1.51633 | 64.14 |
| 30 | ∞ | 0.930 | 1.50847 | 61.19 |
| 31 | ∞ | | | |

TABLE 38

Example 18: Data Related to Zoom

|  | Wide Angle | Intermediate | Telephoto |
|---|---|---|---|
| Zoom Ratio | 1.00 | 1.37 | 1.87 |
| f | 10.00 | 13.70 | 18.70 |
| Bf | 20.52 | 20.52 | 20.52 |
| FNo. | 2.50 | 2.50 | 2.50 |
| 2ω (°) | 39.0 | 28.6 | 21.2 |
| DD[5] | 1.240 | 3.430 | 5.057 |
| DD[10] | 10.447 | 6.005 | 1.561 |
| DD[17] | 8.253 | 7.251 | 5.722 |
| DD[26] | 1.319 | 4.573 | 8.920 |
| Stop Diameter | 5.332 | 5.608 | 5.988 |

Meanwhile, A through L of FIG. 36 are diagrams that illustrate aberrations of the projection zoom lens of Example 18.

TABLE 39

| Condition | | Example 1 | Example 2 | Example 3 | Example 4 | Example 5 | Example 6 | Example 7 | Example 8 | Example 9 |
|---|---|---|---|---|---|---|---|---|---|---|
| (1) | Bf/Imφ | 2.94 | 2.94 | 2.94 | 2.94 | 2.94 | 2.94 | 2.94 | 2.94 | 2.94 |
| (2) | L/Imφ | 9.79 | 10.00 | 10.08 | 9.78 | 9.78 | 9.78 | 9.78 | 7.11 | 9.75 |
| (3) | fe/fw | 5.35 | 5.56 | 5.30 | 5.49 | 4.95 | 5.01 | 5.46 | 5.78 | 5.01 |
| (4) | f1/fw | −1.78 | −1.39 | −1.17 | −1.66 | −1.66 | −1.7 | −1.12 | −1.29 | −1.38 |
| (5) | f3/fw | 12.15 | 7.57 | 6.94 | 8.88 | 6.63 | 6.64 | 5.33 | 4.13 | 4.18 |
| (6) | Zr | 1.43 | 1.50 | 1.50 | 1.43 | 1.58 | 1.58 | 1.58 | 1.58 | 1.67 |

TABLE 39-continued

| Condition | | Example 10 | Example 11 | Example 12 | Example 13 | Example 14 | Example 15 | Example 16 | Example 17 | Example 18 |
|---|---|---|---|---|---|---|---|---|---|---|
| (1) | Bf/Imφ | 2.94 | 2.88 | 2.88 | 2.94 | 2.94 | 2.94 | 2.94 | 2.94 | 2.94 |
| (2) | L/Imφ | 9.82 | 9.82 | 10.01 | 9.37 | 9.56 | 8.22 | 8.25 | 8.64 | 8.22 |
| (3) | fe/fw | 4.94 | 3.79 | 3.27 | 4.74 | 4.92 | 3.47 | 3.56 | 3.30 | 3.37 |
| (4) | f1/fw | −1.5 | −1.19 | −1.12 | −2.08 | −1.94 | 2.67 | 2.51 | 2.70 | 2.61 |
| (5) | f3/fw | 4.39 | 4.29 | 3.64 | 3.89 | 3.89 | −9.36 | −10.11 | −10.11 | −9.42 |
| (6) | Zr | 1.67 | 1.66 | 1.73 | 1.67 | 1.67 | 1.87 | 1.87 | 1.87 | 1.87 |

TABLE 40

| Condition | Example 1 | Example 2 | Example 3 | Example 4 | Example 5 | Example 6 | Example 7 | Example 8 | Example 9 |
|---|---|---|---|---|---|---|---|---|---|
| f2/fw | 8.54 | 8.13 | 5.93 | 9.45 | 11.00 | 12.35 | 3.09 | 2.90 | 12.05 |
| f4/fw | 4.36 | 4.76 | 4.56 | 4.89 | 4.05 | 4.11 | −6.59 | −3.05 | 4.14 |
| f5/fw | −97.22 | −24.64 | −14.57 | −470.96 | −44.76 | −58.41 | 5.65 | 4.36 | 17.37 |

| Condition | Example 10 | Example 11 | Example 12 | Example 13 | Example 14 | Example 15 | Example 16 | Example 17 | Example 18 |
|---|---|---|---|---|---|---|---|---|---|
| f2/fw | 13.43 | 4.46 | 3.39 | 4.68 | 4.22 | −1.18 | −1.05 | −1.21 | −1.15 |
| f4/fw | 4.31 | 4.35 | 3.60 | 15.8 | 18.99 | 3.19 | 3.25 | 3.53 | 3.31 |
| f5/fw | 14.45 | −13.43 | −10.19 | — | — | — | — | — | — |

Embodiments and Examples of the present invention have been described above. However, the projection zoom lens of the present invention is not limited to the Examples described above, and various modifications to the aspects of the projection zoom lens are possible. For example, the radii of curvature, the distances among surfaces, the refractive indices, and the Abbe's numbers of the lenses may be changed as appropriate.

In addition, the projection type display device of the present invention is not limited to that having the configuration described above, and various modifications to the aspects of the projection type display device are possible. For example, the light valves which are employed and the optical members which are employed to separate and combine light beams are not limited to those of the configuration described above.

What is claimed is:

1. A projection zoom lens, consisting of:
   a first lens group, which is provided most toward the magnification side, has a negative refractive power, and is fixed while changing magnification;
   a second lens group, which is positioned at the reduction side after the first lens group, has a positive refractive power, and moves while changing magnification;
   a third lens group, which is positioned at the reduction side after the second lens group, has a positive refractive power, and moves while changing magnification;
   a final lens group, which is provided most toward the reduction side, has a positive refractive power, and is fixed while changing magnification;
   at least one lens group positioned between the final lens group and the third lens group; and
   an aperture stop provided between adjacent moving lens groups or provided within one of the moving lens groups;
   the aperture stop being a variable stop, of which the aperture diameter changes such that the numerical aperture of the zoom lens becomes constant through the entire magnification range;
   the projection zoom lens being configured such that the reduction side is telecentric; and
   the projection zoom lens satisfying Conditional Formulae (1') and (2) below:

$$2.8 < Bf/Im\phi \tag{1'}$$

$$L/Im\phi < 12 \tag{2}$$

wherein Bf is an air converted distance of the back focus of the entire system at the reduction side at the wide angle end, Imφ is the maximum effective image circle diameter at the reduction side, and L is the distance along the optical axis from the lens surface most toward the magnification side to the lens surface most toward the reduction side when the projection distance is infinity.

2. A projection zoom lens as defined in claim 1 that satisfies Conditional Formula (2') below:

$$7 < L/Im\phi < 11 \tag{2'}$$

3. A projection zoom lens as defined in claim 1, that satisfies Conditional Formula (3) below:

$$2.0 < fe/fw < 7.0 \tag{3}$$

wherein fe is the focal length of the final lens group, and fw is the focal length of the entire system at the wide angle end.

4. A projection zoom lens as defined in claim 3 that satisfies Conditional Formula (3') below:

$$3.0 < fe/fw < 6.0 \tag{3'}$$

5. A projection zoom lens as defined in claim 1 that satisfies Conditional Formula (4) below:

$$-2.0 < f1/fw < -0.8 \tag{4}$$

wherein f1 is the focal length of the first lens group, and fw is the focal length of the entire system at the wide angle end.

6. A projection zoom lens as defined in claim 5 that satisfies Conditional Formula (4') below:

$$-1.8 < f1/fw < -1.0 \tag{4'}$$

7. A projection zoom lens as defined in claim 1 that satisfies Conditional Formula (5) below:

$$3.0 < f3/fw < 8.0 \quad (5)$$

wherein f3 is the focal length of the third lens group, and fw is the focal length of the entire system at the wide angle end.

8. A projection zoom lens as defined in claim 1 that satisfies Conditional Formula (6) below:

$$1.4 < Zr \quad (6)$$

wherein Zr is the zoom ratio of the telephoto end with respect to the wide angle end.

9. A projection type display device, comprising:
a light source;
a light valve, into which light from the light source enters; and
a projection zoom lens as defined in claim 1 that projects optical images formed by light modulated by the light valve onto a screen.

10. A projection zoom lens, consisting of:
a first lens group, which is provided most toward the magnification side, has a positive refractive power, and is fixed while changing magnification;
a second lens group, which is positioned at the reduction side after the first lens group, has a negative refractive power, and moves while changing magnification;
a third lens group which is positioned at the reduction side after the second lens group, has a negative refractive power, and moves while changing magnification;
a fourth lens group which is positioned at the reduction side after the third lens group, has a positive refractive power, and moves while changing magnification;
a fifth lens group which is positioned at the reduction side after the fourth lens group, has a positive refractive power, and is fixed while changing magnification; and
an aperture stop provided between adjacent moving lens groups or provided within one of the moving lens groups;
the aperture stop being a variable stop, of which the aperture diameter changes such that the numerical aperture of the zoom lens becomes constant through the entire magnification range;
the projection zoom lens being configured such that the reduction side is telecentric; and
the projection zoom lens satisfying Conditional Formulae (1) and (2) below:

$$2.5 < Bf/Im\phi \quad (1)$$

$$L/Im\phi < 12 \quad (2)$$

wherein Bf is an air converted distance of the back focus of the entire system at the reduction side at the wide angle end, Im$\phi$ is the maximum effective image circle diameter at the reduction side, and L is the distance along the optical axis from the lens surface most toward the magnification side to the lens surface most toward the reduction side when the projection distance is infinity.

11. A projection zoom lens as defined in claim 10 that satisfies Conditional Formula (2') below:

$$7 < L/Im\phi < 11 \quad (2').$$

12. A projection zoom lens as defined in claim 10 that satisfies Conditional Formula (1') below:

$$2.8 < NBf/Im\phi \quad (1').$$

13. A projection zoom lens as defined in claim 10, that satisfies Conditional Formula (3) below:

$$2.0 < fe/fw < 7.0 \quad (3)$$

wherein fe is the focal length of the final lens group, and fw is the focal length of the entire system at the wide angle end.

14. A projection zoom lens as defined in claim 13 that satisfies Conditional Formula (3') below:

$$3.0 < fe/fw < 6.0 \quad (3').$$

15. A projection type display device, comprising:
a light source;
a light valve, into which light from the light source enters; and
a projection zoom lens as defined in claim 10 that projects optical images formed by light modulated by the light valve onto a screen.

\* \* \* \* \*